United States Patent [19]

Asakura et al.

[11] Patent Number: 5,298,930
[45] Date of Patent: * Mar. 29, 1994

[54] CAMERA AND FILM WINDING MECHANISM THEREOF

[75] Inventors: Yasuo Asakura; Mutumi Naruse, both of Hachioji; Michiharu Saito, Okaya; Keita Takahasi, Hachioji, all of Japan

[73] Assignee: Olympus Optical Co., Ltd., Tokyo, Japan

[ * ] Notice: The portion of the term of this patent subsequent to Dec. 24, 2008 has been disclaimed.

[21] Appl. No.: 703,626

[22] Filed: May 21, 1991

[30] Foreign Application Priority Data

| May 25, 1990 | [JP] | Japan | 2-136818 |
| May 25, 1990 | [JP] | Japan | 2-136819 |
| Aug. 3, 1990 | [JP] | Japan | 2-207328 |
| Aug. 24, 1990 | [JP] | Japan | 2-223617 |

[51] Int. Cl.$^5$ .................................................. G03B 1/18
[52] U.S. Cl. .................................. 354/173.1; 354/212
[58] Field of Search ............................ 354/212–216, 354/173.1, 173.11

[56] References Cited

U.S. PATENT DOCUMENTS

| 4,239,362 | 12/1980 | Katayama et al. | 354/212 |
| 4,477,162 | 10/1984 | Matsumoto | 354/212 |
| 4,482,229 | 11/1984 | Sugiura | 354/212 |
| 5,008,693 | 4/1991 | Hirohata | 354/214 |
| 5,075,708 | 12/1991 | Okumura et al. | 354/173.1 |

FOREIGN PATENT DOCUMENTS

| 57-22732 | 2/1982 | Japan. |
| 58-34417 | 8/1983 | Japan. |
| 2-84633 | 3/1990 | Japan. |
| 2-89038 | 3/1990 | Japan. |
| 2-105128 | 4/1990 | Japan. |

*Primary Examiner*—David M. Gray
*Attorney, Agent, or Firm*—Frishauf, Holtz, Goodman & Woodward

[57] ABSTRACT

A camera comprises a camera body in which an opening is mounted for determining a photographing bundle of ray and for forming a photographing picture, and a patrone containing chamber is located sidewardly adjacent to the opening and is used for containing a patrone to be used for the camera. In the camera, a sprocket is located behind an imaginary plane including the opening of the camera body and is used for feeding a film, which is exposed by the photographing bundle of ray passing through the opening, toward the backside of the imaginary plane, and a spool located behind the opening and the sprocket and takes up the film, fed toward the backside by the sprocket, with a photographic-emulsion coating surface thereof being located radially inside on the spool.

33 Claims, 30 Drawing Sheets

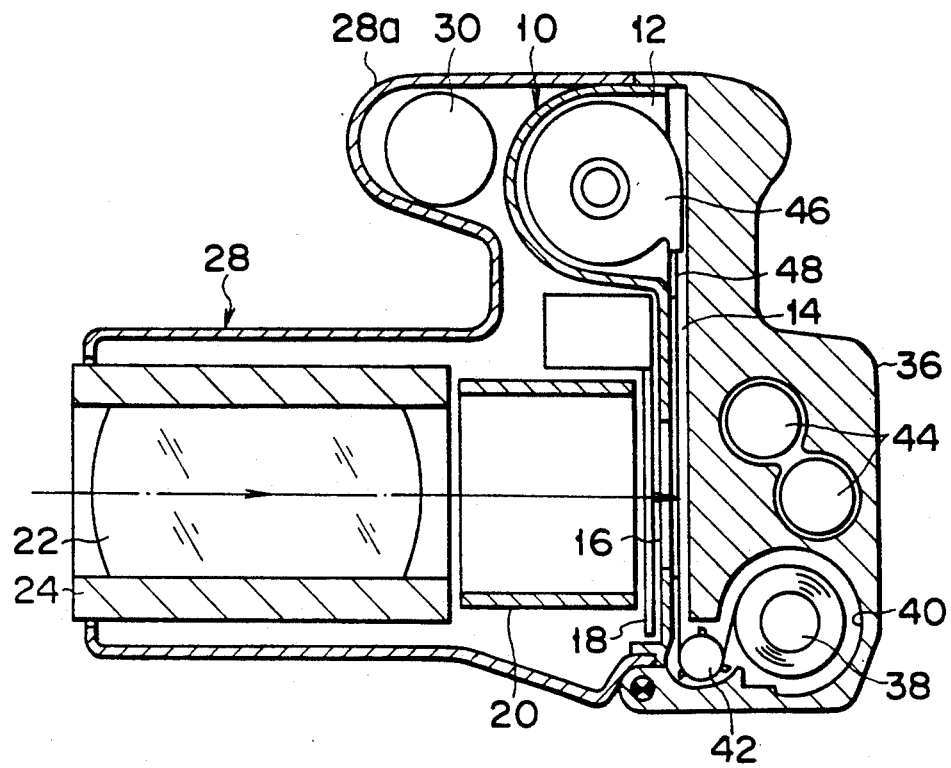
F I G. 1
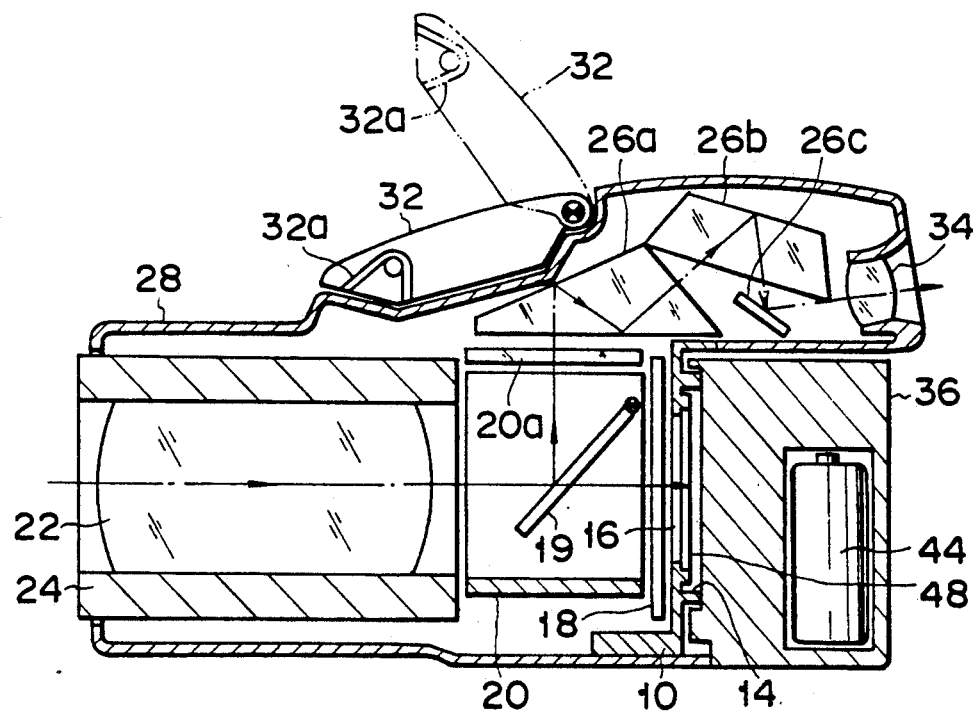
F I G. 2

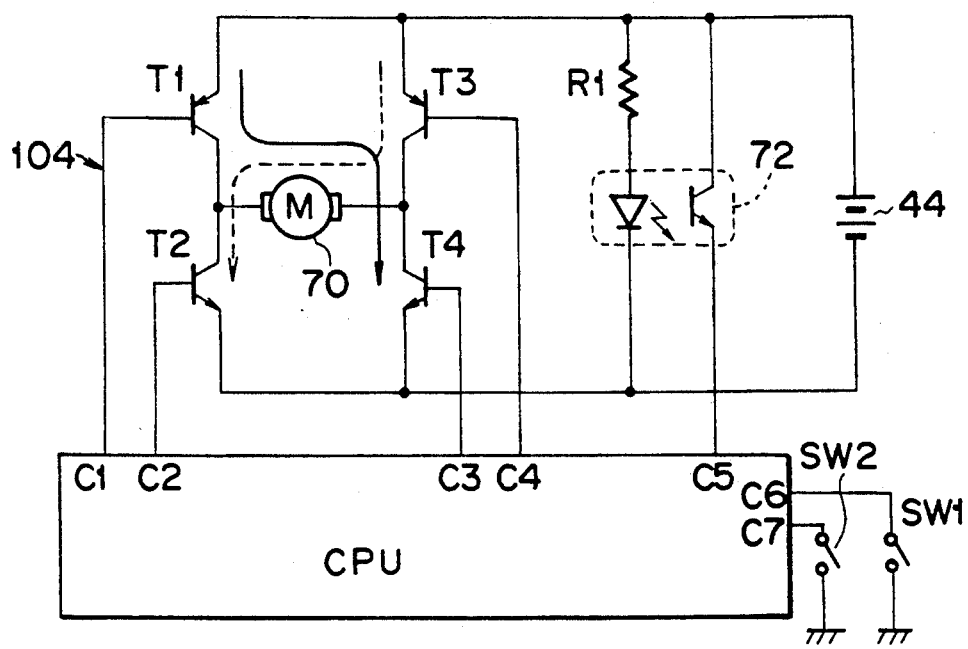
F I G. 11
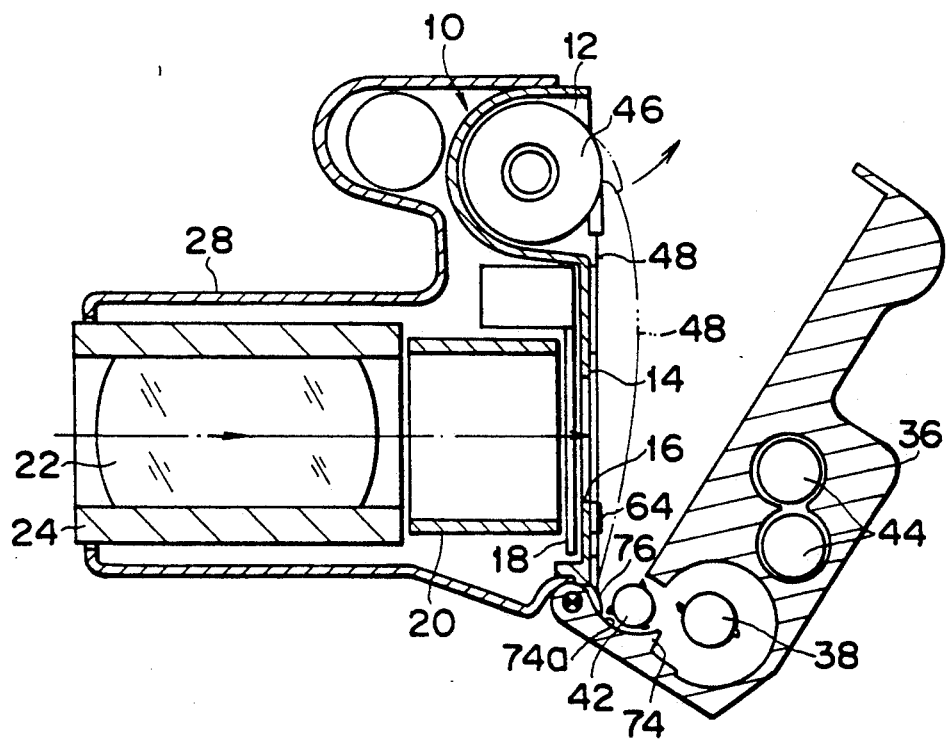
F I G. 12

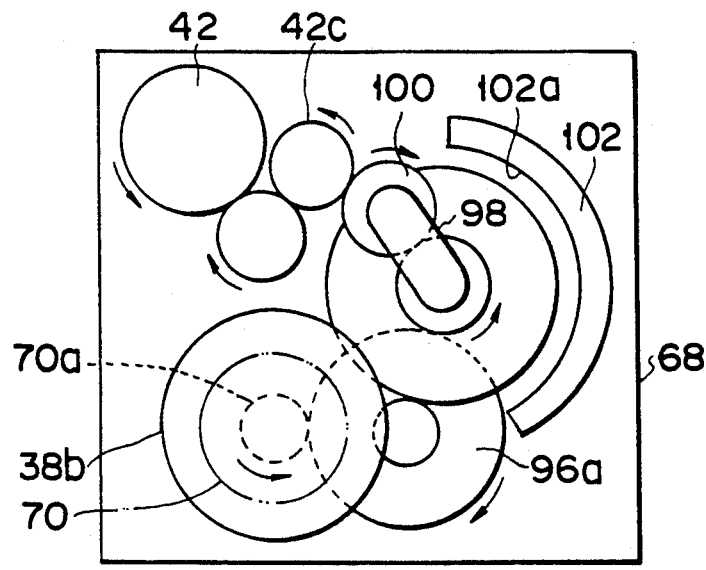
F I G. 14
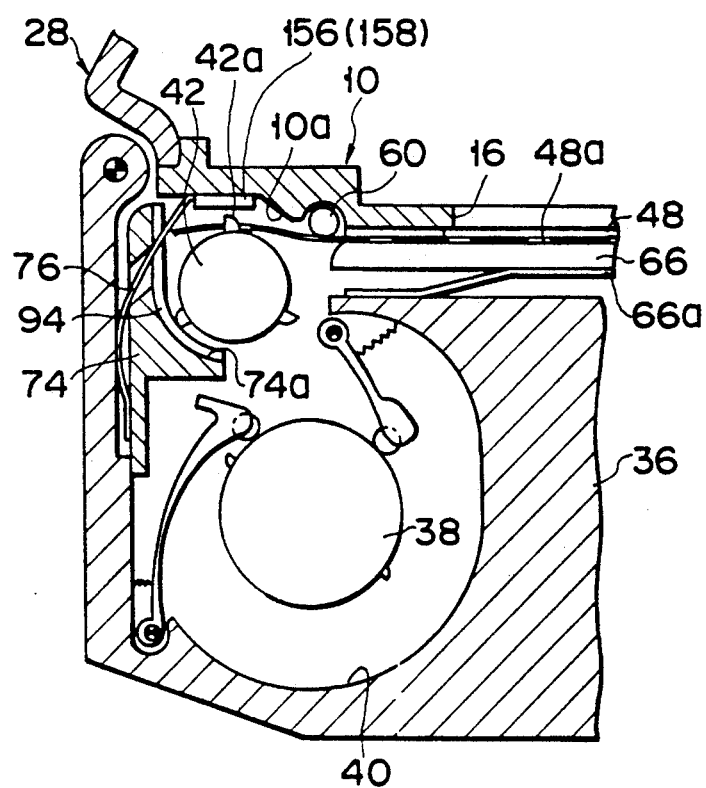
F I G. 15

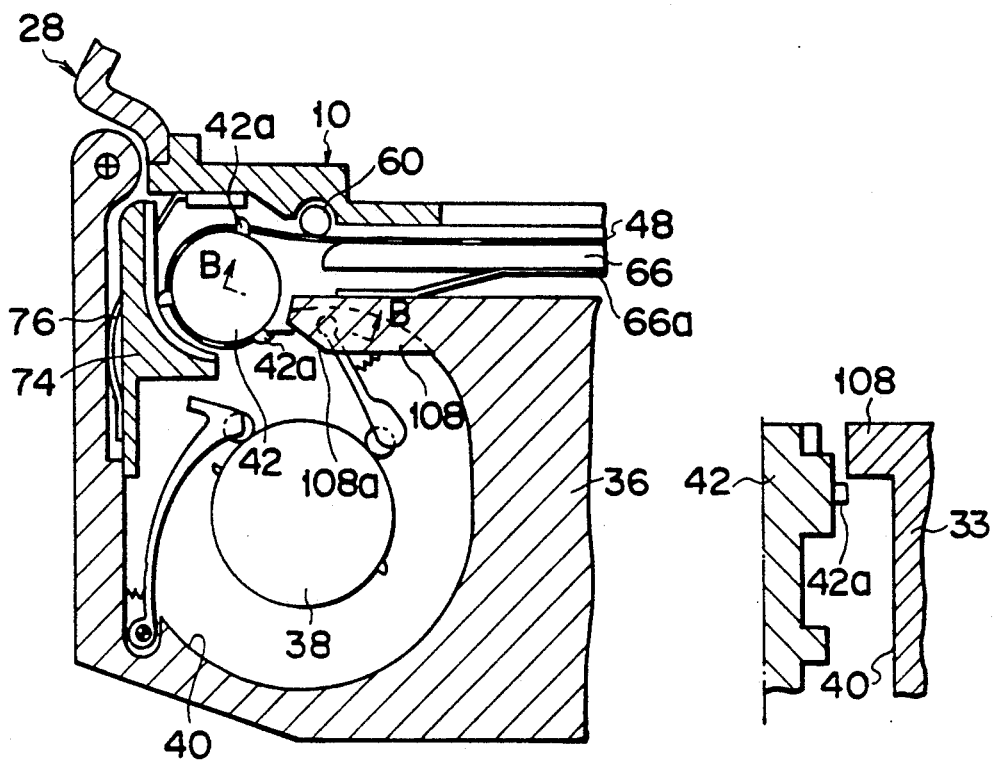
F I G. 25   F I G. 26
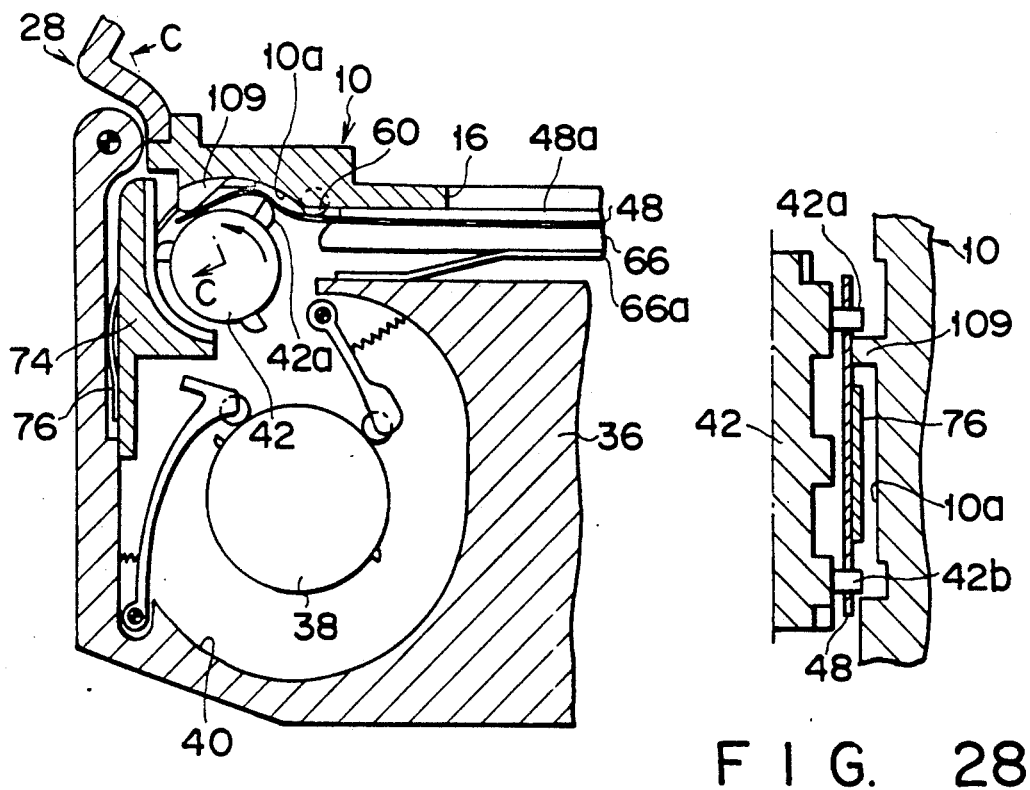
F I G. 27   F I G. 28

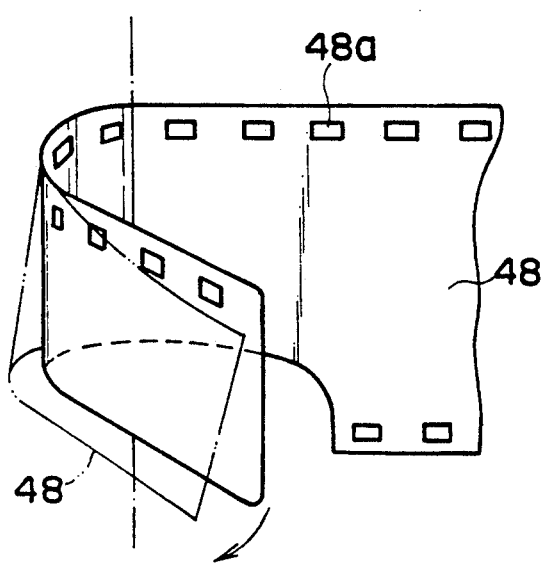
F I G. 31
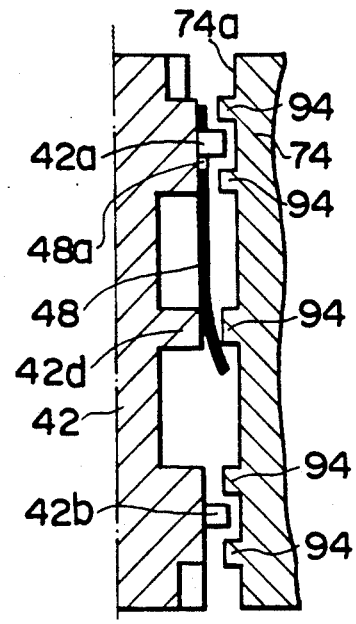
F I G. 32
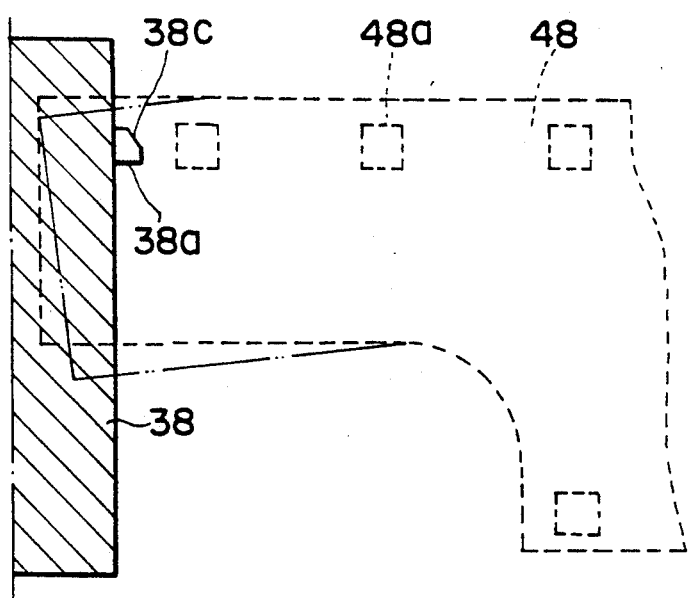
F I G. 33

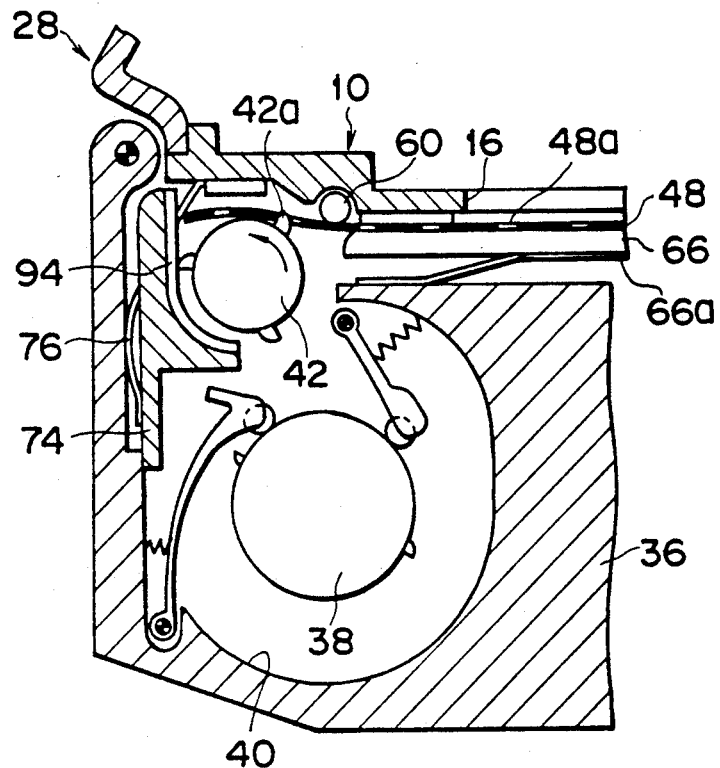
F I G. 34
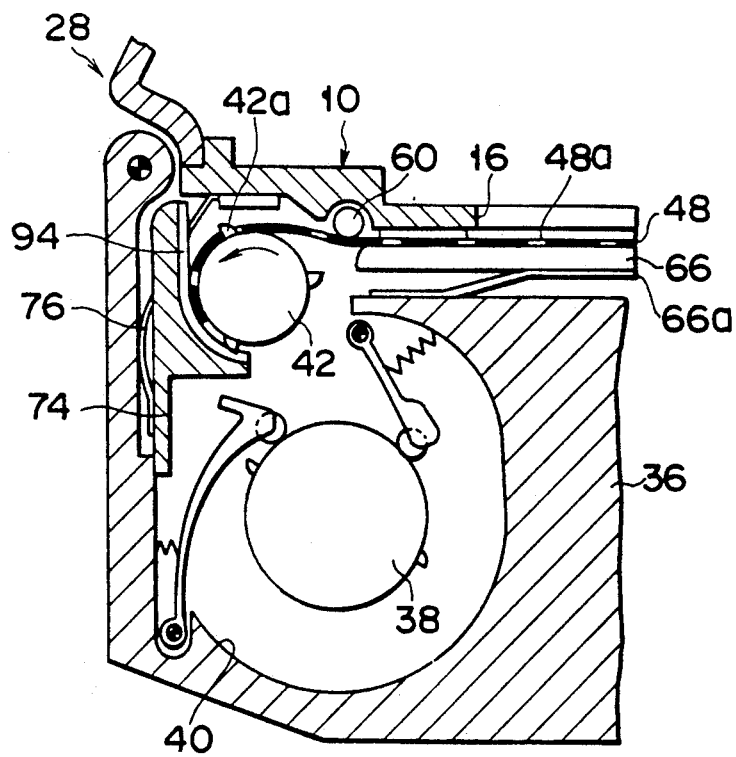
F I G. 35

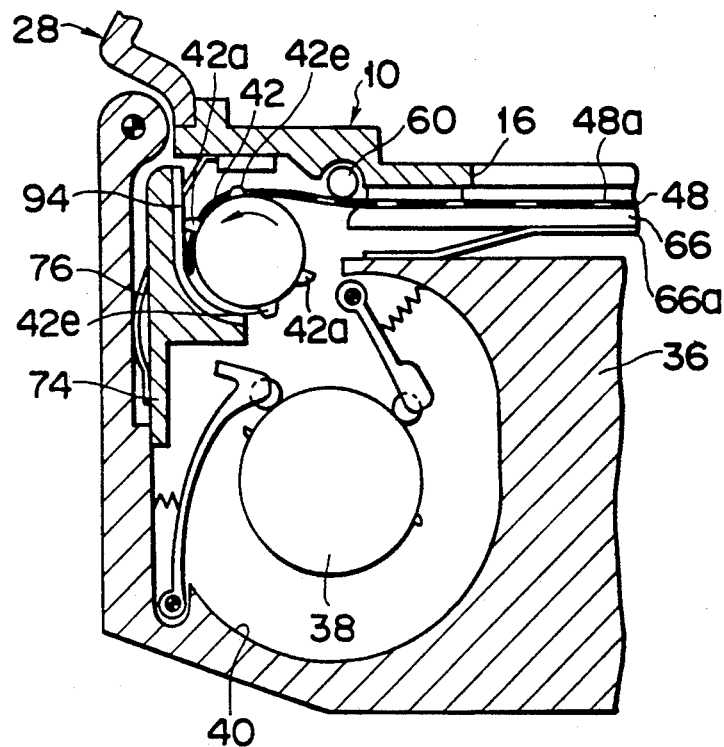
F I G. 42
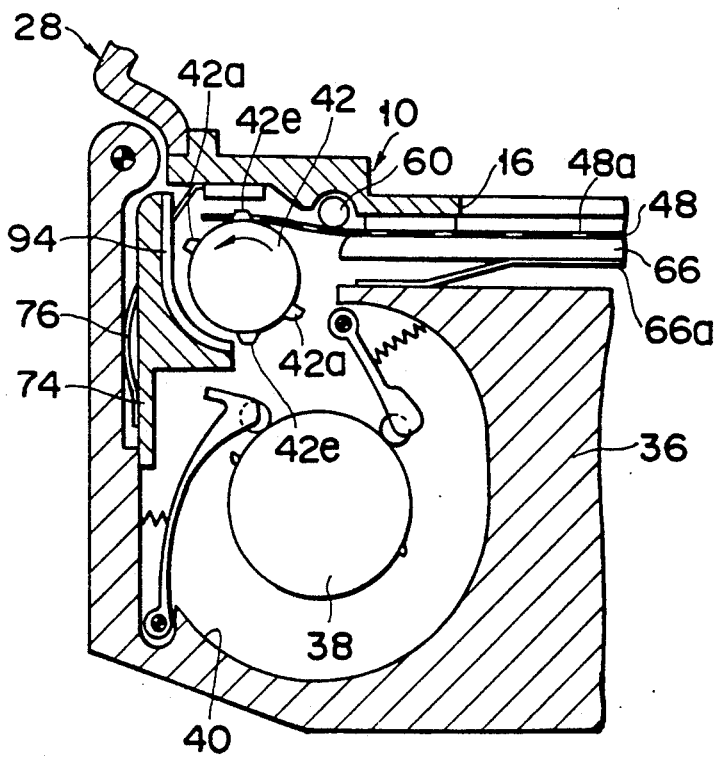
F I G. 43

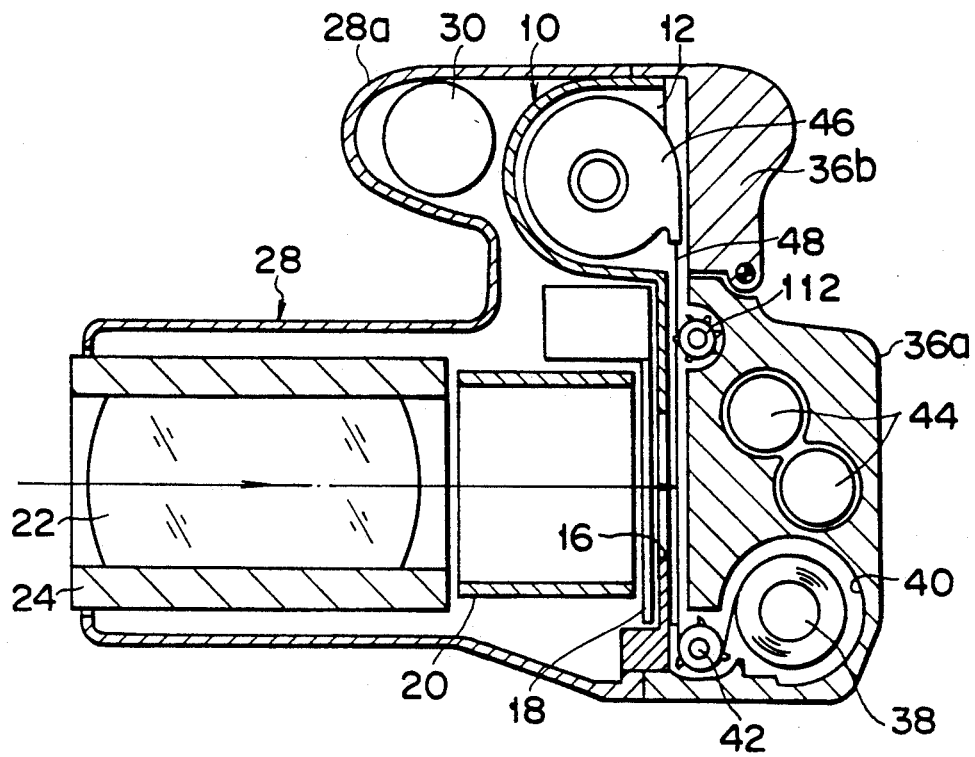
F I G. 48
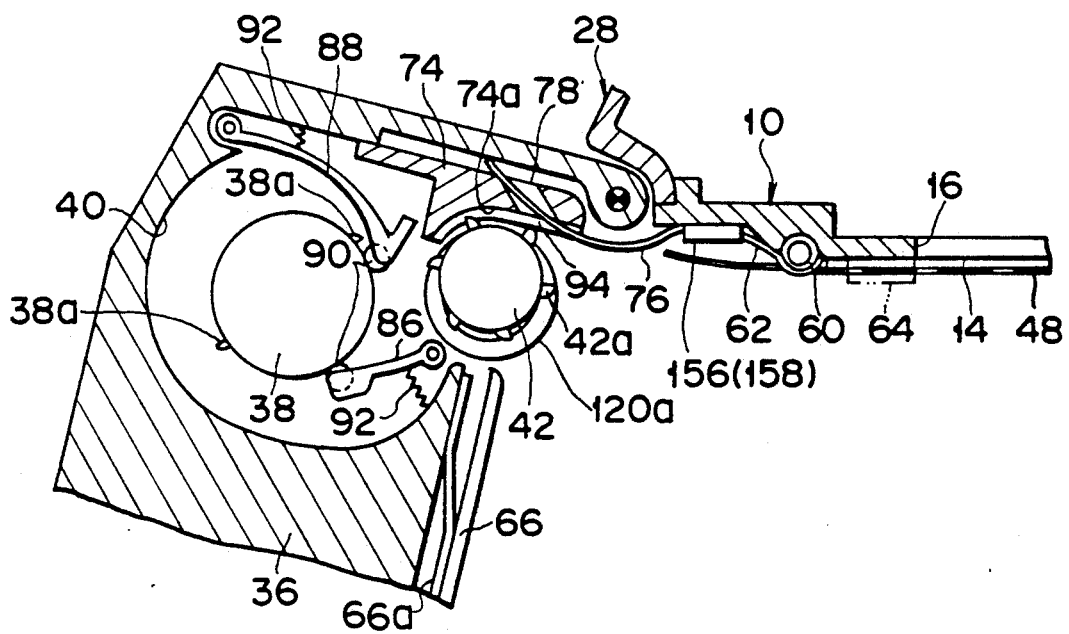
F I G. 49

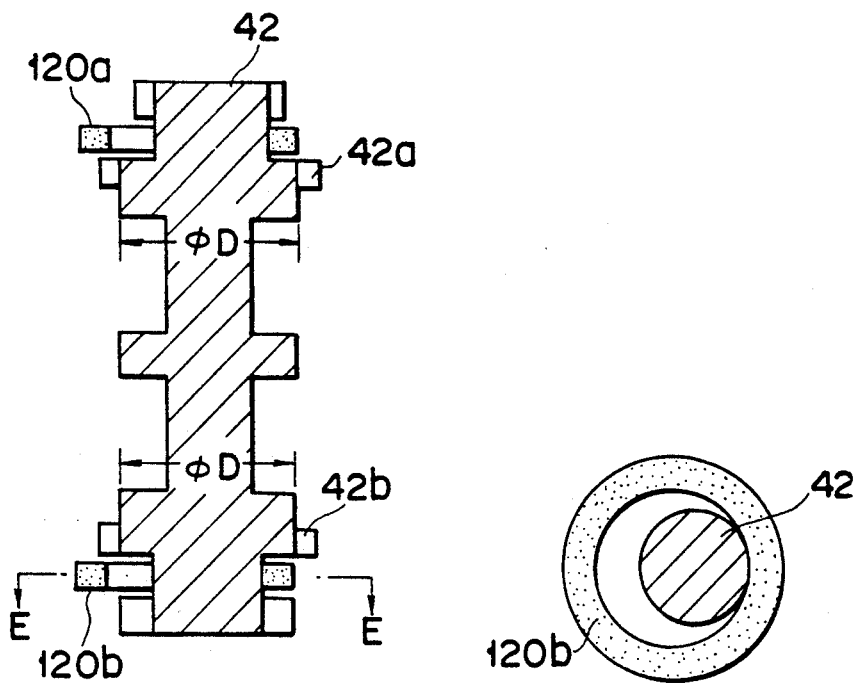
F I G. 50    F I G. 51
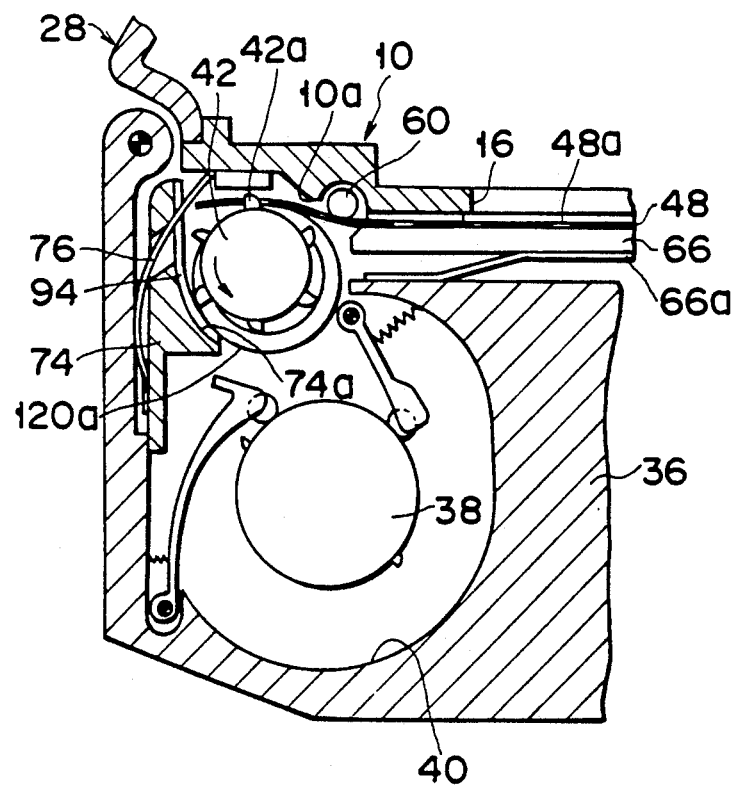
F I G. 52

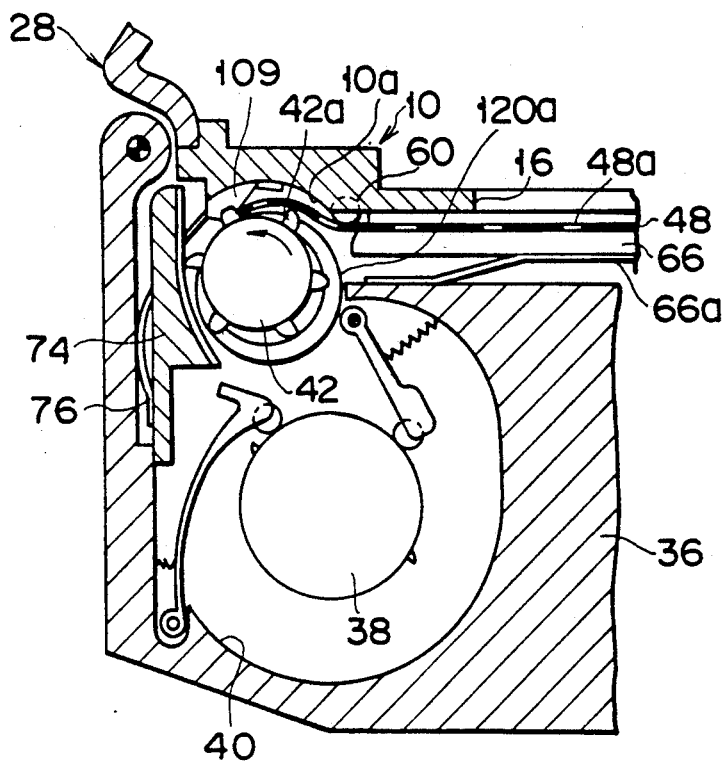
F I G. 57
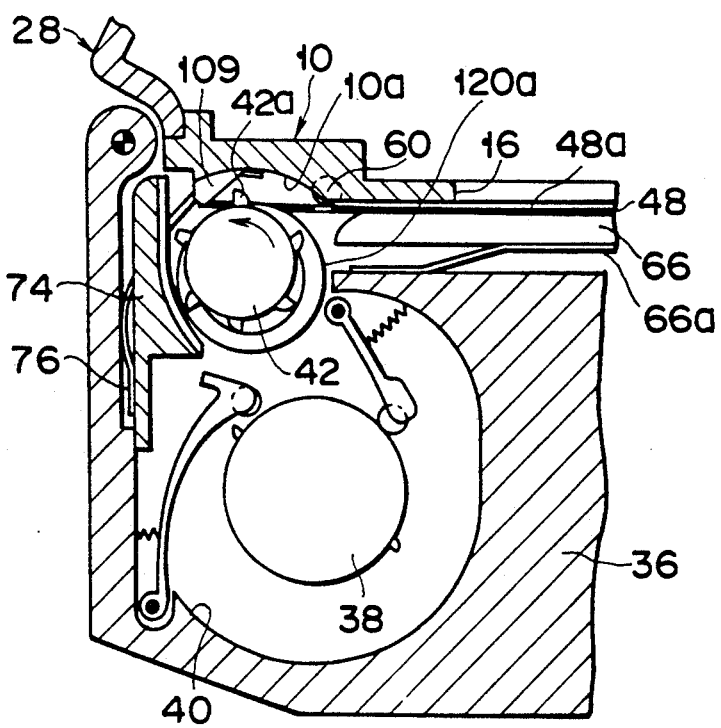
F I G. 58

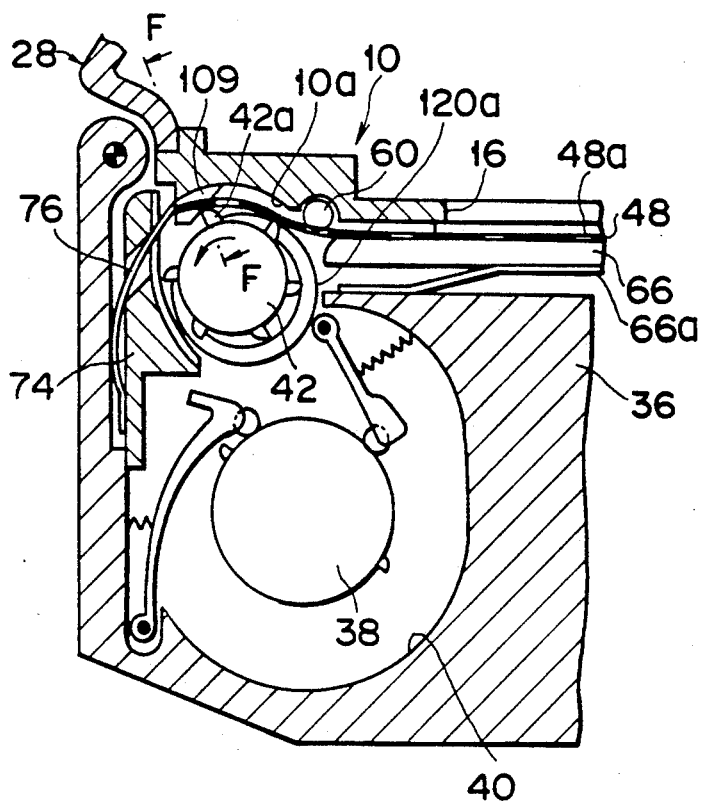
F I G. 59
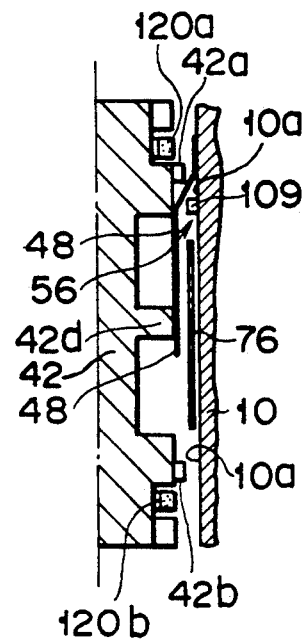
F I G. 60
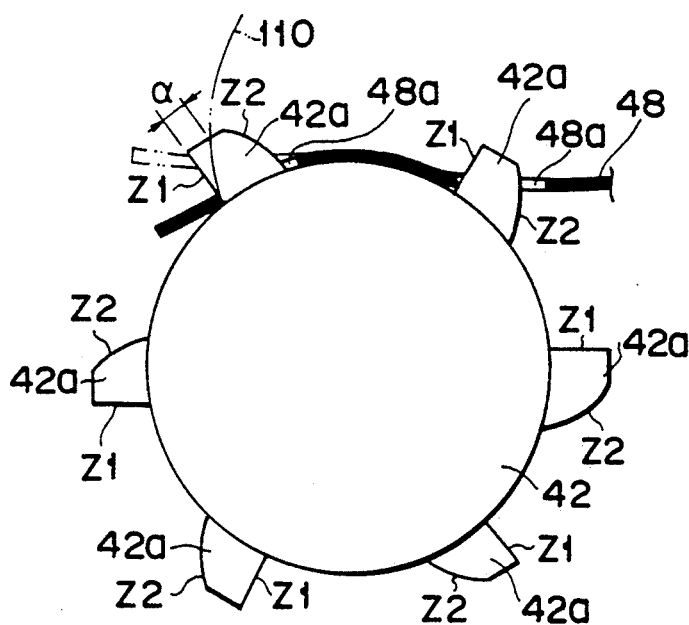
F I G. 61
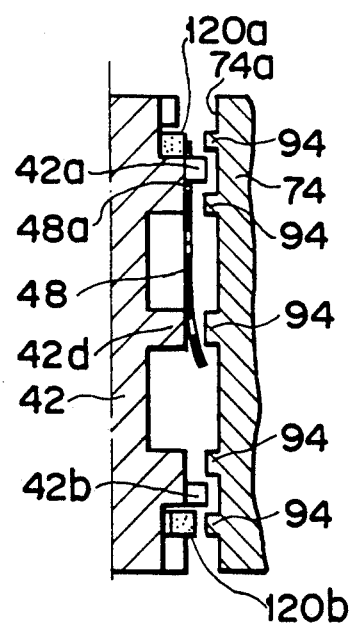
F I G. 62

CAMERA AND FILM WINDING MECHANISM THEREOF

BACKGROUND OF THE INVENTION

1. Field of the Invention

The present invention relates to a camera and a film winding mechanism used in the camera.

2. Description of the Related Art

In the film winding mechanism used for the automatic film loading device in cameras of prior art, a patrone containing chamber and a film take-up spool are located at both sides of a photographing opening formed in a camera body, and both the chamber and the spool are arranged frontside of a film passage extending between the chamber and the spool and opposing the opening. And, the leading end of a film extending through the film passage from the patrone contained in the chamber is first loaded onto the peripheral surface of a film take-up spool by utilizing engaging pawls formed on the peripheral surface of the film take-up spool to engage with the perforations of the film or by utilizing the surface friction of the rubber mounted on the peripheral surface of the spool.

However, in such film winding mechanism of prior art the location of the patrone containing chamber and the film take-up spool makes the size of the camera body in the width direction thereof enlarge, so that a holding balance of the camera is deteriorated when a relatively long lens barrel such as for a telephoto shot is equipped with the camera. Further the leading end of film must be relatively correctly located on a specified position to perform exactly the automatic loading, which has made the film loading in a camera troublesome.

SUMMARY OF THE INVENTION

The present invention has been derived from the above-mentioned circumstances, and the object thereof is to provide a camera and a film winding mechanism thereof capable of making the holding balance of the camera improve and easy the film loading required for exact automatic loading.

In order to achieve the former object of the present invention, a camera according to this invention comprises: a camera body in which an opening is mounted for determining a photographing bundle of ray and for forming a photographing picture, and a patrone containing chamber is located sidewardly adjacent to the opening and is used for containing a patrone to be used for the camera; a sprocket which is located behind an imaginary plane including the opening of the camera body and is used for feeding a film, which is exposed by the photographing bundle of ray passing through the opening, toward the backside of the imaginary plane; and a spool which is located behind the opening and the sprocket and takes up the film, fed toward the backside by the sprocket, with a photographic-emulsion coating surface thereof being located radially inside on the spool.

In order to achieve not only the former object but also the latter object of this invention, a camera according to this invention comprises: a camera body in which an opening is mounted for determining a photographing bundle of ray and for forming a photographing picture, and a patrone containing chamber is located sidewardly adjacent to the opening and is used for containing a patrone to be used for the camera; a sprocket which is located behind an imaginary plane including the opening and is used for feeding a film, which is exposed by the photographing bundle of ray passing through the opening, toward the backside of the imaginary plane; a spool which is located behind the opening and the sprocket and takes up the film, fed toward the backside by the sprocket, with a photographic-emulsion coating surface thereof being located radially inside on the spool; a guide member which is located to surround the sprocket and is used for guiding a leading end of the film; sprocket driving means for rotatably driving the sprocket to feed the film, which is arranged at a predetermined position in a film passage of the camera body, by means of the sprocket along the film passage; and spool driving means for rotatably driving the spool to take up the film, which is fed for a predetermined distance from the sprocket, by means of the spool on the spool.

A film winding mechanism of a camera for achieving the both former and latter objects of this invention comprises: a rotation drive source having an output gear; a planetary gear revolving on a specified orbit by a rotational force transmitted from the output gear of the rotation drive source; a film feed sprocket having an input gear located on the orbit of the planetary gear; a film take-up spool having an input gear which is located at a position separated in the peripheral direction from the input gear of the film feed sprocket and on the orbit of the planetary gear; film feed distance measurement means for measuring a specified film feed distance by the film feed sprocket; and rotation drive source control means which is connected to the rotation drive source and the film feed distance measurement means, which engages the planetary gear with the input gear of the film feed sprocket by controlling the rotation drive source in a manner to rotate the output gear in one direction when a rear cover of the camera is closed, which feeds film by means of the film feed sprocket by transmitting the rotational force from the rotation drive source to the film feed sprocket, which then engages the planetary gear with the input gear of the film take-up spool by controlling the rotation drive source in a manner to rotate the output gear in the other direction when the control means receives a film feed distance measuring distance signal from the film feed distance measurement means, and which takes up the film fed for a specified distance from the film feed sprocket on the film take-up spool by transmitting the rotational force from the rotation drive source to the film take-up spool, or comprises: a movable member which is provided to be approachable to and separable from film located at a specified position in a film passage of a camera body, and is moved from a separated position to an approaching position when an automatic film loading task starts; a sprocket which is supported rotatably on the movably member, comes in contact with a surface of the film located at the specified position in the film passage of the camera body, the surface being not coated with a photographic emulsion, when the movable member is located in the approaching position, and has engaging pawls engaging with perforations of the film; and sprocket drive means which drives rotatably and selectively the sprocket to feed the film along the film passage by the sprocket in a condition that the movable member is located in the approaching position, or comprises: a movable member which is provided approachable to and separable from film located at a specified position in a film passage of a camera body, and is moved from a separated position to an approaching position when an automatic film loading task starts; a sprocket which is supported rotatably by the movable member, comes in contact with a surface of the film located at the specified position in the film passage of the camera body, the surface being not coated with a photographic emulsion, when the movably member is located in the approaching position, and has engaging pawls engaging with perforations of the film; and sprocket drive means which drives rotatably and selectively the sprocket to feed the film along the film passage by the sprocket in a condition that the movable member is located in the approaching position; and wherein; the engaging pawls of the sprocket, which engage with the perforations formed only in a leader of a leading end portion of the film located at the specified position in the film passage of the camera body, are provided in a manner to engage with groups in a plurality of openings of the perforations, each group being consisted of two openings adfancet to each other, and the groups being located at intervals of at least a double of a distance from an opening to the next one; the engaging surface of each engaging pawls which engage with one opening located at the tip side of the film in one group of the plurality of openings of the perforations, is composed of a line whose curvature is smaller than that of an involute curve with a diameter of the sprocket taken as a basic circle thereof, and the engaging surface of the other engaging pawl, which engage with the remaining one opening in the above described one group is composed of the involute curve; and a relief portion is provided in a part of the camera body opposed to the sprocket when the movable member is located in the approaching position, the relief portion accommodating the engaging pawls protruding into the photographic emulsion coated surface side from the openings of the perforations in on the leader of the leading end portion of the film to prevent the part from being in contact with the protruding ends of the engaging pawls, or comprises: a spool which is coated on one end of a film passage opposed to photographing lenses and on the backside of the film passage in a manner to take up film transferred through the film passage from a film patrone chamber loated on the other end of the film passage; a sprocket which is arranged between the spool and the film passage and includes engaging pawls on the film on an outer peripheral surface of the ends thereof to engage with perforations formed in the film; guide rings which are loosely fitted on the sprocket in such a manner that the rotating center axis thereof is movable within a specified range, and which have an outer diameter larger than the outer diameter of the sprocket so that the guide rings abut on the surface of the film curved along the sprocket to make large the radius of curvature of the film; and a drive mechanism which drives the spool to take up the film, transferred from the sprocket and the guide rings on the spool, or comprises: a rotation drive source having an output gear; a planetary gear mechanism having a sun gear to which the rotational force is transmitted from the output gear of the rotation drive source, a planetary gear linked by a planetary arm to the sun gear while engaging with the sun gear, and an internal gear support member including an arc-shape internal gear located outside the planetary gear in the radial direction of the sun gear to be engaged with the planetary gear rotating around the sun gear; a film feed sprocket having an input gear located outside the one end of the internal gear support member on an orbit of the planetary gear in the planetary gear mechanism; a film take-up spool having an input gear located outside the other end of the internal gear support member on the orbit of the planetary gear in the planetary gear mechanism; and rotation drive source control means which is connected to the rotation drive source, which engages the planetary gear with the input gear of the film feed sprocket by controlling the rotation drive source in a manner to rotate the output gear in one direction when a rear cover of the camera is closed, which feeds film for a specified distance by means of the film feed sprocket by transmitting the rotational force from the rotation drive source to the film feed sprocket, and then engages the planetary gear with the input gear of the film take-up spool by controlling the rotation drive source in a manner to rotate the output gear in the other direction, and which takes up the film fed for a specified distance from the film feed sprocket on the film take-up spool by transmitting the rotational force from the rotation drive source to the film take-up spool, and controls the rotation drive source until the planetary gear of the planetary gear mechanism is engaged with the internal gear of the internal gear support member, when a rear cover of the camera is moved to its open position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic horizontal sectional view of a camera according to one embodiment of the present invention;

FIG. 2 is a schematic longitudinal sectional view of the camera in FIG. 1;

FIG. 11 is a schematic view showing a control circuit of the drive system in FIG. 9;

FIG. 12 is a schematic horizontal sectional view showing a state of the closing of the rear cover for automatic film loading of the camera in FIG. 3;

FIG. 14 is a schematic plan view showing a condition in which the sprocket shaft of the film feed mechanism is driven by the drive system in FIG. 9 in the first half of the automatic loading task;

FIGS. 15, 16 and 17 are schematic enlarged horizontal sectional views showing sequentially a state in which the leading end of the film in a specified position of the film passage is fed onto the spool of the film winding mechanism by the sprocket shaft of the film feed mechanism in the first half of the automatic loading task

FIG. 25 is a schematic enlarged horizontal sectional view showing a guide member which separates the film leading end wound round the sprocket shaft in a high temperature and humidity condition in the first half of the automatic film loading from sprocket shaft and allows the leading end to be moved to the spool;

FIG. 26 is a schematic longitudinal sectional view of the guide member in FIG. 25;

FIG. 27 is a schematic enlarged horizontal sectional view showing a film guide protrusion provided protrusively into the film passage in the camera body correspondingly to the sprocket shaft;

FIG. 28 is a schematic longitudinal sectional view of the film guide protrusion in FIG. 27;

FIG. 31 is a schematic enlarged perspective view showing a state in which the film leading end opens the lower edge thereof outward in the radial direction of the sprocket shaft on the sprocket shaft immediately after the start of the automatic film loading task;

FIG. 32 is a schematic enlarged longitudinal sectional view showing the film guide rails on the film guide member provided oppositely to the sprocket shaft on the rear cover of the camera in FIG. 1 in order to prevent the film inclination shown in FIG. 31;

FIG. 33 is a schematic enlarged side view showing the configuration of each spool pawl devised to eliminate the unsuccessful engagement of the engaging pawls on the upper end of the spool with the perforations on the upper edge of the film leading edge resulting from the curvature of the leading end immediately after the start of the automatic film loading task;

FIGS. 34 and 35 are schematic enlarged horizontal sectional views showing sequentially a state in which the sprocket pawls on the upper edge of the sprocket shaft are successfully engaged with the perforations on the upper edge of the film leading end by the action of the film guide rails on the film guide member of the camera rear cover immediately after the start of the automatic film loading task;

FIG. 42 is a schematic enlarged horizontal sectional view showing a first condition immediately after the start of the automatic film loading task by the sprocket pawls in FIG. 40;

FIGS. 43, 44 and 45 are schematic enlarged horizontal sectional views showing a second condition in the first half of the automatic film loading task by the sprocket pawls in FIG. 40;

FIG. 48 is a schematic plan view showing a modification of a camera according to one embodiment of the present invention;

FIG. 49 is a schematic enlarged horizontal sectional view showing a major appearance of the film winding mechanism and the film feed mechanism provided on the rear cover where a sprocket with a guide ring has been employed in the camera in FIG. 1;

FIG. 50 is a longitudinal sectional view showing a sprocket with guide rings;

FIG. 51 is a sectional view taken along line E-E of FIG. 50;

FIGS. 52, 53 and 54 are schematic enlarged horizontal sectional views showing sequentially a state in which the film leading end at a specified position of the film passage is fed onto the spool of the film take-up mechanism by the sprocket shaft of the film feed mechanism in the first half of the automatic loading;

FIG. 57 is a schematic enlarged horizontal sectional views showing a film guide protrusion provided protrusively into the film passage on the camera body correspondingly to the sprocket shaft;

FIG. 58 is a schematic enlarged horizontal sectional view showing a condition in which the sprocket pawls on the upper edge of the sprocket shaft has been successfully engaged with the perforations on the upper edge of the film leading end by the action of the film guide protrusion in FIG. 24 immediately after the start of the automatic film loading task;

FIG. 59 is a schematic horizontal sectional view showing a condition in which the sprocket pawls on the upper edge of the sprocket shaft of the film feed mechanism has not engaged with the perforations on the upper edge of the film leading end immediately after the start of the automatic loading task;

FIG. 60 is a schematic longitudinal sectional view taken along line F—F of FIG. 59;

FIG. 61 is a schematic plan view showing a condition in which the sprocket pawls devised in a manner to engage successfully the sprocket pawls on the upper edge of the sprocket shaft with the perforations on the upper edge of the film leading edge immediately after the start of the automatic film loading task are arranged at the same pitch as that of the film perforations;

FIG. 62 is a schematic enlarged longitudinal sectional view showing the film guide rails on the film guide member provided oppositely to the sprocket shaft on the camera rear cover in order to prevent the inclination due to the film leader curving immediately after the start of the film loading task;

DETAILED DESCRIPTION OF THE PREFERRED EMBODIMENTS

Figure 3:
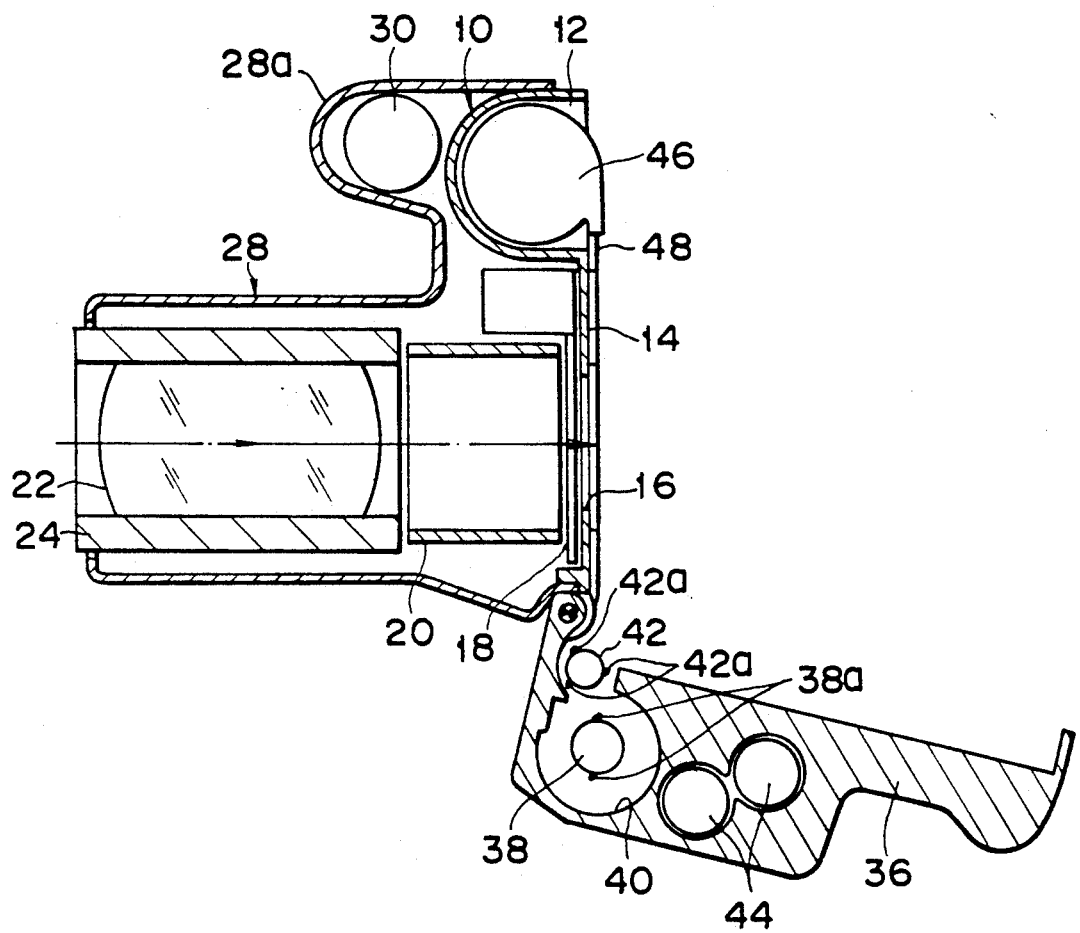
FIG. 3 is a schematic horizontal sectional view showing a condition in which the rear cover is opened and film is mounted on a specified position of a film passage in the camera in FIG. 1.

With reference to attached drawings, cameras according to various embodiments and modifications of the present invention will be explained in detail hereinafter.

In a camera according to a first embodiment of the present invention, as shown in FIGS. 1 and 2, a patrone containing chamber 12 is formed o the right side of the back of a camera body chasses 10, and a film passage 14 is defined along said back from the patrone containing chamber 12 to the left end of the back.

A photographing opening 16 penetrated to the film passage 14 of the rear is formed in the front of the camera body chassis 10, and covered with a focal plane shutter unit 18 located on the front.

In the front of the camera body chassis 10, are supported a mirror box 20 holding a main mirror 19 located in front of the focal plane shutter unit 18, and a lens mirror frame 24 supporting a photographing lends group 22 located in front of the mirror box 20. The mirror box 20 holds a screen mat 20a on the upper opening.

On the upper surface of the camera body chassis 10, are located a plurality of special-shape mirrors 26a, 26b and 26c composing a finder optical system above the screen mat 20a of the mirror box 20.

A camera body sheath housing 28 covering various members supported on the front and the upper surface of the camera body chassis 10 as described above expands in front of the patrone containing chamber 12 to compose a grip section 28a. A main capacitor 30 for strobe is housed in the gap created between the protruding end of the grip section 28a and the patrone containing chamber 12 in the internal space covered with the grip section 28a, and a strobe 32 is supported releasably on the upper surface of the camera body sheath housing 28.

A strobe reflecting shade 32a of the strobe 32 is positioned in the concavity of the upper surface and protected from an external force when the strobe 32 is located in the closed position indicated with solid line in FIG. 2, and is separated from the concavity of the upper surface and directed in front of the camera when the strobe 32 is located in the open position indicated with two-dot chain line in FIG. 2.

The camera body sheath housing 28 supports an eyepiece 34 at the position opposite to the mirror 26c located in the final position of the finder optical system.

The back of the camera body chassis 10 is covered with a rear cover 36 supported pivotably on the left end of the back, and the rear cover 36 is held in the closed position as shown in FIGS. 1 and 2 by a rear cover lock member which is not shown in FIGS. 1 and 2 and provided on the right end of the camera body chassis 10.

On the left end of the rear cover 36, is formed a spool containing chamber 40 containing rotatably a spool 38, and the spool containing chamber 40 has an opening on the left end of the film passage 14 in rear of the camera body chassis 10. A sprocket 42 is located in the opening of the spool containing chamber 40, and the sprocket 42 and the spool 38 are selectively driven by drive means described later which is not shown in FIGS. 1 and 2 located in the rear cover 36.

Further, in the rear cover 36, are housed batteries 44 for the major power supply of the camera.

In the camera of the embodiment described above, the patrone containing chamber 12 is located on one end of and in front of the film passage 14, and the sprocket 42 and the spool containing chamber 40 are located on the other end of and in rear of the film passage 14. Film 48 pulled out of a patrone 46 contained in the patrone containings chamber 12 is extended in the film passage 14 toward the sprocket 42 and wound around the peripheral surface of the sprocket 42, whereby the film 48 is caused to be moved to the spool 38, and wound round the spool 38 in a condition that a photographic emulsion coated surface thereof is faced inward in the radial direction of the spool 38.

When a shutter button not shown is urged which is provided on the upper surface of the grip section 28a on the camera body sheath housing 28, the main mirror 19 in the mirror box 20 is pivoted upward from the position shown in FIG. 1, and then the focal plane shutter unit 18 is opened.

As a result, an image having been captured by the photographing lens group 22 and seen through the eyepiece 34 immediately before the urging of the shutter button is photographed on a one-frame region of the film 48 opposed to the photographing opening 16 of the film passage 14.

After an exposure time has lapsed which is based on the exposure signal from an exposure meter located on the screen mat 20a in the upper opening of the mirror box 20 or in a proper position of the camera body sheath housing 28, the main mirror 19 and the focal plane shutter unit 18 are reset to the downward position and closed, respectively, as shown in FIG. 2.

When the photographing of the one-frame of the film 48 is finished, the spool 38 is rotatably driven, and takes up by one-frame the photographed region of the film 48 guided toward the spool by the freely rotating sprocket 42 from the film passage 14 in a condition that the hotpgraphic emulsion coated surface is faced inward in the radial direction of the spool 3 described above.

The camera of the above-mentioned embodiment is of the automatic film loading system. When a new patrone 46 is loaded in the camera of the above-mentioned embodiment, the rear cover 36 is pivoted to the open position in such a manner that the patrone containing chamber 12 and the film passage 14 in back of the camera body chassis 10 are exposed as shown in FIG. 3.

After the new patrone 46 is correctly contained in the patrone containing chamber 12, the film 48 having been pulled out of the patrone 46 is allowed to be extended along the film passage 14 to the left end of the back. Then, the rear cover 36 is allowed to be pivoted to the closed position, and held in the closed position by the above-mentioned rear cover lock member which is not shown in FIGS. 1 and 2 and provided on the right end of the camera body chassis 10.

The pivoting of the rear cover 36 to the closed position causes the sprocket 42 to engage engaging pawls 42a formed on the peripheral surface thereof with the perforations of the leading end of the film 48 in the film passage 14. Then, the closed-position holding operation of the above-mentioned rear cover lock member causes the above-mentioned drive means not shown FIGS. 1 and 2 to drive first the sprocket 42. This causes the leading end of the film 48 in the film passage 14 to be fed by the sprocket 42 toward the spool 38 in the spool contained chamber 40.

After a sufficient time for the leading end of the film 48 to reach the spool 38 has been lapsed, the above-mentioned drive means not shown in turn drives the spool 38 in stead of the sprocket 42 to make the sprocket 42 freely rotatable. Thus, engaging pawls 38a formed on the peripheral surface of the spool 38 engage with the perforations of the leading end of the film 48 having reached to the spool 38, thereby the leading end is taken up around the peripheral surface of the spool 38.

After a sufficient time for the leading end of the film 48 to be taken up around the peripheral surface of the spool 38 has been lapsed without developing take-up releasing, the above-mentioned drive means not shown stops the drive for the spool 38. With such procedure, the automatic film loading task is performed.

Figure 4:
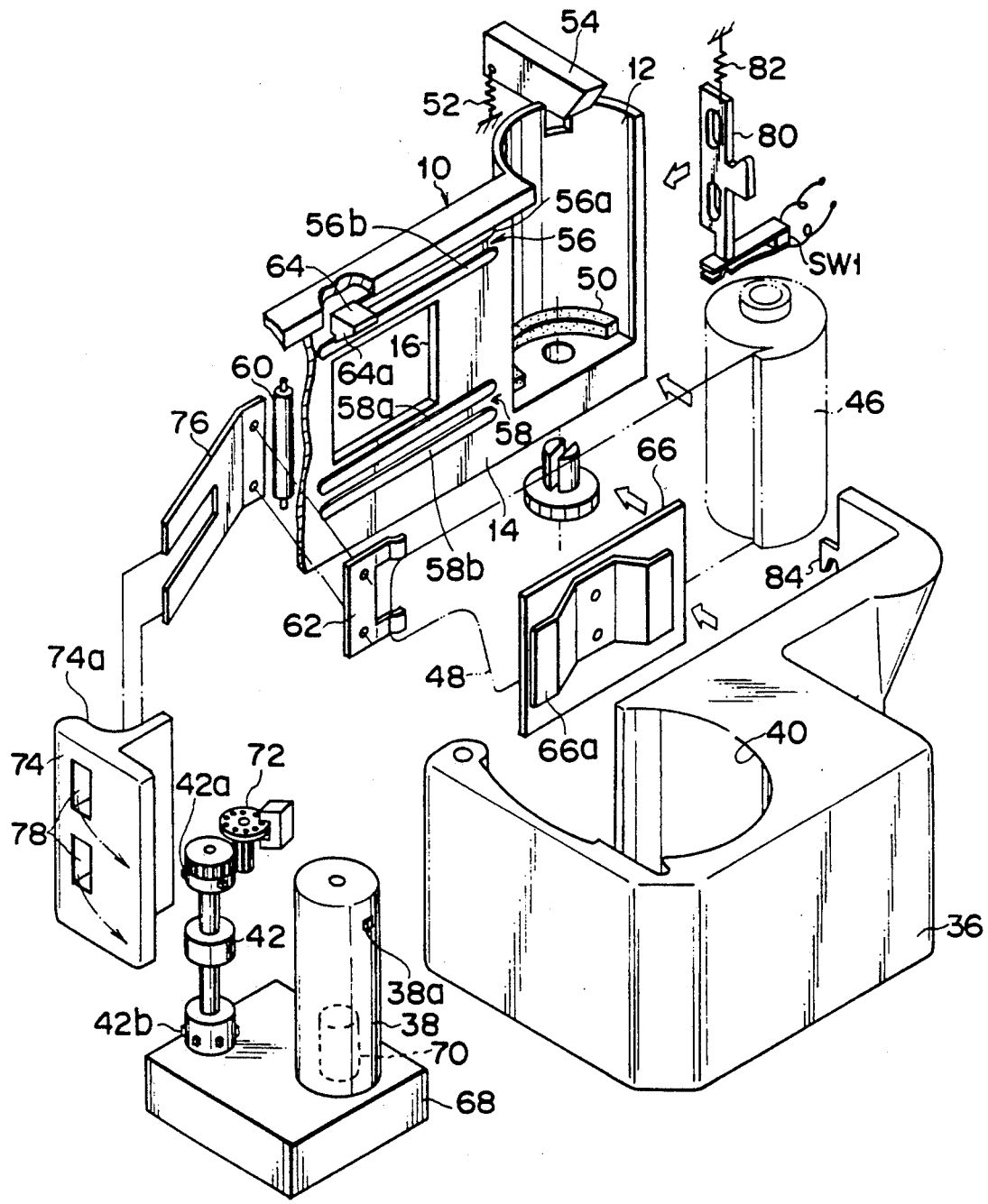
FIG. 4 is a schematic exploded perspective view showing a film winding mechanism and a film feed mechanism relating to an automatic loading device located near a film passage in the camera in FIG. 1.

FIG. 4 shows enlarged major parts of the back of the camera body chassis 10 defining the film passage 14 and of the rear cover 36 opposite to the back.

As shown in FIG. 4, a lower patrone cartridge setter 50 of a high-friction material such as rubber and felt is mounted on the lower surface of the patrone containing chamber 12, and an upper cartridge setter 54 urged downward by a spring 52 is located on the upper end of the patrone containing chamber 12. These upper patrone setter 54 and lower containing setter 50 hold the patrone 46 mounted in a correct attitude at a specified position in the patrone containing chamber 12 in a manner to keep them in the correct attitude at the specified position.

On the back of the camera body chassis 10, are provided protrusively into the film passage 14 two upper and lower pairs of an upper guide rail pair 56 and a lower guide rail pair 58 which are extended along the upper and lower edges of the photographing opening 16, respectively. In this embodiment, a lower guide rail 56b of the upper guide rail pair 56 is approximately the same in length as two guide rails 58a and 58b of the lower guide rail pair 58, while an upper guide rail 56a of the upper guide rail pair 56 has a portion thereof on the left end side of the film passage 14 shorter than that of the lower guide rail 56b. In the two upper and lower pairs of the guide rail pairs 56 and 58, the two guide rail 56b and 58a adjacent vertically to each other with the photographing opening 16 between function as a film rail surface guiding the upper and lower edges of the film 48. The other two guide rails 56a and 58b located outside said two guide rails 56b and 58a are protruded behind the two guide rails 56b and 58a approximately by the thickness of the film 48, and the upper and lower edges of a pressure plate 66 provided through a pressure plate setting spring 66a on the inside surface of the rear cover 36 are abutted by the movement of the rear cover 36 to the closed position, whereby the pressure plate 66 is positioned in the optical axis direction.

A guide roller 60 extended vertically near the left end of the upper and lower guide rail pairs 56 and 58 is located on the loft end of the film passage 14 on the back of the camera body chassis 10, and the guide roller 60 is supported rotatably at the upper and lower ends thereof by a guide roller setter 62 on the back. The back end (film contacting end) of the peripheral surface of the guide roller is positioned in the same plane with the two guide rails 56b and 58a to guide the film 48.

An upper film setter 64 which defines the upper end and protrudes into the film passage 14 is formed on the left end of the upper guide rail 56a of the upper guide rail pairs 56 on the back of the camera body chassis 10. The protruding end of the upper film setter 64 is bent downward to compose a film floating preventive protrusion 64a.

Figure 5:
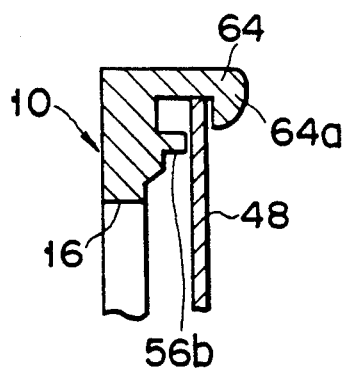
FIG. 5 is a schematic enlarged longitudinal sectional view showing a condition in which the upper edge of the film located on a specified position in the film passage is prevented from being separated from the film passage by a film setter located on the upper edge of the film passage of the camera in FIG. 1.

The leading edge of the film 48 extended along the film passage 14 from the cartridge 46 mounted in a correct attitude at a specified position in the patrone containing chamber 12 is restricted from being bent upward by allowing the upper end thereof to be in contact with the upper film setter 64 and is prevented from floating in back of the camera body chassis 10 from the film passage 14 by the film floating preventive protrusion 64a of the upper film setter 64, as shown in FIG. 5.

The pressure plate 66 mounted through the pressure plate setting spring 66a on the inside surface of the rear cover 36, when the rear cover 36 is located in the above-mentioned closed position, abuts the upper and lower edges on the upper guide rail 56a and the lower guide rail 58b by the elastic force of the pressure plate setting spring 66a, and abuts the film 48 in the film passage 14 on the pair of the guide rails 56b and 58a adjacent vertically to each other with the photographing opening 16 being interposed therebetween. As a result, the film 48 is also abutted on the guide roller 60 outside the pressure plate 66.

FIG. 4 shows a state in which the spool 38 housed in the spool containing chamber 40 of the rear cover 36 and the sprocket 42 located in the inlet opening of the spool containing chamber 40 are unitized by a common drive mechanism 68.

The spool 38 is of a hollow cylindrical shape, and a bidirectional motor 70 as a drive source of the drive mechanism 68 is located concentrically with the spool 38 in the internal space of the spool 38.

As shown in FIG. 4, the engaging pawls 42a and 42b for engaging with the perforations on the upper and lower edges of the film 48 are formed in respective arrangements on the upper and lower ends of the peripheral surface of the sprocket 42.

Figure 6:
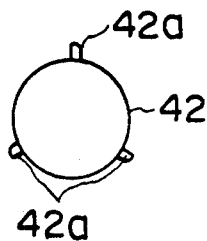
FIGS. 6 and 7 are schematics plan views showing only the arrangement of sprocket pawls located on the peripheral surface of the upper and lower ends of a sprocket shaft shown in FIG. 4.
Figure 7:
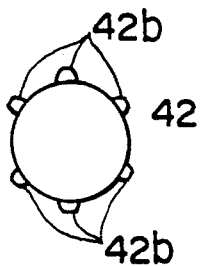

As shown in FIG. 6, the three engaging pawls 42a on the upper end of the peripheral surface of the sprocket are arranged at equal intervals in the peripheral direction, and the six engaging pawls 42b on the lower end of the peripheral surface of the sprocket 42 are arranged at equal intervals in the peripheral direction. The three engaging pawls 42a on the upper end engage with every other one of a plurality of engaging holes of the perforations on the upper edge of the film 48, and the six engaging pawls 42b on the lower end engage continuously with a plurality of engaging holes of the perforations on the lower edge of the film 48.

The planar configuration of the engaging pawls 42a on the upper end is different from that of the engaging pawls 42b on the lower end, which will be explained in detail.

As shown in FIG. 4, to the upper section of the sprocket 42, is connected a sprocket rotation measuring unit 72 utilizing a photointerruptor.

FIG. 4 also shows a film guide member 74 mounted in the inlet opening of the spool containing chamber 40 of the rear cover 36 in a manner to be opposed to the sprocket 42. A concavely curved guide surface 74a on the film guide member 74 opposed to the sprocket 42 has a curved surface along the peripheral surface of the sprocket 42.

On the left end of the back of the camera body chassis 10, are fixed the guide roller setter 62 and a film guide sheet 76 in order to fill up the gap developed between the left end of the back of the camera body chassis 10 and the left end of the rear cover 36 connected thereto, and on the guide surface 74a on the film guide member 74, are formed film guide sheet insert openings 78 into which the free ends of the film guide sheet 76 are inserted.

FIG. 4 further shows the above-mentioned rear cover lock member 80 for holding the rear cover 36 in closed position. The rear cover lock member 80 is mounted vertically movably on the right end surface of the camera body chassis 10, and urged upward by urging means 82. On the lower end of the rear cover lock member 80, is located a rear cover switch SW1 connected to later-mentioned control means connected to the drive mechanism 68 common for the spool 38 and the sprocket 42.

The rear cover lock member 80, when the rear cover 36 has moved from the open position to the closed position, is urged by an engaging pawl 84 formed on the right end of the rear cover 36 and moved downward once to cause the rear cover switch SW1 to be urged, thereby turning on the rear cover switch SW1. When the rear cover 36 reaches the closed position, the downward urge of the rear cover lock member 80 by the engaging pawl 84 of the rear cover 36 is released, whereby the rear cover lock member 80 is moved upward by the urging force of the urging means 82 until the member engages with the engaging pawl 84 of the rear cover 36.

Figure 8:
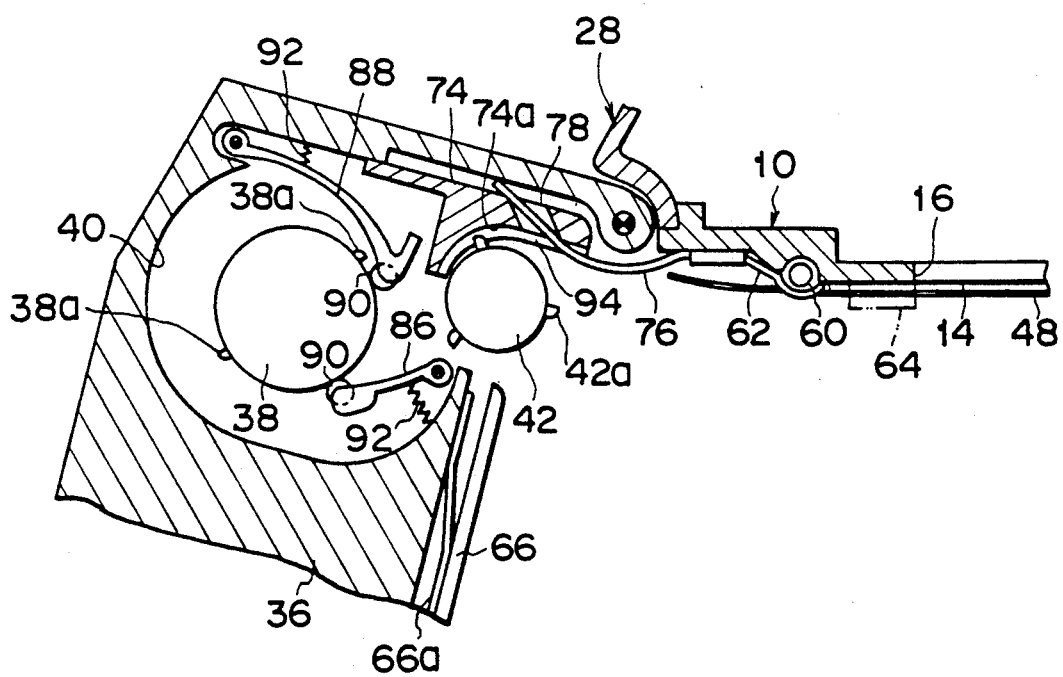
FIG. 8 is a schematic enlarged horizontal sectional view showing a major appearance of the film winding mechanism and the film feed mechanism provided on the rear cover of the camera in FIG. 1.

In FIG. 8 showing the enlarged left end of the rear cover 36 and the enlarged left end of the back of the camera body chassis 10 when the rear cover 36 is located in the open position for the automatic film loading task, are shown a first setting lever 86 which is extended from the inlet of the spool containing chamber 40 to the farthest position from the inlet on the peripheral surface of the spool 38 and located in the spool containing chamber 40 of the rear cover 36, and a second film setting lever 88 which is extended from the farthest position from the inlet of the spool containing chamber 40 toward the position near the inlet on the peripheral surface of the spool 38, located on the internal surface of the spool containing chamber 40 and opposed to the first film setting lever 86 with the spool being interposed therebetween.

The first and second film setting levers 86 and 88 are supported pivotably by the internal surface of the spool containing chamber 40 at the base end thereof on the insurface, and supported rotatably by the spool at film setting roller 90 on the free end thereof.

Also, the first and second film setting levers 86 and 88 are urged in such a manner that the film setting roller 90 on the free end is urged on the peripheral surface of the spool 38 by an urging member 92 located between the internal surface of the spool containing chamber 40 and the levers.

Although FIG. 8 also shows part of a film guide rail 94 formed on the guide surface 74a of the film guide member 74, the detail of the film guide rail 94 will be explained later.

Figure 9:
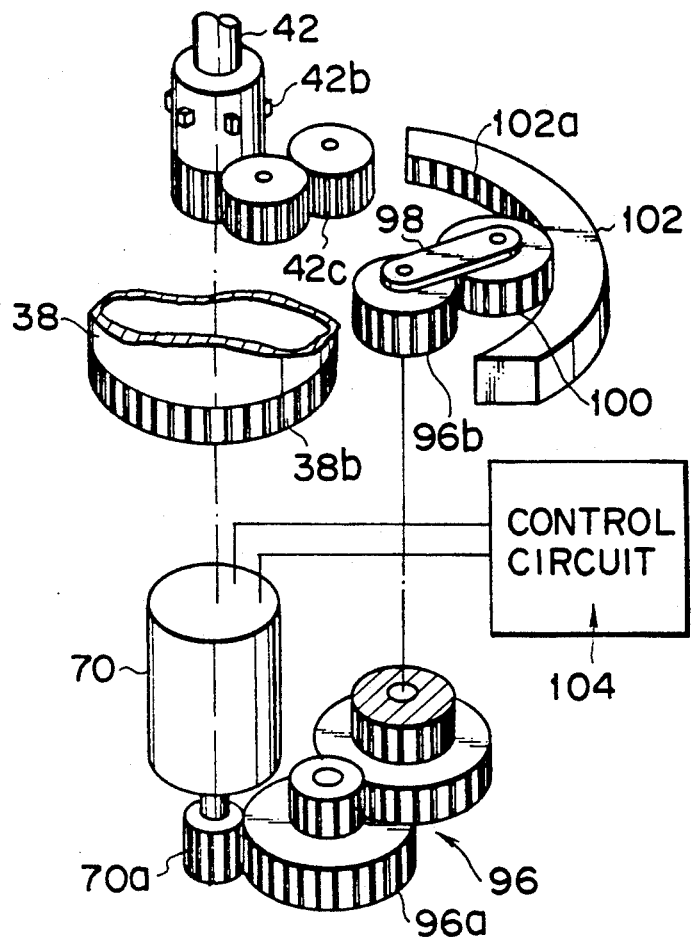
FIG. 9 is a schematic enlarged exploded perspective view showing a drive system of the film winding mechanism and the film feed mechanism shown in FIG. 8.
Figure 10:
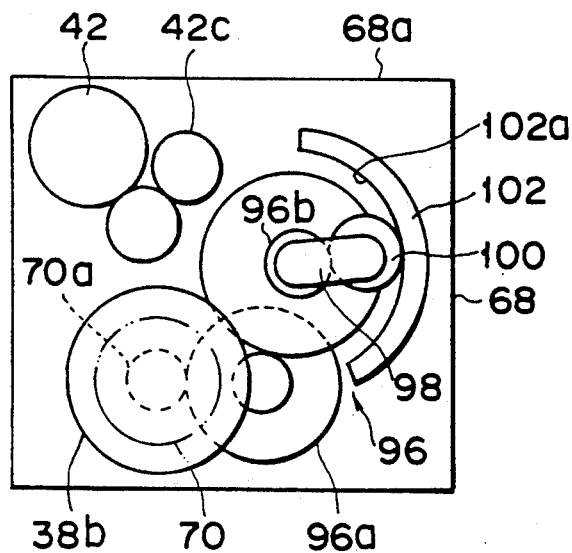
FIG. 10 is a schematic plan view showing a neutral condition of the drive system in FIG. 9.

FIG. 9 shows schematically an exploded view of the structure of the drive mechanism 68 common to the spool 38 and the sprocket 42, and FIG. 10 is a schematic plan view of said structure in combination with each other.

As shown in FIGS. 9 and 10, a drive gear 70a fixed to the output shaft of the bidirectional motor 70 located in the internal space of the spool 38 engages with an input gear 96a of a reducing gear train 96, and an output gear 96b of the reducing gear train 96 engages with a planetary gear 100 supported pivotably at one end of a planetary arm 98 whose other end is supported pivotably by the output gear 96b. The planetary gear 100 also engages with an internal gear 102a of an arc-shape internal gear member 102 fixed to a chassis 68a of the drive mechanism 68. A known weak friction member is provided between the planetary gear 100 and the one end of the planetary arm 98, whereby the planetary arm 98 also swings correspondingly to the rotating direction of the output gear 96b.

On both sides of the internal gear member 102 and on the orbit round the output gear of the planetary gear 100, are located a spool drive gear 38b formed on the lower end of the spool 38 and a sprocket drive gear train 42c engaging with the lower end of the sprocket 42.

Before the automatic film loading task is performed, 94 formed on the guide surface 74a of the film guide member 74, the detail of the film guide rail 94 will be explained later.

FIG. 9 shows schematically an exploded view of the structure of the drive mechanism 68 common to the spool 38 and the sprocket 42, and FIG. 10 is a schematic plan view of the structure in combination with each other.

As shown in FIGS. 9 and 10, a drive gear 7a fixed to the output shaft of the bidirectional motor 70 located in the internal space of the spool 38 engages with in input gear 96a of a reducing gear train 96, and an output gear 96b of the reducing gear train 96 engages with a planetary gear 100 supported pivotably at one end of a planetary arm 98 whose other end is supported pivotably by the output gear 96b. The planetary gear 100 also engages with an internal gear 102a of an arc-shape internal gear member 102 fixed to a chassis 68a of the drive mechanism 68. A known weak friction member is provided between the planetary gear 10 and the one end of the planetary arm 98, whereby the planetary arm 98 also swings correspondingly to the rotating direction of the output gear 96b.

On both sides of the internal gear member 12 and on the orbit round the output gear of the planetary gear 100, are located a spool drive gear 38b formed on the lower end of the spool 38 and a sprocket drive gear train 42c engaging with the lower end of the sprocket 42.

Before the automatic film loading task is performed, the planetary gear 100 has been engaged with the internal gear 102a of the internal gear member 102, as shown FIGS. 9 and 10.

FIG. 11 shows schematically a control circuit 104 connected to the bidirectional motor 70 of the drive mechanism 68 and shown in FIG. 9 to control the operation of the drive mechanism 68.

In the control circuit 104, one terminal of the bidirectional motor 70 is connected to the emitter of a transistor T1 and to the collector of a transistor T2, and the other terminal thereof is connected to the emitter of a transistor T3 and to the collector of a transistor T4. The collector of the transistor T1 and the emitter of the transistor T2 are connected to the positive pole and negative pole of a power supply battery 44, and the bases of the transistors T1 and T2 are connected to the terminals C1 and C2 of a CPU, respectively. The collector of the transistor T3 and the emitter of the transistor T4 are connected to the positive pole and negative pole of the power supply battery 44, and the bases of the transistors T3 and T4 are connected to the terminals C3 and C4 of a CPU, respectively. To the positive pole of the power supply battery 44, are connected a resistor R1 connected to the input terminal of a light emitting device of the sprocket rotation measuring unit 72 and the collector of a phototransistor of the sprocket rotation measuring unit 72, and to the negative pole of the power supply battery 44, is connected the output terminal of the light emitting device. The emitter of the phototransistor is connected to the terminal C5 of the CPU.

To the terminals C6 and C7 of the CPU, are connected the rear cover switch SW1 (FIG. 4) interlocking with the rear cover lock member 80 and a shutter release switch SW2 interlocking with the above-mentioned shutter button not shown.

In the control circuit 104 composed as described above, when the drive gear 70a of the bidirectional motor 70 is allowed to be rotated in the normal direction (in the counterclockwise direction in FIG. 10), the terminals C1 and C2 of the CPU are allowed to go low and the terminals C3 and C4 thereof to go high. On the contrary, when the drive gear 70a of the bidirectional motor 70 is allowed to be rotated in the reverse direction (in the clockwise direction in FIG. 10), the terminal C1 and C2 of the CPU are allowed to go high and the terminals C3 and C4 thereof to go low. When the rotation of the drive gear 70a of the bidirectional motor 70 is allowed to be stopped, all the terminals C1, C2, C3 and C4 are allowed to go high.

FIG. 12 shows a possibility of the separation of the film 48 from the film passage 14 and of the separation of the cartridge 46 from a specified position in the patrone containing chamber 12 with two-dot chain line when the rear cover 36 is located in the open position and a new patrone 46 is correctly mounted in the patrone containing chamber 12 of the camera body chassis 10, and then the leading end of the film 48 pulled out of the patrone 46 is extended along the film passage 14 in back of the camera body chassis 10 to the left end of the film passage 14, and thereafter the rear cover 36 is pivoted to the closed position for the automatic film loading task. Such discrepant condition is due to the force loaded on the leading end of the film 48 by the fact that the leading end abuts on the guide surface 74a of the film guide member 74 of and on the film guide sheet of the rear cover 36 in the course of the pivoting from the open position to closed position.

However, the above-mentioned possibility in the camera in the embodiment of the present invention is positively prevented by the upper film setter 64 on the upper edge of the film passage 14 in back of the camera body chassis 10 and by the upper and lower cartridge setters 50 and 54 (see FIG. 4) in the patrone containing chamber 12.

Figure 13:
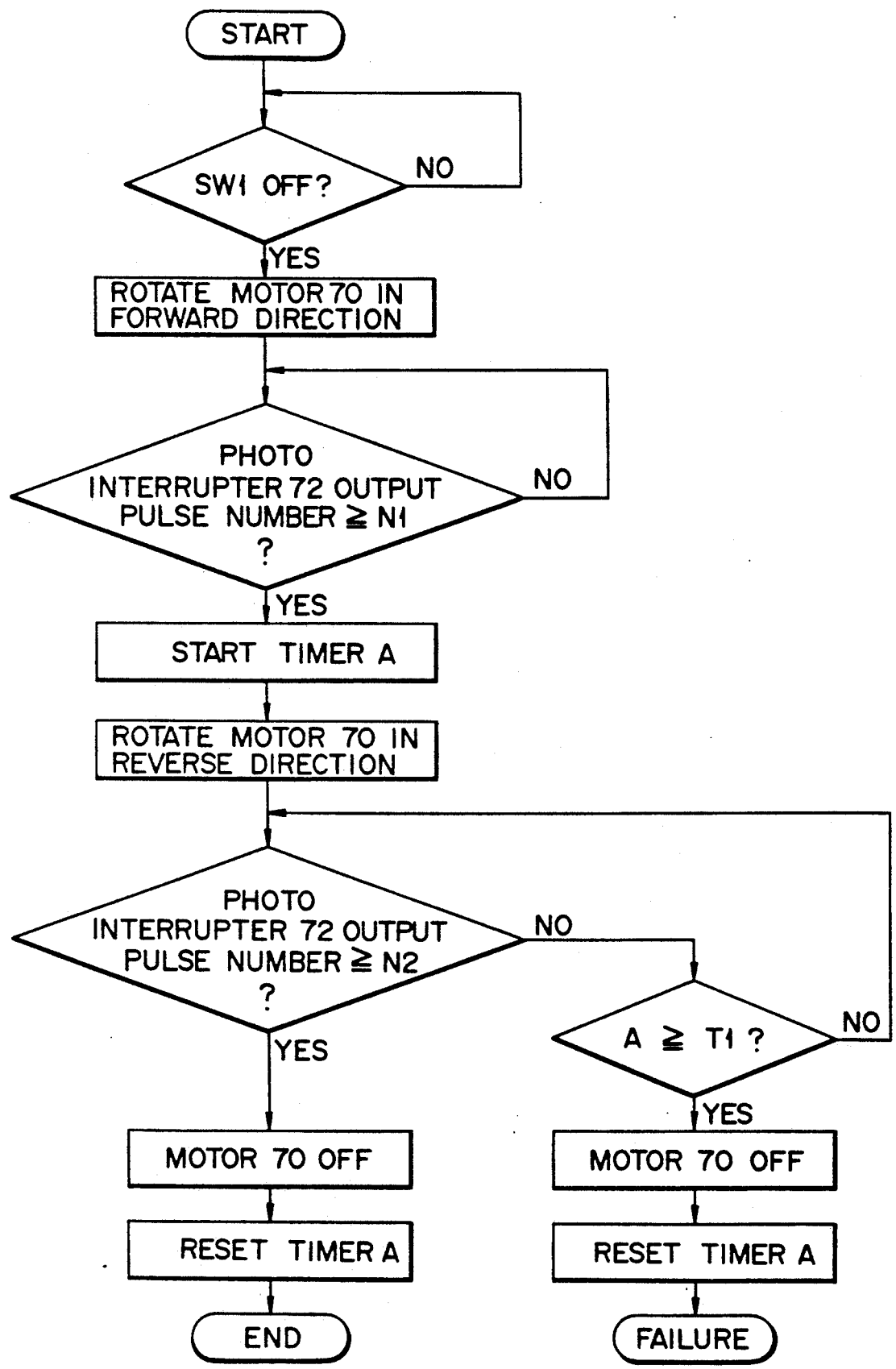
FIG. 13 is a schematic flowchart showing an operation of the drive system in FIG. 9 from the closing of the rear cover for automatic film loading to the finishing of the automatic loading task in FIG. 12.

FIG. 13 is a flowchart showing a state in which the drive mechanism 68 is controlled by the control circuit 104 during the time from the start to the finish of the automatic film loading.

That is, the rear cover 36 is moved from the condition shown in FIG. 12 with solid line to the closed position, and held in the closed position by the rear cover closed position lock member 80 (see FIG. 4) of the camera body chassis 10, whereby the rear cover switch SW1 interlocking with the rear cover lock member 80 is turned on. This causes the CPU of the control circuit of FIG. 11 to rotate the drive gear 70a of the bidirectional motor 70 in the normal direction (in the counterclockwise direction in FIG. 10). This causes also the outlet gear 96b of the reducing gear train 96a to be rotated in the normal direction (in the counterclockwise direction in FIG. 10), thereby rotating the planetary gear 100 in the normal direction of the orbit round the outlet gear 96b as shown in FIG. 14. The planetary gear 100 is separated from the internal gear 102a of the internal gear member 102, and engaged with the sprocket drive gear train 42c of the sprocket 42, thereby transmitting the rotational force from the drive gear 70a of the bidirectional motor 70 to the sprocket 42.

The locating of the rear cover 36 in the closed position causes the peripheral surface of the sprocket 42 to move to a position in front of the film 48 in the film passage 14 of the camera body chassis 10, whereby the upper end of the sprocket 42 is urged on the leader positioned in the upper half of the leading end of the film 48 positioned on the left end in the film passage 14, causing the photographic emulsion coated surface of the leading end of the film 48 to be urged on the guide roller 60 in back of the camera body chassis 10.

The left end of the back of the camera body chassis 10 composes a forwardly concaved relief concavity 10a in order to prevent the contact with the engaging pawls 42a on the upper end of and with the engaging pawls 42b on the lower end of the sprocket 42 (see FIG. 4) advanced. On the surface of the relief concavity 10a, are formed a plurality of second film guide pairs 156 and 158 extended along the peripheral direction of the sprocket 42 on both the upper and lower edges of the film guide sheet 76. Although only the film guide pair 156 on the upper edge is shown in FIG. 15, the operation of these second film guide pairs 156 and 158 will be explained in detail later.

The sprocket 42 urged on the leader on the leading end of the film 48 is rotated in the counterclockwise direction as shown in FIG. 14 with arrow by the rotational force from the drive gear 70a of the bidirectional motor 70, whereby the engaging pawl 42a on the upper end of the sprocket 42 is engaged with one of a plurality of opening of upper perforations 48a formed along the upper edge of the leader. By the sprocket 42, the film 48 is moved toward the film guide sheet 76 between the left end of the back of the camera body chassis 10 and the left end of the rear cover 36, and toward the guide surface 74a on the film guide member 74 of the rear cover 36.

Figure 16:
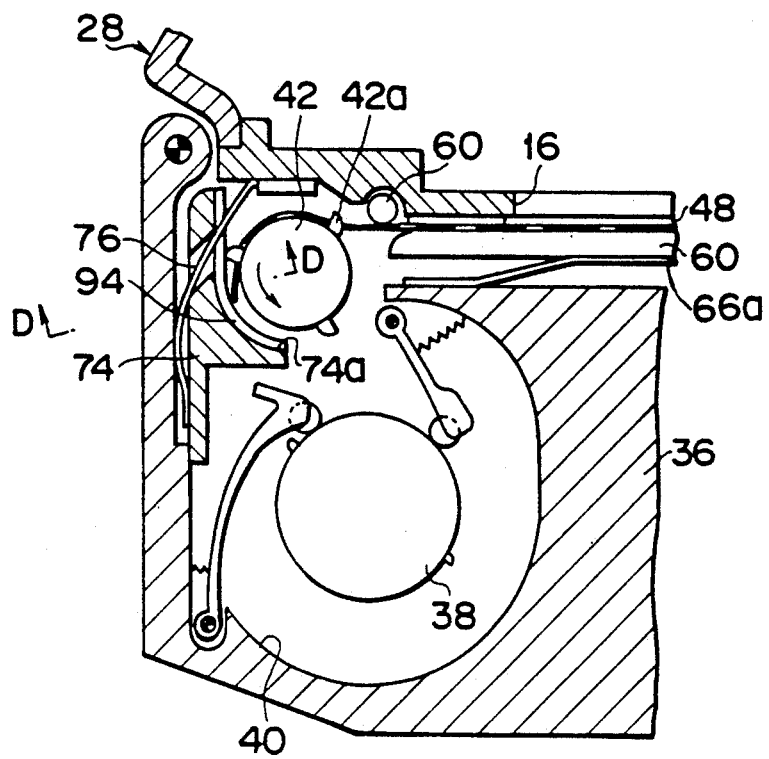
Figure 17:
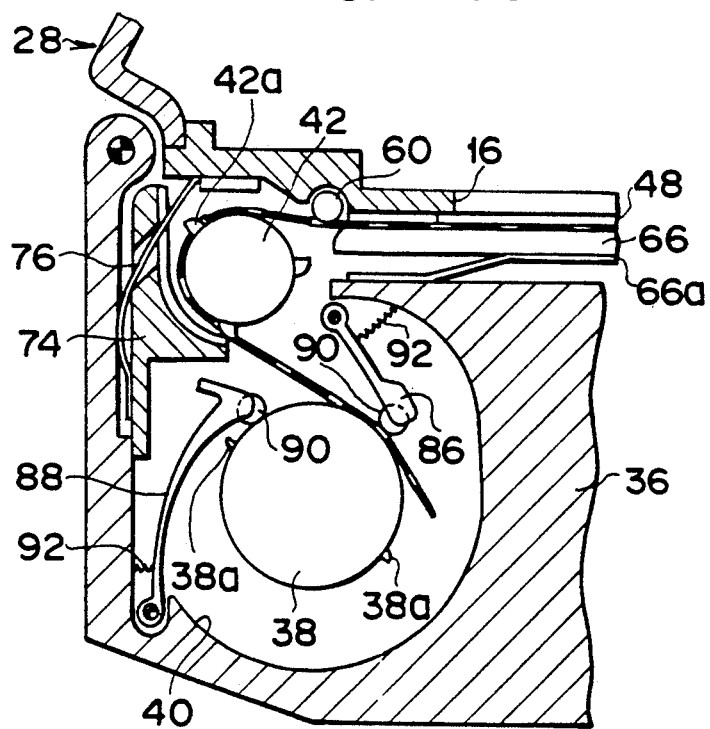

The tip of the leader of the film 48 moved by the sprocket 42 is abutted on the film guide sheet 76 and on the guide surface 74a on the film guide member 74, whereby the film 48 changes the moving direction thereof into the peripheral direction of the sprocket 42 as shown in FIG. 16, and then pressed down on the peripheral surface of the spool 38 by the roller 90 of the first film setting lever 86 as shown in FIG. 17. By the sprocket 42, the leader is bent sharply to the spool containing chamber 40 behind the film passage 14, whereby a force is developed in the intermediate region between the upper and the lower edges abutted on the pair of the upper and lower guide rails 56a and 58a such that the region is going to stretch out in front of the film passage 14, and the force acts on the film 48 in the film passage 14. However, the force is counteracted by the guide roller 60 abutting on the intermediate region of the film 48 in the same plane with the pair of the upper and lower guide rails 56b and 58a, thereby preventing the intermediate region of the film 48 from stretching out into the photographing opening 16 in front of the film passage 14 between the pair of the upper and lower guide rails 56b and 58a.

Figure 18:
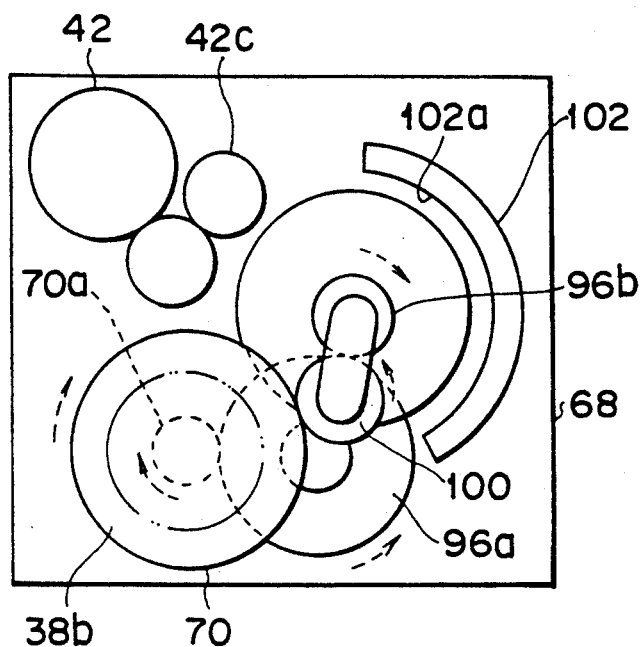
FIG. 18 is a schematic plan view showing a condition in which the sprocket shaft of the film feed mechanism is driven by the drive system in FIG. 9 in the latter half of the automatic loading task.

The CPU measuring the rotation amount of the sprocket 42 by the number of output pulses from the sprocket rotation measuring unit 72 utilizing the photointerruptor (that, is, the travel or moving distance of the film 48 by the sprocket 42) operates a timer A and reverses the rotating direction of the drive gear 70a of the bidirectional motor 70 at the time when said number of output pulses becomes equal to or larger than a specified number of pulses $N_1$ required to feed the leading end of the film 48 from the left end of the film passage 14 onto the peripheral surface of the spool as shown in FIG. 17. This causes also the outlet gear 96b of the reducing gear train 96a to be rotated in the reverse direction, thereby rotating the planetary gear 100 in the reverse direction on the orbit round the outlet gear 96b as shown in FIG. 18. The planetary gear 100 is separated from the sprocket drive gear train 42c of the sprocket 42 and releases the sprocket 42 from the drive by the bidirectional motor 70 of the drive mechanism 68 to make the sprocket freely rotatable, and at the same time engaged with the internal gear 102a and moves on the gear, and then separated from the internal gear 102a and engaged with the spool drive gear train 38b of the spool 38 as shown in FIG. 18, thereby transmitting the rotational force from the drive gear 70a of the bidirectional motor 70 to the spool 38.

Figure 19:
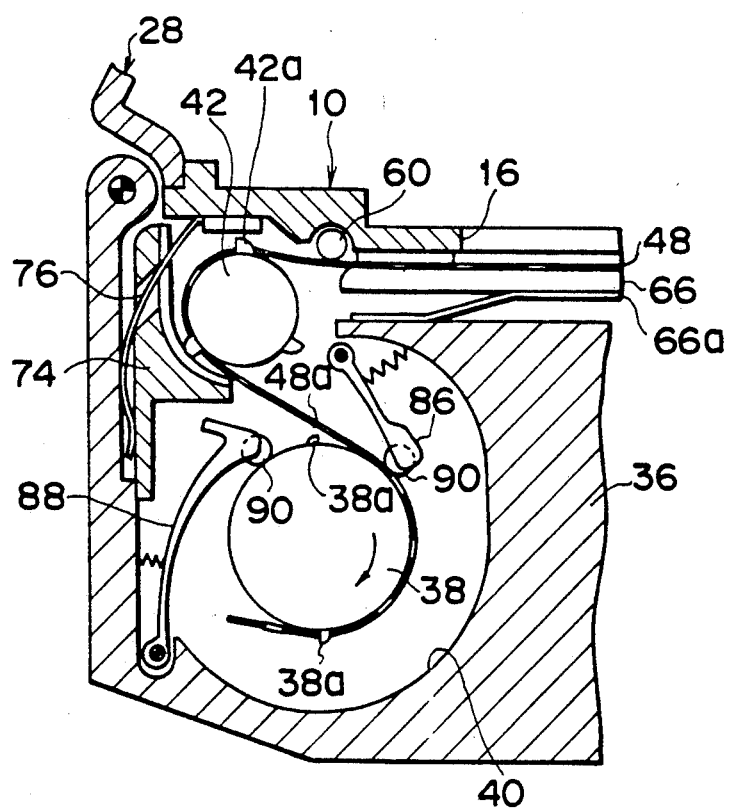
FIGS. 19 and 20 are schematic enlarged horizontal sectional views showing sequentially a state in which the spool of the film winding mechanism takes up the leading end of the film from the sprocket shaft of the film feed mechanism in the latter half of the automatic loading task.

The spool 38 drive by the rotational force engages one of the plurality of the engaging pawls 38a on the upper end thereof with one of the plurality of the openings of the upper perforations 48a on the leader on the leading end of the film 48 on the spool 38 as shown in FIG. 19, thereby taking up the leader in a condition that the photographic emulsion coated surface thereof is faced inward in the radial direction of the spool 38.

The CPU measuring the rotation amount of the sprocket 42 by the number of output pulses from the sprocket rotation measuring unit 72 (that is, the travel or moving distance of the film 48 by the sprocket 42)

stops the rotation of the drive gear 70a of the bidirectional motor 70 and resets the timer A at the time when said number of output pulses becomes equal to or larger than a specified number of pulses $N_2$ required to take up positively the leading end of the film 48 round the spool 38.

If the number of output pulses from the sprocket rotation measuring unit 72 does not reach the specified number of pulses N2, and the time counted by the timer A has become equal to or larger than the specified time T1 required to rotate a half rotation the spool 38 rotating for film take-up, then the CPU is to be considered to fail to perform the automatic film loading task, so that the rotation of the drive gear 70a of the bidirectional motor 70 should be stopped and the timer A be reset.

The failure of the automatic film loading task is displayed by the CPU on a data display panel which is not shown and provided on the surface of the camera body sheath housing 28 (see FIG. 1 or FIG. 2) or on the outer surface of the rear cover 33. In this case, the rear cover 33 should be opened, and the cartridge 46 and the film 48 be operated in such a manner that they are correctly loaded in the patrone containing chamber 12 and film passage 14.

Figure 20:
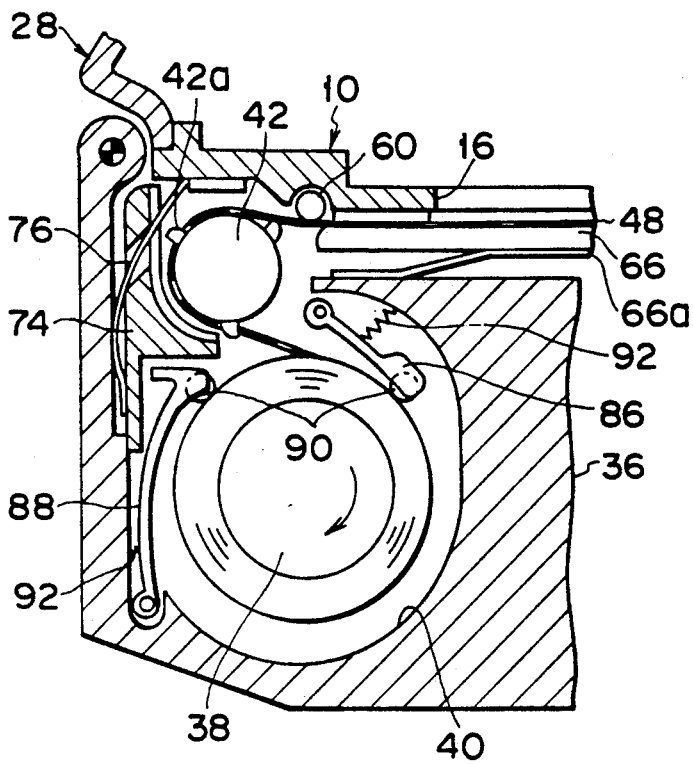

FIG. 20 shows a condition in which the photographed region of the film 48 has been taken up round the spool 38 in layers by the photographing of a plurality of film frames after the completion of the automatic film loading task. The photographed region of the film 48 having been taken up around the spool 38 in layers is urged on the spool 38 by the urging force of the urging members 92 of the first and second film setting levers 86 and 88 through the film setting rollers 90 of the first and second film setting levers 86 and 88 in the patrone containing chamber 12, thereby developing no looseness on the spool 38.

Figure 21:
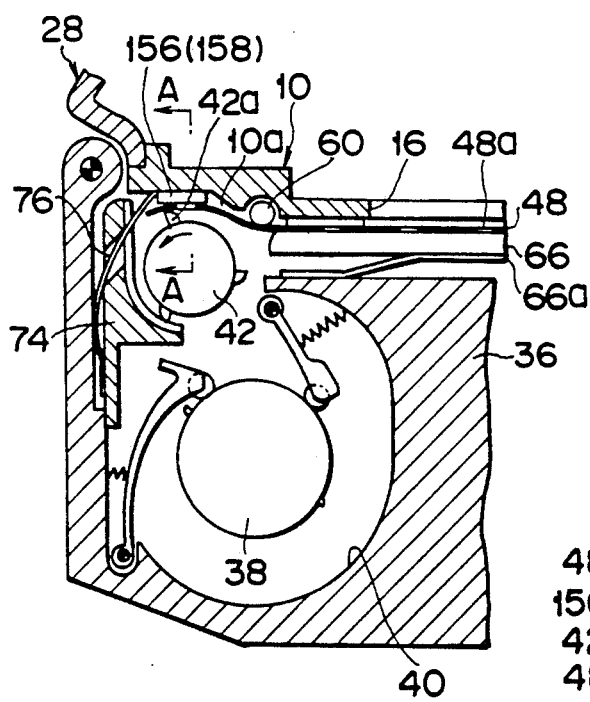
FIG. 21 is a schematic horizontal sectional view showing a condition in which the sprocket pawls on the upper edge of the sprocket shaft of the film feed mechanism has not engaged with the perforations on the upper edge of the leading edge of the film immediately after the start of the automatic loading task.
Figure 22:
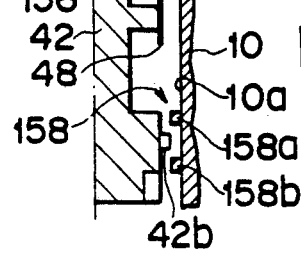
FIG. 22 is a schematic enlarged longitudinal sectional view showing a state in which, in the camera in FIG. 1, film guide rails provided protrusively into the film passage in the camera body are useful in the condition in FIG. 21.

FIGS. 21 and 22 show the operation of the second upper and lower film guide pairs 156 and 158 in the relief concavity 10a provided on left end of the back of the camera body chassis 10. FIG. 22 is a sectional view taken along line A—A of FIG. 21. As shown in FIG. 11, the upper film guide pair 156 is composed only by the single guide rail 156b positioned under the engaging pawls 42a on the upper end of the sprocket 42, and the lower film guide pair 158 is composed by the two guide rails 158a and 158b positioned above and under the engaging pawls 42b on the lower end of the sprocket 42.

If, of the three engaging pawls 42a on the upper end of the sprocket 4 having started to rotate immediately after the start of the automatic film loading task, the one coming in contact with first the leader on the leading end of the film 48 positioned on the left end in the film passage 14 has not engaged with on of the plurality of opening of the upper perforations 48a in the leader, then the engaging pawls 42a having not engaged push bridges between the plurality of openings of the upper perforations 48a in the leader into the relief concavity 10a as shown in FIG. 21. In this embodiment, the upper film guide pair 156 has not a guide rail above the engaging pawls 42a on the upper end of the sprocket 42, whereby the upper edge of the leader is gently curved and pushed into the relief concavity 10a as shown in FIG. 22. This causes the film 48 as well as the bridges between the plurality of openings of the upper perforations 48a in the leader to develop no damage such as bending and breaking even if the upper edge of the leader on the leading end of the film 48 is pushed by the engaging pawls 42a having not engaged as described above in a condition that the flexibility of the film 48 decreases at a lower temperature. Such a damage is apt to develop a film jammed condition during the automatic film loading task and a larger damage to the film 48.

Figure 23:
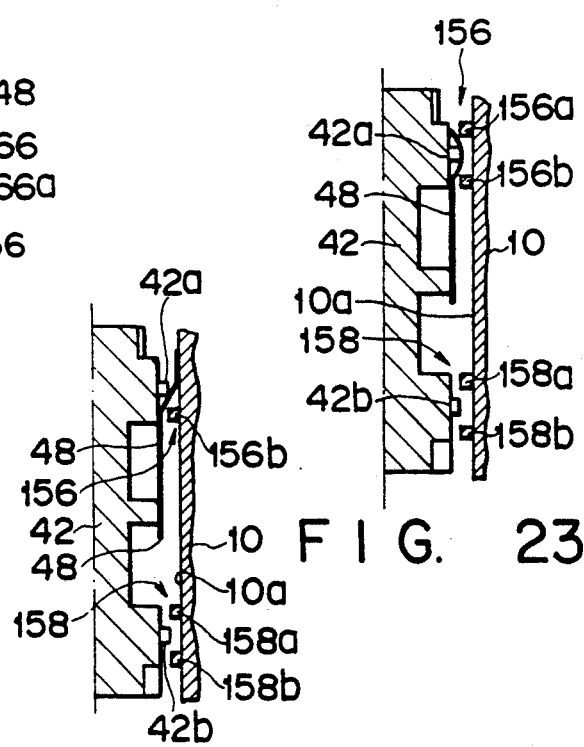
FIG. 23 is a schematic enlarged longitudinal sectional view showing a state in which, in a camera of prior art, film guide rails provided protrusively into the film passage in the camera body damage the vicinity of the perforations on the film upper edge in the condition in FIG. 21.

If the upper film guide pair 156 has also the guide rail 156a above the engaging pawls 42a on the upper end of the sprocket 42 as shown in FIG. 23, then the engaging pawls 42a having not engaged push bridges between the plurality of openings of the upper perforations 48a in the leader into the relief concavity 10a as shown in FIG. 21, whereby the upper edge of the leader is forced to enter the narrow gap between the guide rail 156a positioned above the engaging pawls 42a on the upper end of the sprocket 42 and the guide rail 156b positioned under the engaging pawls 42a as shown in FIG. 23.

The upper edge of the leader forced to enter the narrow gap in a condition that the flexibility of the film 48 decreases at a lower temperature is apt to develop a damage such as bending and breaking.

Figure 24:
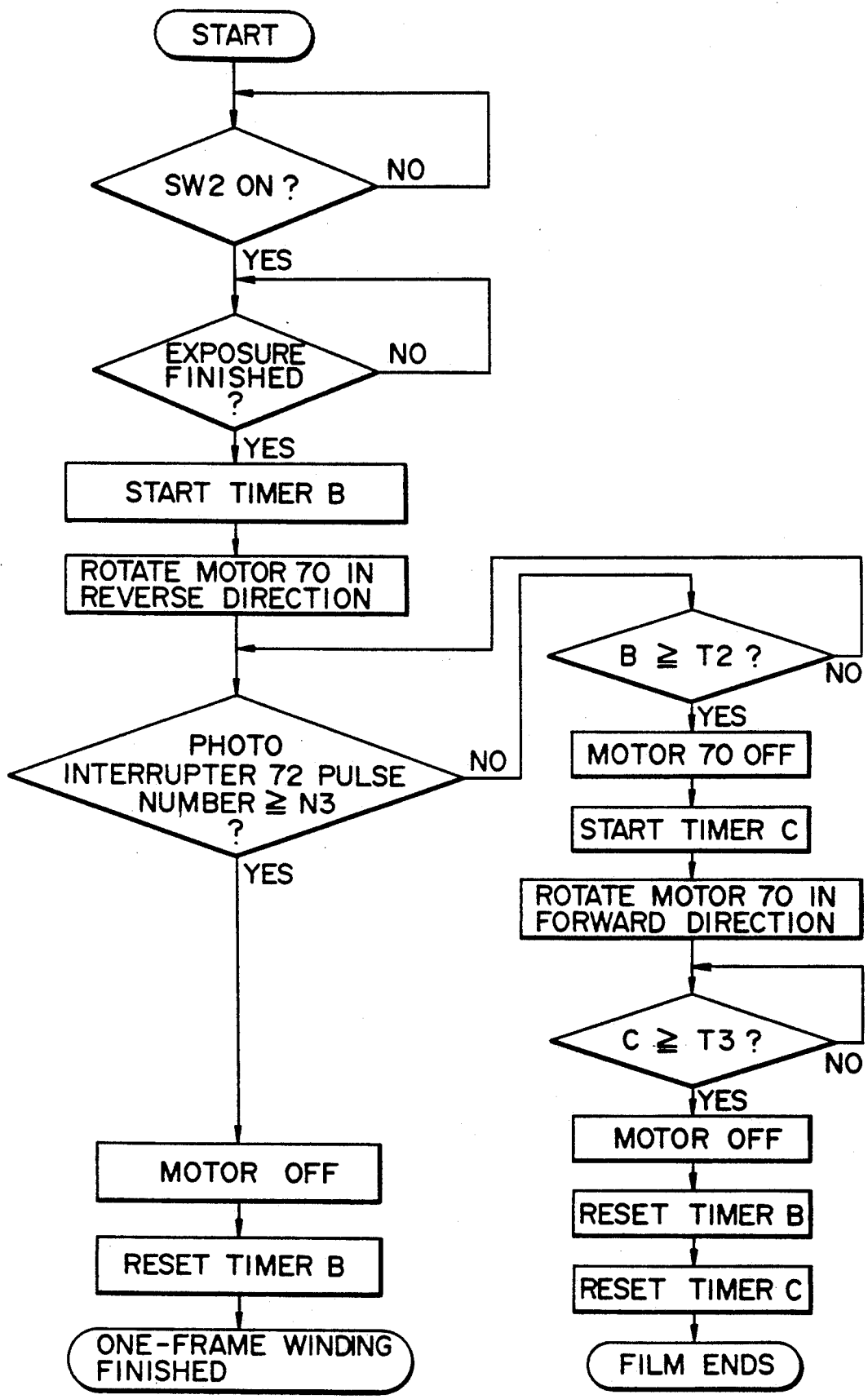
FIG. 24 is a schematic flowchart showing an operation of the drive system in FIG. 9 associated with the one film-frame winding task for each photographing after the finishing of the automatic film loading.

FIG. 24 is a flowchart showing a state in which the drive mechanism 68 is controlled by the control circuit 104 for the time during which the photographing is performed one frame by one frame until film ending after the finishing of the automatic film loading.

That is, when the above-mentioned shutter release button not shown is pressed to photograph one frame of the film 48 after the finishing of the automatic film loading, the shutter release switch SW2 (see FIG. 11) linking to the shutter release button is turned on, whereby the focal plane shutter unit 18 (see FIG. 1) is opened for a specified time and then the photographing of one frame is finished. Thereafter, a timer B starts to measure elapsed time and the CPU rotates in the reverse direction (in the clockwise direction in FIG. 18) the drive gear 70a of the bidirectional motor 70 of the drive means 68 (see FIG. 18) common to the sprocket 42 and the spool 38. As described above, the planetary gear 100 of the drive means 68 has been stopped while engaging with the spool drive gear 38b of the spool 38 as shown in FIG. 18 when the automatic film loading is finished, whereby the rotational force from the drive gear 70a of the bidirectional motor 70 is immediately transmitted to the spool 38, and the spool 38 starts to take up the photographed region of the film 48. By the number of pulses generated from the sprocket rotation measuring unit 72 utilizing a photointerruptor provided it the sprocket 42, the CPU measures the moving distance of the film 48 moved in the film passage 14 associating with the above-mentioned task of taking up of the photographed region of the film 48, and when the number of pulses becomes equal to or larger than a specified value N3 corresponding to the feed of one frame of the film 48, stops the reverse rotation of the drive gear 70a of the bidirectional motor 70 and resets the timer B. This causes the task of winding of one frame of the film 48 by the spool 38 to be finished.

When the number of pulses generated from the sprocket rotation measuring unit 72 does not reach the specified value N3 during the task of winding of one frame of the film 48, and the time measured by the timer B becomes longer than a specified longest time required to wind the one frame of the film 48, the CPU decides that the film 48 reaches the end thereof, and stops the reverse rotation of the drive gear 70a of the bidirectional motor 70. At the same time, the CPU allows a timer C to start to measure elapsed time and rotates in the normal direction (in the counterclockwise direction in FIG. 18) the drive gear 70a of the bidirectional motor 70. When the time measured by the timer C becomes equal to or exceeds a specified time T3 required to engage sufficiently again the planetary gear 100 rotating on orbit round the outlet gear in the counterclockwise direction in FIG. 18 associating with the normal rotation of the drive gear 70a with the internal gear 102a of the internal gear member 102, the CPU stops the rotation of the drive gear 70a of the bidirectional motor 70 and resets the timers B and C.

The film end is displayed by the CPU on a data display panel which is not shown and provided on the surface of the camera body sheath housing 28 (see FIG. 1 or FIG. 2) or on the outer surface of the rear cover 33.

The planetary gear 100 engages again with the internal gear 102a of the internal gear member 102 as shown in FIG. 10 to cause both the sprocket 42 and the spool 38 to become freely rotatable, and thereafter a spool of the patrone 46 in the patrone containing chamber 12 is rotated in the film take-up direction manually or by a film take-up motor which is not shown and located in the camera body chassis 10, whereby the photographed region of the film 48 having been would round the spool 38 in layers can be rewound around the spool of the patron 46.

The reason whey the planetary gear 100 engages during the rotation thereof on the orbit round the outlet gear with the internal gear 102a of the internal gear member 102 between the position at which the planetary gear 100 engages with the sprocket drive gear train 42c for the sprocket 42 and the position at which the planetary gear 100 engages with the spool drive gear 38b for the spool 38 is that the rotation speed of the planetary gear 100 on the orbit around the outlet great between the above-mentioned two positions is controlled within a specified range, whereby the planetary gear 100 is allowed to be exactly stopped at an approximately intermediate position on the internal gear 102a of the internal gear member 102 between the above-mentioned two positions as shown in FIG. 10 in the time of the timer C after film ending.

If the internal gear member 102 is not provided, no engagement of the internal gear 102a of the internal gear member 102 with the planetary gear 100 exists, whereby the rotation speed of the planetary gear 100 on the orbit around the outlet gear is governed by the friction strength between the planetary arm 98 and the planetary gear 100. The time control by the timer C makes it difficult to control positively the stop position of the planetary gear 100 as described above.

Where the internal gear member 102 is not provided, even if the rotation of the planetary gear 100 on the orbit can be stopped between the above-mentioned two engaging positions, an external force applied to the camera such as vibration would cause the planetary gear 100 to be rotated easily on the orbit from the position between the above-mentioned two engaging positions to either of the above-mentioned two engaging positions. Accordingly, if the planetary gear 100 has moved to the above-mentioned two engaging positions when the film 48 is rewound, the film rewinding task would not be performed, or the planetary gear 100 and the sprocket drive gear train 42C or the spool drive gear 38b engaging therewith would be damaged by the film rewinding task.

In the embodiment of the present invention in which the planetary gear 100 engages with the internal gear 102a of the internal gear member 102 between the above-mentioned two engaging positions, the discrepant condition as described above is positively prevented.

Also, in this embodiment, when the rear cover 36 has been moved from the closed position to the open position, the CPU shown in FIG. 11 controls the rotation of the drive gear 70a of the bidirectional motor 70 in a manner to move the planetary gear 100 to the intermediate position shown in FIG. 10 based on the action of the rear cover switch SW1 linking with the rear cover closed-position lock member 80 shown in FIG. 4.

That is, when the rear cover 33 is opened during period when the planetary gear 100 engages with the spool drive gear 38b for the spool 38 (after a specified time has lapsed after the start of the automatic loading task during the task, after the automatic loading task, during the winding of the one frame of the film 48, and thereafter), the drive gear 70a of the bidirectional motor 70 is rotated reversely by the time of the timer C in a manner to move the planetary gear 100 to the above-mentioned intermediate position.

When the rear cover 33 is opened during period when the planetary gear 100 engages with the sprocket drive gear 42c for the sprocket 42 (during a specified time after the start of the automatic loading task during the task), the drive gear 70a of the bidirectional motor 70 is rotated normally by the time of the timer C in a manner to move the planetary gear 100 to the above-mentioned intermediate position.

As a result, even when the film 48 is taken out of the camera without performing rewinding before the film 48 reaches the end thereof during period when the film 48 has been loaded in a specified position in the camera, the opening of the rear cover 33 causes the planetary gear 100 linking to the drive gear 70a of the bidirectional motor 70 to be separated from the sprocket drive gear 42c for the sprocket 42 and from the spool drive gear 38b for the spool 38 to make free the rotation of the sprocket 42 and the spool 38, whereby the damage to the above-mentioned various gears due to the above-mentioned taking out of the film 48 can be positively prevented.

FIGS. 25 and 26 show a film separating protrusion 108 which is formed on the upper end of the position in the opposite direction to the film guide member 74 with respect to the sprocket 42 formed on the internal surface of the sprocket housing chamber 40 in order to prevent effectively a condition in which the leader on the leading end of the film 48 sticks to the engaging pawls 42a on the upper end of the sprocket 42 to such an extent as not to be separated from the sprocket 42 at the automatic film loading task where the film 48 becomes soft under a high temperature and humidity circumstance. FIG. 26 is a schematic longitudinal seasonal view taken along line B—B of FIG. 25.

A guiding surface 108a of the film separating protrusion 108 is inclined from the sprocket 42 toward the peripheral surface of the spool 38, and the tip of the leader on the leading end of the film 48 which has sticked to the engaging pawls 42a on the upper end of the sprocket 42 to such an extent as not to be separated from the sprocket 42 at the automatic film loading task abuts on the guiding surface 108a as shown in FIG. 25, thereby being separated from the periphery of the sprocket 42, and than the tip is slided on the guiding surface 108a, thereby being forcedly guided to move toward the peripheral surface of the spool 38.

FIGS. 27 and 28 show schematically a second film guide 109 formed on the left end of the internal surface of the relief concavity 10a on the left end of the back of the camera body chassis 10 in stead of the two pairs of the second upper and lower film guide pairs 156 and 158 particularly well shown in FIG. 22. FIG. 28 is a schematic longitudinal sectional view taken along line C—C of FIG. 27.

Figure 29:
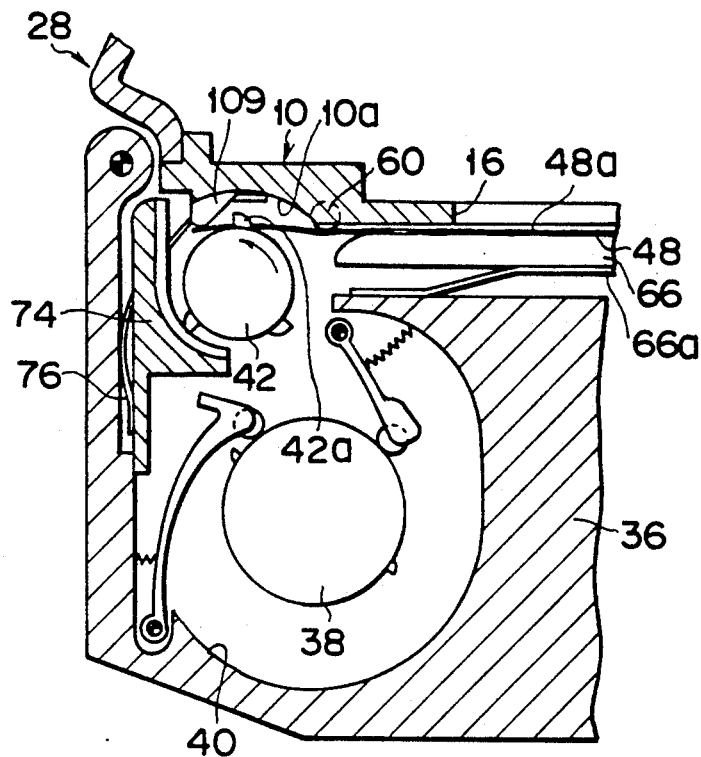
FIG. 29 is a schematic enlarged horizontal sectional view showing a condition in which the sprocket pawls on the upper edge of the sprocket shaft has been successfully engaged with the perforation on the upper edge of the film leading end by the action of the film guide protrusion in FIG. 27 immediately after the start of the automatic film loading task.

If, of the plurality of the engaging pawls 42a on the upper end of the sprocket 42, the one having approached first the upper edge of the leader on the leading end of the film 48 immediately after the start of the above-mentioned automatic film loading is not immediately engaged with one of the plurality of openings of the upper perforations 48a of the leader, the single second film guide 109 which is formed on the left end of the relief concavity 10a and positioned directly below the engaging pawls 42a on the upper end of the sprocket 42 as shown in FIG. 28 allows a condition in which the upper edge of the leader is pushed and bent into the relief concavity 10a as shown in FIG. 27 by the engaging pawls 42a having approached first the film 48. This condition prevents the film 48 from being damaged in the above-mentioned case. When the engaging pawls 42a on the upper end of the sprocket 42 then engages with one of the plurality of openings of the upper perforations 48a of the leader to cause the tip of the leader to be moved toward the guide surface 74a of the film guide member 74 by the rotation of the sprocket 42 as shown in FIG. 29 the above-mentioned single second film guide 109 also forces the tip to move along the peripheral surface of the sprocket 42 and smoothly slide onto the guide surface 74a of the film guide member 74.

Figure 30:
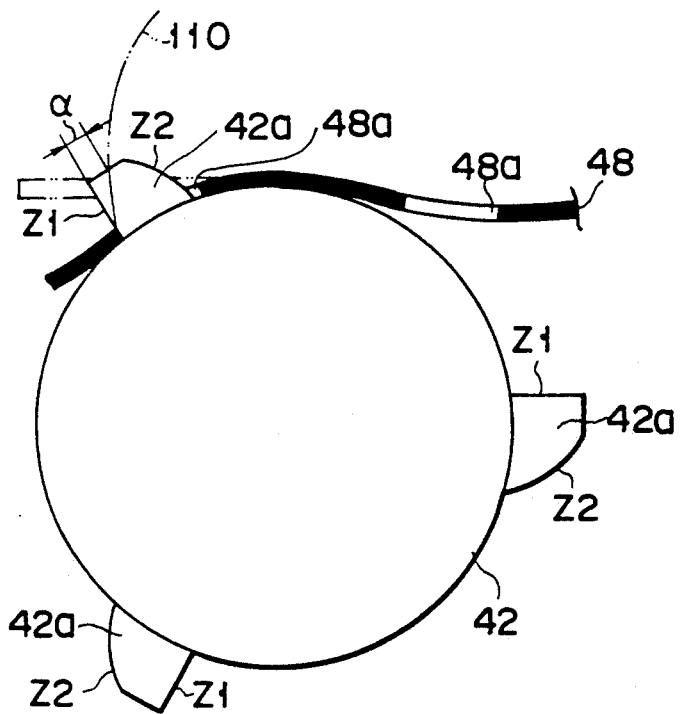
FIG. 30 is a schematic enlarged plan view showing the planar configuration of each sprocket pawl devised in a manner to engage successfully the sprocket pawls on the upper edge of the sprocket shaft with the perforations on the upper edge of the film leading end immediately after the start of the automatic film loading task.

FIG. 30 shown a characteristic enlarged planar configuration of the plurality of engaging pawls 42a on the upper end of the sprocket 42 which engage first with the plurality of openings of the upper perforations 48a in the leader of the leading end of the film 48 immediately after the start of the automatic film loading is and ar used to start the movement of the film 48 from the film passage 14 into the spool containing chamber 40.

As shown in FIG. 30, each of tooth faces Z1 of the plurality of engaging pawls 42a facing forward with respect to the rotating direction (counterclockwise direction in FIG. 30) of the sprocket 42 is composed of a line which is included by α in the normal direction of the basic circle from an involute curve 110 with the diameter of the sprocket 42 taken as the basic circle, and each of tooth faces Z2 of the plurality of engaging pawls 42a facing backward with respect to the rotating direction of the sprocket 42 is composed of the involute curve as with that of gears of prior art. Where the tooth face Z1 facing forward is composed as described above, a trend can be effectively prevented that, as the engaging pawl 42a engaged with one opening in the upper perforations 48a in the leader of the leading end of the film 48 moves away form the film passage 14, the opening in the upper perforations 48a of the leading end of the film 48 is apt to separate from the engaging pawl 42a by the elasticity of the leading end. Further, when the film 48 is separated from the sprocket 42, a sudden and sharp separation of the perforations 48a of the film 48 from the engaging pawls 42a may be prevented, whereby perforation breaking can be effectively prevented.

FIG. 31 shown a trend that the lower edge of the leader on the leading end is separated from the peripheral surface of the sprocket 42 during period when the film 48 is fed by the rotation of the sprocket 42 a condition that the plurality of engaging pawls 42a on the upper end of the sprocket 42 are engaged only with the plurality of openings of the upper perforations 48a in the leader of the leading end of the film 48 immediately after the start of the automatic film loading. Such trend is due to the fact that the leading end of the film 48 is supported on the peripheral surface of the sprocket 42 body only the upper perforations 48a even through the film 48 tends to curve in a manner to make concave the photographic emulsion coated surface in the width direction.

If such trend becomes large, then the leader on the leading end of the film 48 is separated from the peripheral surface of the sprocket 42 and hangs down while moving toward the peripheral surface of the spool 38, whereby the engagement of the upper perforations 48a with the plurality of engaging pawls 42a on the upper end of the sprocket 42 is apt to be released. Further, for the spool 38, the engagement of the engaging pawls 38a of the spool 38 with the plurality of openings of the upper perforations 48a of the leader on the leading end of the film 48 becomes difficult.

FIG. 32 shown the plurality of enlarged guide rails 94 which are formed on the guide surface 74a of the film guide member 74 in order to prevent effectively such trend. FIG. 32 is a sectional view taken along line D—D of FIG. 16.

The plurality of film guide rails 94 on the guide surface 74a of the film guide member 74 are formed not only near the upper and lower spaces of the rotating locus of the engaging pawls 42a on the upper end of the sprocket 42, but also near the upper and lower spaces of the rotating locus of the engaging pawls 42b on the lower end of the sprocket 42. Also, the film guide rails 94 are formed at an approximately intermediate position between the engaging pawls 42a on the upper end and the engaging pawls 42b on the lower end of the sprocket 42. These film guide rails 94 extend in the horizontal direction and in parallel to the rotating locus of the engaging pawls 42a and 42b on the upper and lower ends of the sprocket 42, and protrude in the inward direction inside the rotating locus of the protruding end of the engaging pawls 42a and 42b in the radial direction of the sprocket 42. In particular, the film guide rail 94 at the intermediate position protrudes slightly in said inward direction more inside than the upper and lower pairs of film guide rails 94. Also, the film guide protrusion 42d extending over the full circumference at the position corresponding to the film guide rail 94 on the intermediate position is formed on the outer peripheral surface of the sprocket 42.

Accordingly, even through the film 48 whose upper perforations 48a in the leader of the leading end have been engaged only with the engaging pawls 42a on the upper end of the sprocket 42 in the relief concavity 10a on the left end of the back of the camera body chassis 10 immediately after the start of the automatic film loading tens to curve in a manner to make concave the photographic emulsion coated surface as described above, the upper and lower edges of the upper perforations 48a of the leader and the lower edge of the leader while being in contact with the sprocket 42 are urged toward the bases of the engaging pawls 42a on the upper end and the film guide protrusion 42d of the sprocket 42 by the upper and lower pair and the one at the intermediate position, the total, three film guide rails 94 of the film guide member 74. The urging prevents the leader on the leading end of the film 48 from curving as described above, and also prevents the trend that the lower edge of the leader on the leading end of the film 48 is separated from the peripheral surface of the sprocket 42.

The distance between the film guide protrusion 42d and the intermediately positioned film guide rail 94 must be, however, setted at a specified amount to assure the smooth traveling or movement of the film 48, so that the above described trend can not be prevented perfectly.

In order to ease the engagement of the engaging pawls 38a with the upper perforations 48 in the leader of the leading end of the film 48 while the above described trend is appeared to a small extent, the upper surfaces of the plurality of engagings pawls 38a on the upper end of the spool 38 are composed of inclined surfaces 38C slanted downwardly, as shown in FIG. 33.

FIG. 34 and 35 shown an advantage derived from an arrangement in which the engaging pawls 42a on the upper end of the sprocket 42 engage with every other one of the plurality of openings of the upper perforations 48a in the leader of the leading end of the film 48.

That is, assume that, immediately after the start of the automatic film loading, one engaging pawls 42a on the upper end of the sprocket 42 engages first with the second opening from the head of the plurality of openings of the upper perforations 48a in the leader of the leading end of the film 48 as shown in FIG. 34, and the tip of the leader abuts on the plurality of film guide rails 94 of the film guide member 74 and is guided along the outer peripheral surface of the sprocket 42. Then, even if the abutting causes the region from the tip to the second opening of the leader of the film 48 to rise slightly as shown in FIG. 35, the region of the leader is guided smoothly and reasonably along the outer peripheral surface of the sprocket 42.

Figure 36:
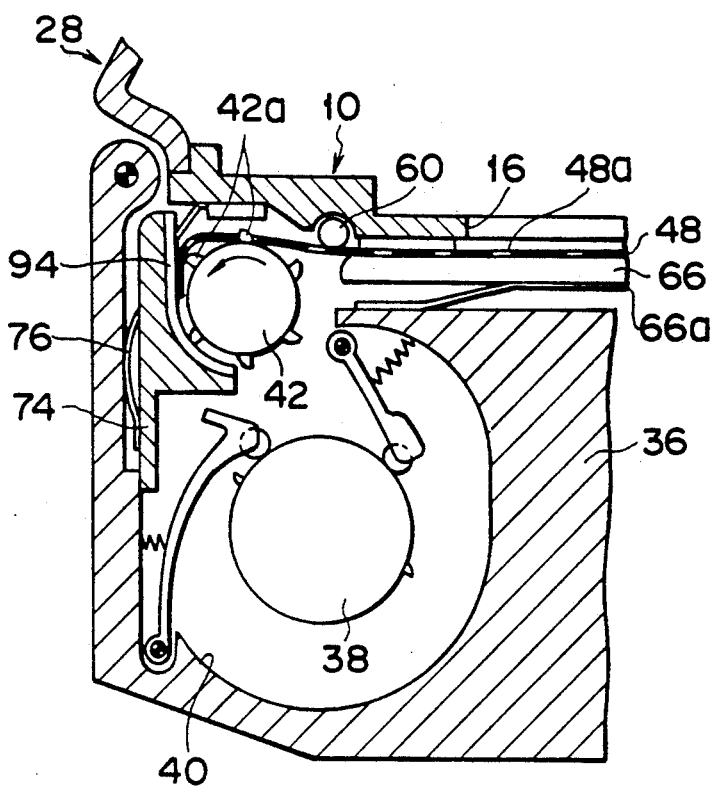
FIG. 36 is a schematic enlarged horizontal sectional view showing a film jammed condition occurring immediately after the start of the automatic film loading task where the sprocket pawls on the upper edge of the sprocket shaft are located on the peripheral surface of the upper edge of the sprocket shaft at intervals such that each of said pawls is enlarged with each of many openings of the perforations on the upper edge of the film leading end unlike a case where the sprocket pawls in the camera of this embodiment have been located on the peripheral surface of the upper edge of the sprocket shaft at intervals such that each of the pawls is engaged with every other one of many openings of the perforations.

On the contrary, where six engaging pawls 42a on the upper end of the sprocket 42 are arranged at equal intervals in a manner to engage continuously with the plurality of openings of the upper perforations 48a in the leader of the leading end of the film 48, assume that, in the same condition as described above, the region from the tip to the second opening of the leader of the film 48 rises slightly. At that point, as shown in FIG. 36, the engaging pawl 42a positioned adjacent forwardly to the first-engaged engaging pawl 42a would be going to be opposed to the film guide rails 94 of the film guide member 74. The rising of the film 48 would cause the distance along the outer peripheral surface of the sprocket 42 from the second opening to the first opening of the super perforations 48a of the leader to become shorter then the distance from the first first-engaged engaging pawl 42a to the engaging pawl 42a positioned adjacent fowardly to the pawl. Accordingly, the forwardly positioned engaging pawl 42a than could not engage with the first opening from the tip of the leader of the upper perforations 48a.

The engaging pawl 42a not engaging with the first opening pushes the bridge region between the plurality of upper perforations 48a of the leader being in contact therewith into the gap between the pair of film guide rails 94 positioned near the upper and lower spaces of the engaging pawl 42. This causes a film jammed condition or a damage to the pushed region of the leader of the film 48 to occur.

Figure 37:
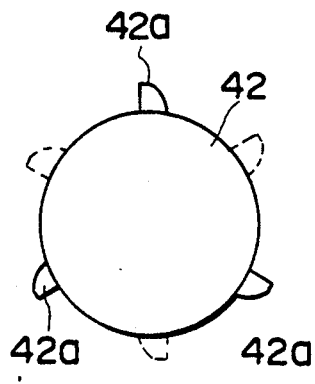
FIG. 37 is a schematic enlarged plan view showing an arrangement of the sprocket pawls on the upper edge of the sprocket shaft in the camera of this embodiment.
Figure 38:
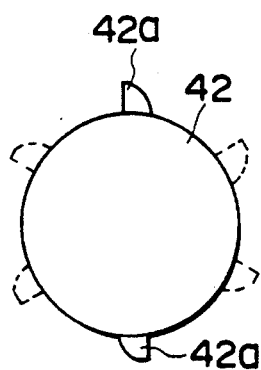
FIGS. 38 and 39 are schematic enlarged plan views showing other arrangements of the sprocket pawls capable of preventing the film jammed condition as shown in FIG. 36 as with that of the sprocket pawls in FIG. 37.
Figure 39:
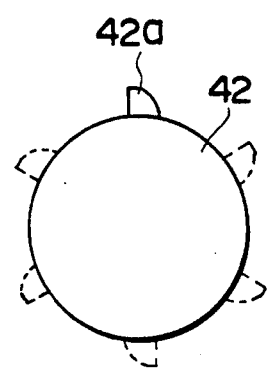

FIGS. 38 and 39 shown two alternative arrangement for the engaging pawls 42a which can exhibit the same effect as with the case where three engaging pawls 42a on the upper end of the outer peripheral surface of the sprocket 42 are arranged at equal intervals in the peripheral direction as shown in FIG. 37 in a manner to engage with every other one of the plurality of upper perforations 48a of the leader.

In FIG. 38, two engaging pawls 42a are arranged at equal intervals in the peripheral direction on the upper end of the outer peripheral surface of the sprocket 42 in a manner to engaged with every two ones of the plurality of openings of the upper perforations 48a.

In FIG. 39, only one engaging pawl 42a is arranged on the upper end of the outer peripheral surface of the sprocket 42 in a manner to engage with every six ones of the plurality of openings of the upper perforations 48a.

Figure 40:
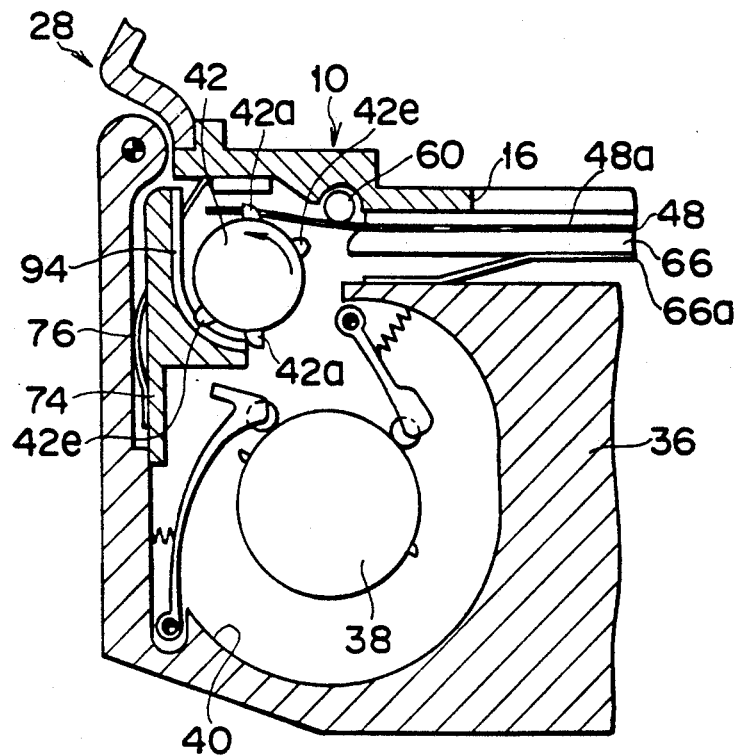
FIG. 40 is a schematic enlarged horizontal sectional view showing another arrangement of the sprocket pawls on the upper edge of the sprocket shaft in the camera of this embodiment.
Figure 41:
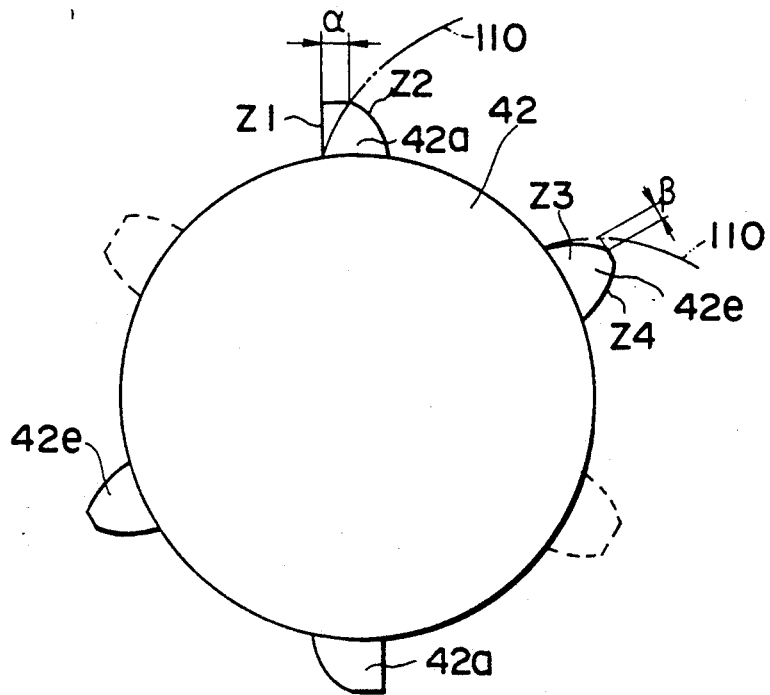
FIG. 41 is a schematic further enlarged plan view to help show successfully the planar configuration of the sprocket pawls in FIG. 40.

FIGS. 40 and 41 shown another arrangement of the engaging pawls on the upper end of the outer peripheral surface of the sprocket 42. In FIGS. 40 and 41, two engaging pawls 42a with the same configuration as that of the above-mentioned three engaging pawls 42a are arranged on the outer peripheral surface in a manner to engage with every three ones of the plurality of openings of the upper perforations 48a in the leader of the leading end of the film 48, and other two engaging pawls 42e with the configuration different from that of the above-mentioned three engaging pawls 42a are arranged on the outer peripheral surface in a manner to engage with the opening positioned next to the one having engaged with the two engaging pawls 42a.

That is, the two engaging pawls 42a are arranged more forward than the other two engaging pawls 42e by respective intervals of openings of the plurality of opening of the upper perforations 48a of the film 48 in a specified rotating direction of the sprocket 42 for the automatic film loading task.

FIG. 41 shown an enlarge configuration of the two engaging pawls 42e different in configuration from the above-mentioned three engaging pawls 42.

Each of tooth faces Z3 of the two engaging pawls 42e facing forward with respect to the rotating direction (counterclockwise direction in FIG. 41) of the sprocket 42 is composed of a line which is inclined by $\beta$ in the normal direction of the basic circle from an involute curve 110 with the diameter of the sprocket 42 taken as the basic circle, and each of tooth faces Z4 of the two engaging pawls 42e facing backward with respect to the rotating direction of the sprocket 42 is composed of said involute curve as with that of gears of prior art.

As described above, the line inclined by $\beta$ is easy to slide through, that, is difficult to engage with the plurality of openings of the perforations 48a of the film 48.

For the sprocket 42 having two pairs of engaging pawls 42a and 42e arranged as described above, where, immediately after the start of the automatic film loading, one engaging pawl 42a engages first with the first opening arranged most closely to the tip of the leader of the plurality of openings of the upper perforations 48a in the leader of the leading end of the film 48, the engaging pawl 42e which composes a pair together with the engaging pawl 42a having engaged and is positioned directly behind the engaging pawl 42a engages with the second opening arranged next closely to the tip of the leader of the plurality of openings with the rotation of the sprocket 42. The rotational force form the sprocket 42 is transmitted through one pair of engaging pawls 42a and 42e to the upper perforations 48a in the leader of the leading end of the film 48, whereby the film 48 is fed from the film passage 14 into the patrone containing chamber 40 by the rotation of the sprocket 42.

In this case, the transmission of the rotational force from the sprocket 42 to the leader on the leading end of the film 48 immediately after the start of the automatic film loading is performed by the combination of the one pair of engaging pawls 42a and 42e of the sprocket 42 with the upper perforation 48a in the leader of the leading end of the film 48, whereby the rotational force is discributively loaded onto the two openings of the upper perforations 48a with which the one pair of engaging pawls 42a and 42e have engaged.

Accordingly, where the flexivitlity of the film 48 is lost at a lower temperature, or a large force is required to pull out the film 48 from the patrone 46 because of some cause, a damage to the upper perforations 48a in the leader of the leading end of the film 48 can be effectively prevented.

Figure 44:
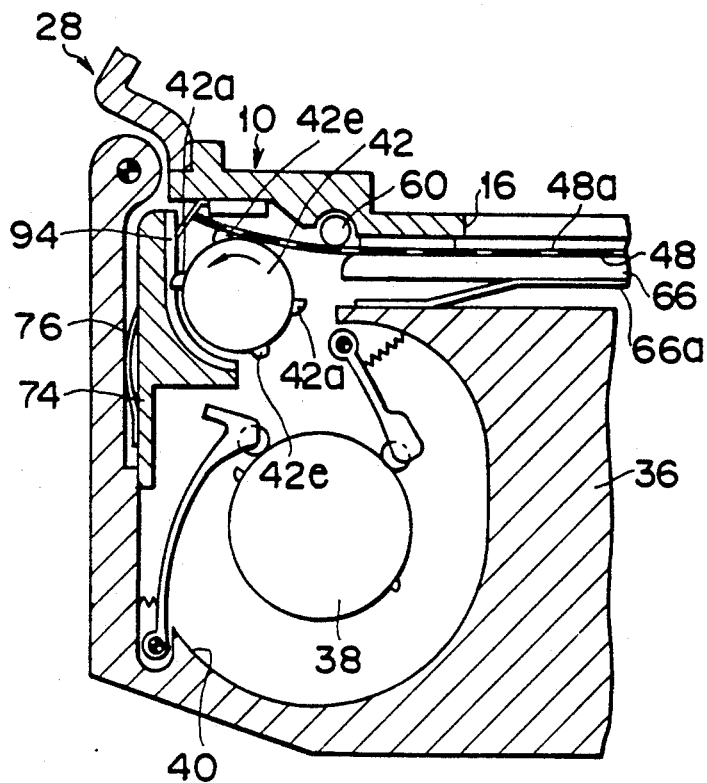

For the sprocket 42 having two pairs of engaging pawls 42a and 42e arranged as described above, where, immediately after the start of the automatic film loading, the engaging pawl 42e engages first with the first opening arranged most closely to the tip of the leader in the plurality of openings of the upper perforations 48a in the leader of the leading end of the film 48 as shown in FIG. 43, the film 48 with the rotation of the sprocket 42 is moved in the film passage 14 by the engaging pawls 42e toward the film guide sheet 76 and the guide surface 74a of the film guide member 74. However, the tip of the leader abuts on the film guide sheet 76 and the plurality of guide rails 94 on the guide surface 74a of the film guide member 74 and is subjected to a resistance, whereby the engagement of the engaging pawl 42e with the opening is released as shown in FIG. 44. Tooth face Z3 of the engaging pawl 42e inclined by β easily release the engagement with the opening. Further, with the release, the opening is not subjected to a large load, whereby a damage to the upper perforations 48a can be positively prevented.

Figure 45:
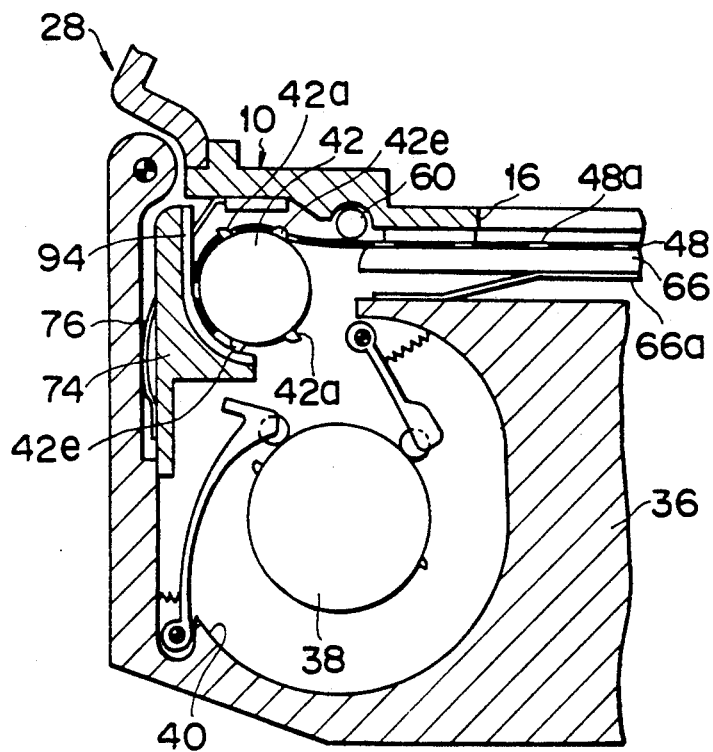

Then, when the sprocket 42 is further rotated, the engaging pawl 42a of the next pair engages with the second opening of the plurality of openings of the upper perforations 48a, and the engaging pawl 42e composing a pair together with the engaging pawl 42a having engaged engages subsequently with the third opening of the plurality of openings with the rotation of the sprocket 42 as shown in FIG. 45. The rotational force from the sprocket 42 is transmitted through one pair of engaging pawls 42a and 42e to the upper perforations 48a in the leader of the leading end of the film 48, whereby the film 48 is fed from the film passage 14 into the patrone containing chamber 40 by the rotation of the sprocket 42.

A distance of two intervals of the plurality of openings of the upper perforations 48a exists between the engaging pawl 42a having engaged and the other engaging pawl 42C of the pair having not engaged, whereby the region from the second opening relative to the tip of the leader is smoothly guided without developing a film jammed condition along the region on the outer peripheral surface of the sprocket 42 between the engaging pawl 42a having engaged and the other engaging pawl 42c of the pair positioned in front thereof by the above-mentioned action of the plurality of guide rails 94 on the guide surface 74a of the film guide member 74 with the further rotation of the sprocket 42 as shown in FIG. 45.

Figure 46:
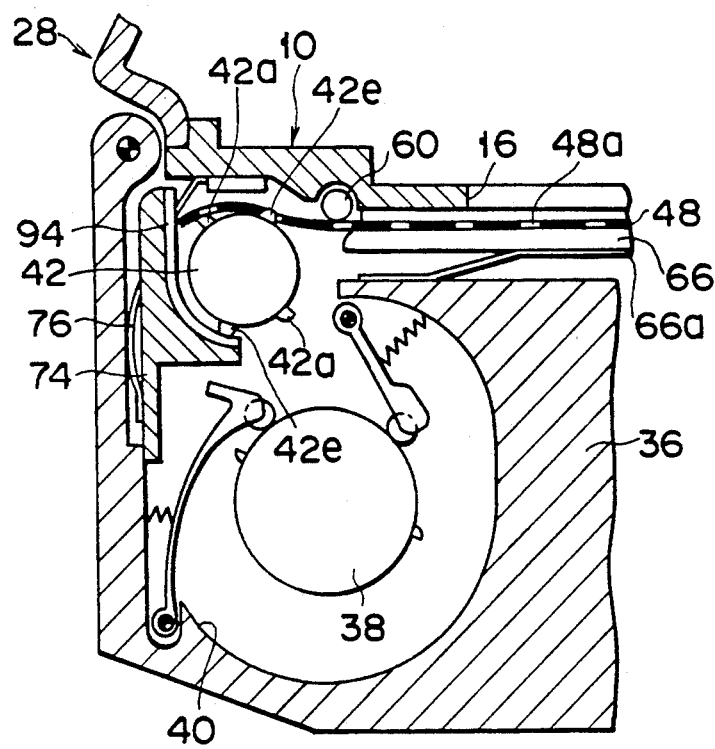
FIG. 46 is a schematic enlarged horizontal sectional view showing a third condition immediately after the start of the automatic film loading task by the sprocket pawls in FIG. 40.

For the sprocket 42 having two pairs of engaging pawls 42a and 42e arranged as describe above, where, immediately after the start of the automatic film loading, the engaging pawl 42e engages first with the second opening of the plurality of openings of the upper perforations 48a in the leader of the leading end of the film 48 as shown in FIG. 46, the film 48 with the rotation of the sprocket 42 is moved in the film passage 14 by the engaging pawl 42e toward the film guide sheet 76 and the guide surface 74a of the film guide member 74. However, the tip of the leader abuts on the film guide sheet 76 and the plurality of guide rails 94 on the guide surface 74a of the film guide member 74 and is subjected to a resistance, whereby the engagement of the engaging pawl 42e with the opening is released as shown in FIG. 44.

Then, when the sprocket 42 is further rotated, the engaging pawl 42a of the next pair engages with the second opening of the plurality of evenings of the upper perforations 48a, and the following engagement becomes the same condition as shown in FIG. 45.

Figure 47:
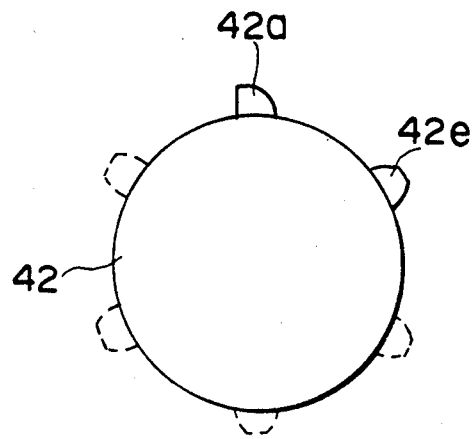
FIG. 47 is a schematic enlarged plan view showing a modification in arrangement of sprocket pawls acting as with that of the sprocket pawls in FIG. 40 at the automatic film loading task.

FIG. 47 shown another arrangement of two king engaging pawls 42a and 42e capable of exhibiting the same effect as that of two pairs of two king engaging pawls 42a and 42e shown in FIG. 41. In FIG. 47, only one pair of the engaging pawls 42a and 42e are arranged on the outer peripheral surface of the sprocket 42.

FIG. 48 shows another structure of the rear cover of a camera. The rear cover comprises a main rear cover 36a with which the region other than the inlet of the patrone containing chamber 12 of the back is covered in the closed position and which is supported releasably at the left end of the back of the camera body chassis 10, and a sub-rear cover 36b with which only the inlet of the patrone containing chamber 12 of the back is covered in the closed position which is supported releasably at the right end of the main rear cover 36a.

In the main rear cover 36a, are housed the major power supply batteries 44, the sprocket 42 and the spool 38. On the internal surface of the main rear cover 36a, is provided the other sprocket 112 near the patrone containing chamber 12 in the film passage 14. The sprocket 112 is used to feed the leading end of the film 48 previously pulled out of the patrone 46 along the film passage 14 to the other sprocket 42 positioned on the left end of the film passage 14 when only the sub-rear cover 36b is opened to load the patrone 46 into the patrone containing chamber 12.

Another embodiment of the sprocket 42 will be explained hereinafter. In this embodiment, the sprocket 42 has upper and lower guide rings 120a and 120b which are rotatably and loosely engaged with the sprocket 42 above the engaging pawls 42a on the upper end and below the engaging pawls 42b on the lower end as shown in FIGS. 49 and 50. FIG. 50 is a longitudinal sectional view of the sprocket 42 in FIG. 49, and FIG. 51 shows a sectional view taken along line E—E of FIG. 50. The outside diameter of the guide rings 120a and 120b is equal to each other, and lager than the diameter φD of the sprocket 42 based on respective bottoms of the engaging pawls 42a and 42b on the upper and lower ends. When part of the internal peripheral surface of the guide rings 120a and 120b is allowed to come in contact with the outer peripheral surface of the sprocket 42, part of the outer peripheral surface of the guide rings 120a and 120b corresponding to the part of the internal peripheral surface thereof having been contacted becomes approximately flush with the peripheral surface of the diameter φD of the sprocket 42.

When the rear cover 36 is moved from the open position shown in FIG. 49 to the closed position to cause the peripheral surface of the sprocket 42 to be moved to a position in front of the film 48 in the film passage 14, the upper end of the sprocket 42 is urged on the leader positioned on the upper half of the leading end of the film 48 positions on the left end in the film passage 14 as shown in FIG. 52, whereby the photographic emulsion coated surface on the leading end of the film 48 is urged on the guide roller 60 positioned near the sprocket 42 and in the back of the camera body chassis 10. At this point, the guide ring 120a is urged on the sprocket 42 by the elastic force of the film 48.

Then, the CPU shown in FIG. 11 controls the rotation of the bidirectional motor 70 in such a manner that the sprocket 42 is rotated in the counterclockwise direction as shown in FIG. 52 with arrow by the rotation force from the drive gear 70a of the bidirectional motor 70. One engaging pawl 42a on the upper end of the sprocket 42 engages with one of the plurality of openings of upper perforations 48a formed along the upper edge of the leader, thereby moving the film 48 along the film passage 14 toward the film guide sheet 76 between the left end in the back of the camera body chassis 10 and the left end of the rear cover 36 and toward the guide surface 74a of the film guide member 74 of the rear cover 36.

Figure 53:
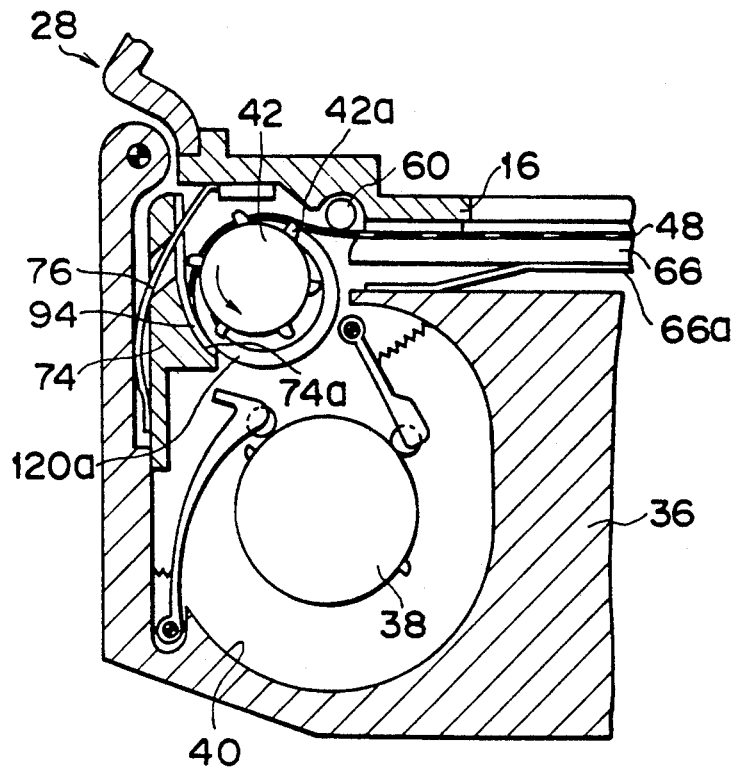
Figure 54:
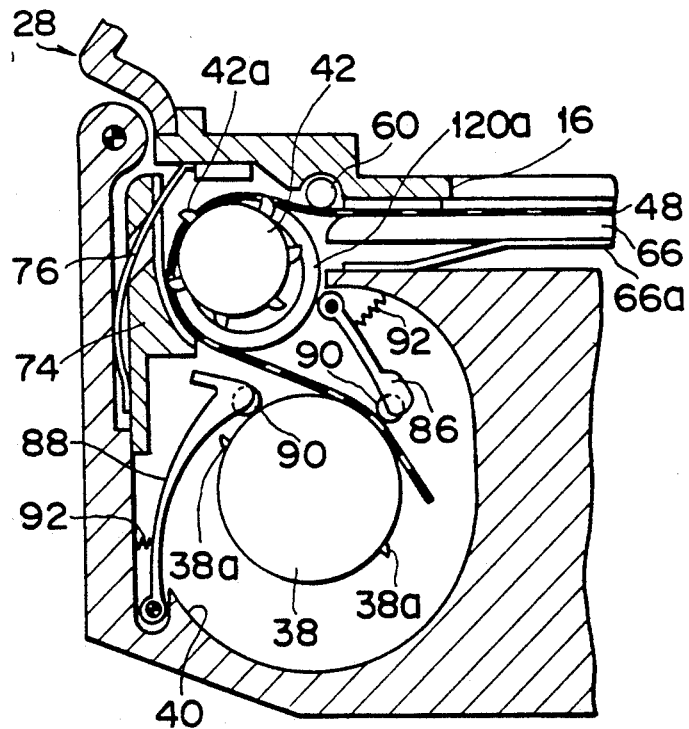

The tip of the leader is abutted on the film guide sheet 76 and the guide surface 74a of the film guide member 74, whereby the film 48 moved by the sprocket 42 is changed in the moving direction to the peripheral direction of the sprocket 42 as shown in FIG. 53. Then, the film 48 is pressed on the peripheral surface of the spool 38 by the roller 90 of the first film setting lever 86 as shown in FIG. 54.

When the tip of the leader of the film 48 reaches the peripheral surface of the spool 38, the CPU shown in FIG. 11 controls the bidirectional motor 70 in a manner to rotate reversely the drive gear 70a, thereby transmitting the rotational force from the drive gear 70a of the bidirectional motor 70 to the spool 38.

Figure 55:
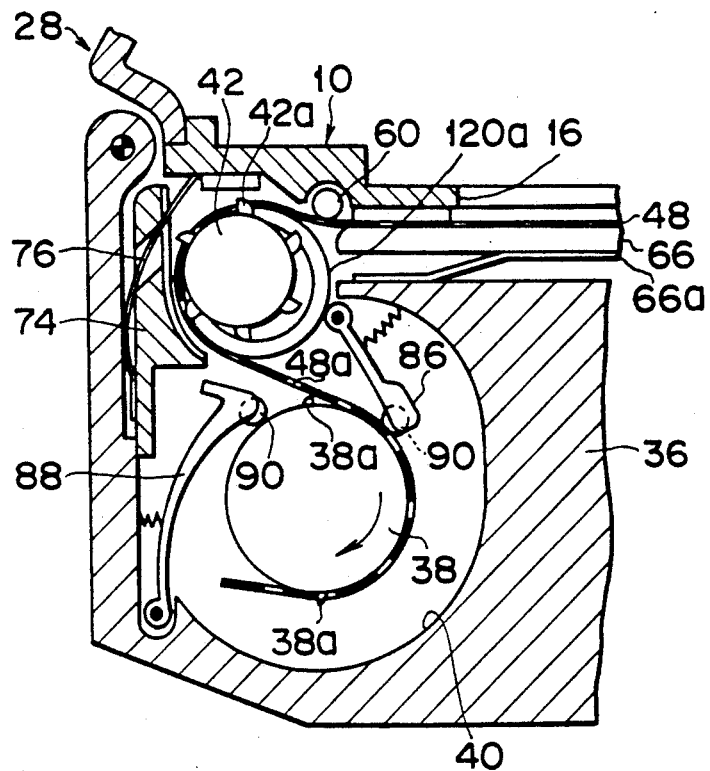
FIGS. 55 and 56 are schematic enlarged horizontal sectional views showing sequentially a state in which the spool of the film winding mechanism takes up the film leading end from the sprocket of the film feed mechanism in the latter half of the automatic loading.

The spool 38 engages one of the plurality of engaging pawls 38a on the upper end thereof with one of the plurality of openings of the upper perforations 48a in the leader of the leading end of the film 48 as shown in FIG. 55, thereby taking up the leader in a condition that the photographic emulsion coated surface is faced inward in the radial direction of the spool 38.

The CPU (FIG. 11) measuring the rotation amount of the sprocket 42 by the number of output pulses from the sprocket rotation measuring unit 72 (FIG. 4) (that is, the travel or movement distance of the film 48 by the sprocket 42) stops the rotation of the drive gear 70a of the bidirectional motor 70 at the time when the number of output pulses become equal to or larger than a specified number of pulses $N_2$ (FIG. 13) required to take up exactly the leading end of the film 48 around the spool 38.

Figure 56:
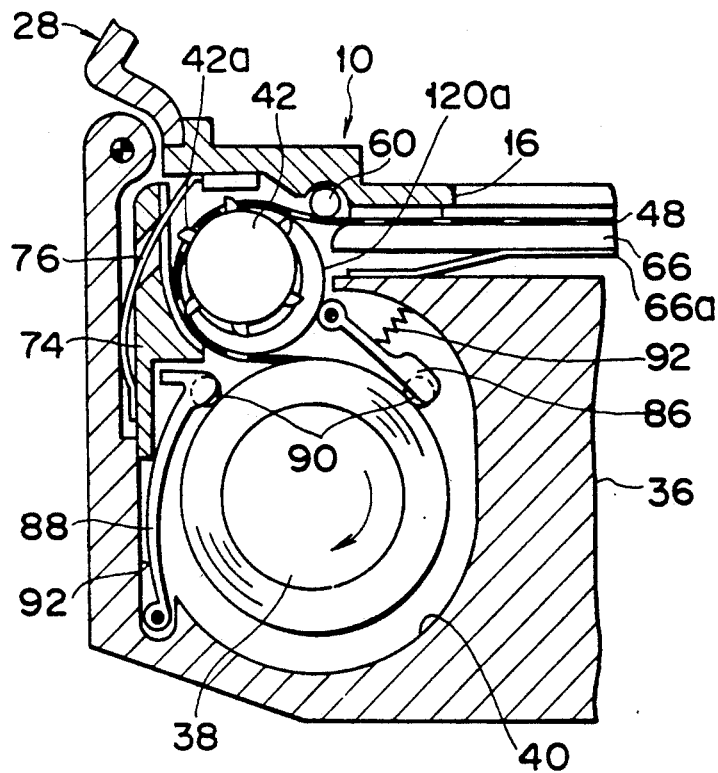

FIG. 56 shows a condition in which the photographed region of the film 48 has been taken up around the spool 38 in layers by the photographing of a plurality of film frames after the completion of the automatic film loading task.

FIG. 57 shows schematically the second film guide 109 formed on the left end of the relief concavity 10a on the left end of the back of the camera body chassis 10.

Also, in this embodiment, the second films guide 109 functions as with the above-mentioned embodiment. That is, if of the plurality of the engaging pawls 42a on the upper end of the sprocket 42, the one having approached first the leader of the leading end of the film 48 immediately after the start of the above-mentioned automatic film loading is not immediately engaged with one of the plurality of openings of the upper perforations 48a of the leader, the single second film guides 109 allows a condition in which the bridge between the plurality of openings of the upper perforations 48a in the upper edge of the leader is urged by the engaging pawl 42a having approached first the film 48 and the upper edge is pushed and bent into the relief concavity 10a as shown in FIG. 57, thereby preventing the leader from being damaged. When the engaging pawl 42a then engages with one of the plurality of openings of the upper perforations 48a in the leader to cause the tip of the leader to be moved toward the guide surface 74a of the film guide member 74 by the rotation of the sprocket 42 as shown in FIG. 58, the second film guide 109 also forces the tip to move along the peripheral surface of the sprocket 42 and smoothly slide onto the guide surface 74a of the film guide member 74.

If, of the engaging pawls 42a on the upper end of the sprocket 42 having started to rotate immediately after the start of the automatic film loading task, the one coming in contact with first the leader of the leading end of the film 48 positioned on the left end in the film passage 14 has not engaged with one of the plurality of openings of the upper perforations 48a in the leader, then the engaging pawl 42 having not engaged pushes a bridge between the plurality of openings of the upper perforations 48a in the leader into the relief concavity 10a as shown in FIG. 59. The upper perforations 48a are positioned above the film guide protrusion 109, whereby the upper edge of the leader is gently curve and pushed into the relief concavity 10a as shown in FIG. 60. FIG. 60 is a longitudinal sectional view taken along line F—F of FIG. 58. This causes the film 48 as well as the bridge between the plurality of openings of the upper perforations 48a in the leader to develop no damage such as bending and breaking even if the upper edge of the leader on the leading end of the film 48 is pushed by the engaging pawl 42a having not engaged as described above in a condition that the flexibility of the film 48 decreases at a lower temperature. Such a damage is apt to develop a film jammed condition during the automatic film loading task and a larger damage to the film 48.

FIG. 61 shows a further arrangement of a plurality of engaging pawls 42a on the upper end of the sprocket 42. In the arrangement, the plurality of engaging pawls 42a are arranged at the equal pitches to that of the plurality of openings and engaged continuously with the plurality of openings. Each of the engaging pawls 42a has the same configuration as that of the above-mentioned engaging pawls 42a shown in FIG. 30.

FIG. 62 shows a structure of the sprocket 42 cooperating with the plurality of film guide rails 94 on the guide surface 74a of the film guide member 74 in order to prevent effectively a trend that the lower edge of the leader on the leading end of the film 48 is separated from the peripheral surface of the sprocket 42 as shown in FIG. 31 while the film 48 is fed by the rotation of the sprocket 42 in a condition that the plurality of engaging pawls 42a on the upper end of the sprocket 42 are engaged only with the plurality of openings of the upper perforations 48a in the leader of the leading end immediately after the start of the automatic film loading. This sprocket 42 is the same in structure as the sprocket 42 shown in FIG. 32 expect that, in this sprocket 42, the upper and lower guide rings 120a and 120b are loosely engaged with the part above the upper engaging pawls 42a and the part below the lower engaging pawls 42b on both the upper and lower ends. In this sprocket 42, bending of the film 48 around the outer peripheral surface of the sprocket 42 cause the upper and lower guide rings 120a and 120b to be moved eccentrically, and part of the outer peripheral surface of the rings to be located in the same plane as that of the sprocket 42, whereby the upper and lower edges of the film 48 are supported without being bent inward in the radial direction of the sprocket 42. The upper and lower guide rings 120a and 120b are opposed to the two film guide rails 94 on the upper and lows ends of the guide member 74 and cooperate therewith to prevent the sharp bending.

Figure 63A:
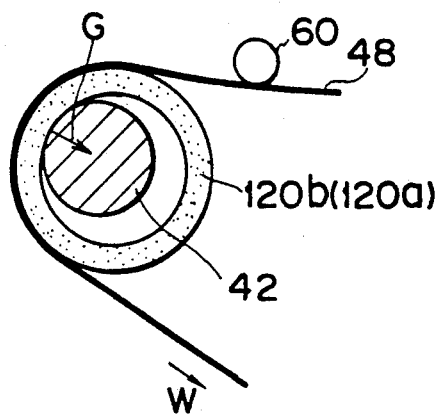
FIGS. 63A to 63C are sectional views showing sequentially the condition of the guide rings on the sprocket immediately after the start of the film winding task, during the winding task, and after the completion of the winding task.
Figure 63B:
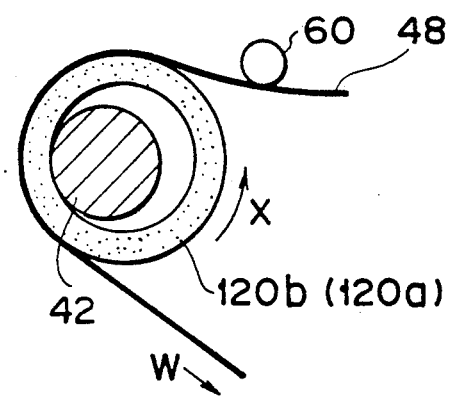
Figure 63C:
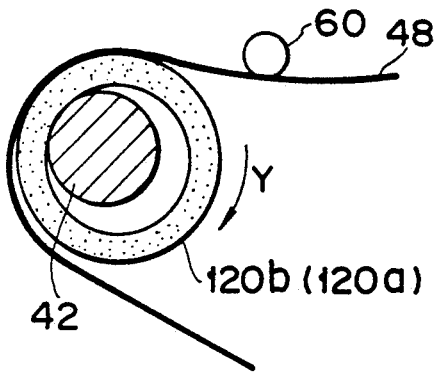

FIG. 63A through FIG. 63C are views showing the action of the upper and lower guide rings 120a and 120b associating with the film winding task after the completion of the automatic film loading task, and views corresponding to sectional view taken along line E—E of FIG. 50. FIG. 63A shows a condition immediately after the start of the film winding track, FIG. 63B a condition during the film winding task, and 63C a condition after the completion of the film winding task.

In FIG. 63A, when the film winding task is started and the film 48 is pulled in the arrow W by the spool 38 not shown, the guide rings 120a and 120b are moved eccentrically with respect to the sprocket 42 by being subjected to the load due to the tension to the film 48 whereby the inner peripheral surface of the guide rings 120a and 120b is pressed on the outer peripheral surface of the sprocket 42. Then, as shown in FIG. 63B, the guide rings 120a and 120b are rotated in the arrow X direction while sliding on the sprocket 42 in the travelling direction of the film 48 by the friction force with the film 48. When the winding of one frame of the film 48 is completed and the rotation of the spool 38 is stopped, the tension of the film 48 and the friction force associating with the traveling of the film 48 acting on the guide rings 120a and 120b are not developed. Accordingly, as shown in FIG. 63C, the guide rings 120a and 120b are rotated reversely in the arrow Y direction to a stable position by the elasticity of the film 48. At this point, the film 48 is separated partly from the outer peripheral surface of the guide rings 120a and 120b. As a result, the film 48 is curved backward from the film passage 14 and toward the spool 38 in a condition that the film 48 has a radius larger than that of the outer periphery of the guide rings 120a and 120b.

Comparing the bending condition of the film 48 on the outer peripheral surface of the sprocket 42 on which the guide rings 120a and 120b are not provided with that of the film 48 on the outer peripheral surface of the sprocket 42 on which the guide rings 120a and 120b are provided, the outside diameter of the guide rings 120a and 120b is larger than the diameter $\phi$ D (FIG. 50) of the sprocket 42 up to the bottom of the outer peripheral surface of the sprocket 42, whereby the film 48 is curved gently with a curvature smaller than that of the diameter $\phi$ D of the sprocket 42 by the guide rings 120a and 120b. Also, the guide rings 120a and 120b are movable eccentrically with respect to the sprocket 42, whereby the guide rings 120a and 120b are moved from the position of the film winding task upon the completion of the film winding task as shown in FIG. 63C, and the film 48 is curved gently with a much smaller curvature. As a result, even if the film 48 is left as it is for a long time with the film winding task remaining completed, no permanent curvature is developed in the curved area of the film 48 on the sprocket 48.

Figure 64:
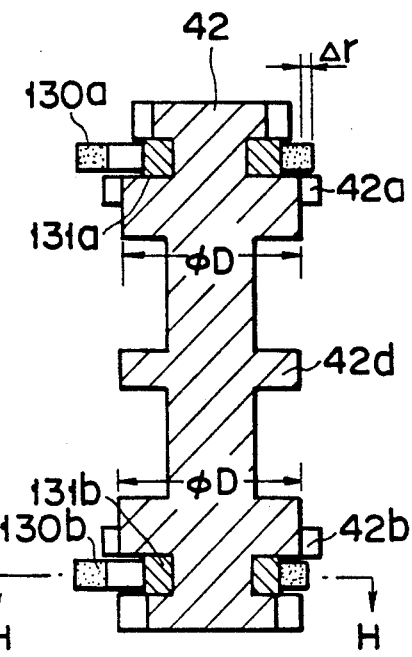
FIG. 64 is a longitudinal sectional view showing a sprocket having guide rings and elastomeric members.
Figure 65:
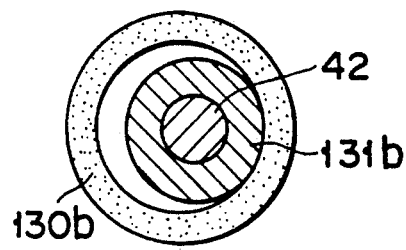
FIG. 65 is a sectional view taken along line H-H of FIG. 64.

With reference to FIGS. 64 and 65, a modification of the sprocket having guide rings will be explained hereinafter. Since those other than the above-mentioned sprocket 42 and guide rings have the same composition, the same parts and designated by the same reference numerals and only the guide rings will be explained. FIG. 65 shows a sectional view taken along line H—H of FIG. 64.

As shown in FIGS. 64 and 65, on both the upper and lower ends of the sprocket 42, are arranged movably and eccentrically upper and lower guide rings 130a and 130b near the positions above and below engaging pawls 142a and 142b.

In the radially inside space of the upper and lower guide rings 130a and 130b, elastomeric members 131a and 131b which have an outer peripheral surface with a diameter smaller than that of the inner peripheral surface of the guide rings 130a and 130b and are made, of for example, silicon rubber are mounted concentrically on the outer surface of a sprocket 132. The upper and lower guide rings 130a and 130b thus located a composed in such a manner that, when the guide rings 130a and 130b are move eccentrically with respect to the corresponding upper and lower elastomeric member 131a and 131b to cause part of the inner peripheral surfaces thereof to come in contact with the outer peripheral surfaces of the corresponding upper and lower elastomeric members 131a and 131b, the parts on the outer peripheral surfaces of the upper and lower elastomeric members 131a and 131b corresponding to the contacted positions are protruded outward in the radial direction by small amount $\Delta r$ beyond the diameter $\phi$ D of the outer peripheral surface of the sprocket 132 up to the bottoms of engaging pawls 132a and 132b.

Figure 66A:
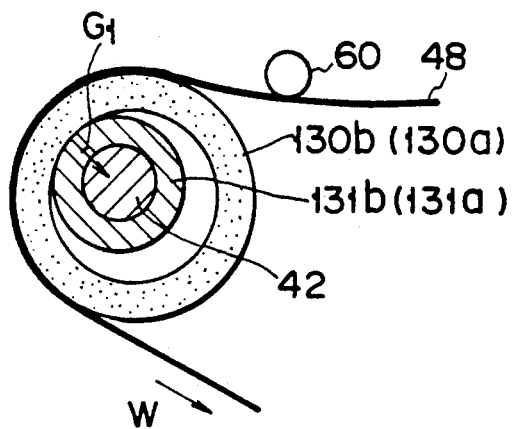
FIGS. 66A to 66C are views showing sequentially the relative relationship in position between the rings and the elastomeric members on the sprocket immediately after the start of the film winding task, during the winding task, and after the completion of the winding task.
Figure 66B:
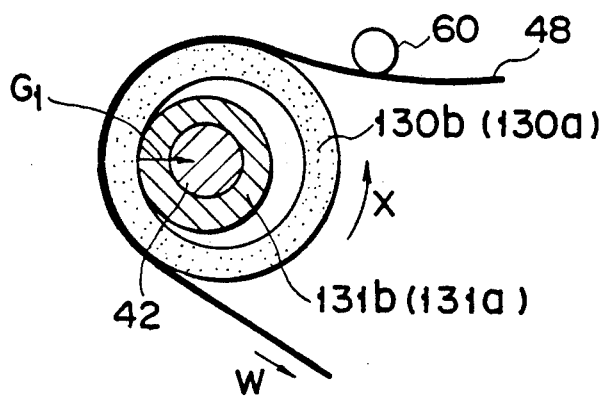
Figure 66C:
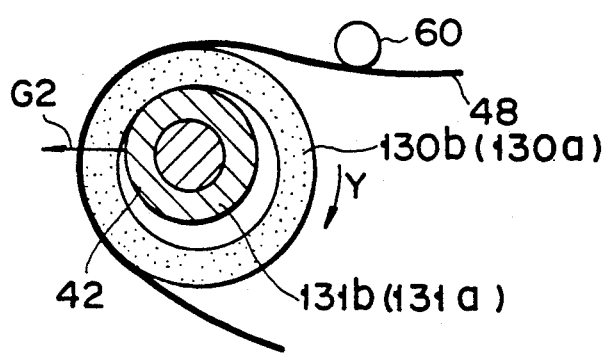

As shown in FIG. 66A through FIG. 66C, a load $G_1$ developed by the tension of the film 48 applied to the guide rings 130a and 130b immediately after the start of the film winding task urges the guide rings 130a and 130b in such a manner that part of the inner peripheral surface thereof is pressed on parts of the outer peripheral surfaces of the corresponding elastomeric members 131a and 131b. At this point, the elastomeric members 131a and 131b are elastically deformed until the part of the outer peripheral surface of the guide ring 130 becomes flush with the bottom of the outer peripheral surface of the sprocket 42 by the load $G_1$. In this condition, when the film 48 is caused to travel in the arrow W direction by the rotation of the spool 38, the guide rings 130a and 130b are rotated in the X direction while sliding in the travelling direction of the film 48 on the outer peripheral surface of the elastomeric member 131a and 131b elastically deformed as described above by the friction force with the film 48 as shown in FIG. 66B. When the winding of one frame of the film 48 is completed and the rotation of the spool 38 is stopped, the tension of the film 48 and the friction force associating with the traveling of the film 48 acting on the guide rings 130a and 130b are not developed. Accordingly, as shown in FIG. 66C, the guide rings 130a, and 130b are rotated reversely in the arrow y direction to a stable position by the elasticity of the film 48.

In this condition, the elastic deformation of the elastomeric members 131a and 131b is also reset to the initial condition. At this point, also by a load $G_2$ developed by the elastic reset of the elastomeric members 131a and 131b, the guide rings 130a and 130b are slightly pushed back outward in the radial direction. By such action of the guide rings 130a and 130b, the film 48 is separated partly from the outer peripheral surface of the guide ring 130a and 130b. As a result, the film 48 is curved backward from the film passage 14 and toward the spool 38 in a condition that the film 48 has a radius larger than that of the outer periphery of the guide rings 130a and 130b. Comparing the the above-mentioned embodiment shown in FIG. 62 and FIG. 63A through FIG. 63C where the sprocket 42 has only the guide rings 120a and 120b and not the elastomeric members 131a and 131b, this embodiment has an effect that the film 48 is caused to be curved on the sprocket 42 toward the spool 38 with a much smaller curvature reduced by the amount corresponding to the above-mentioned elastic phenomenon of the elastomeric members 131a and 131b.

Figure 68A:
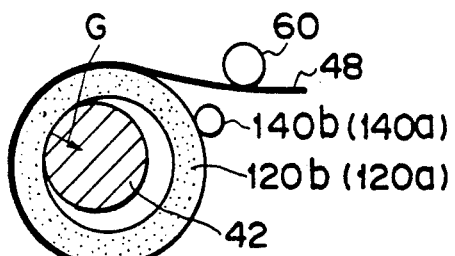
FIGS. 68A to 68C are views showing sequentially the relative relationship in position between the guide rings and the movement restricting rollers immediately after the start of the film winding task, during the winding task, and after the completion of the winding task.
Figure 67:
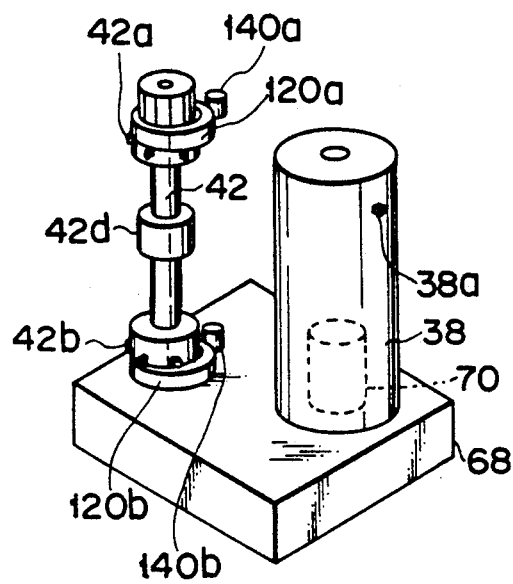
FIG. 67 is a view showing a condition of the arrangement of movement restricting rollers used in combination with the sprocket having guide rings.
Figure 68B:
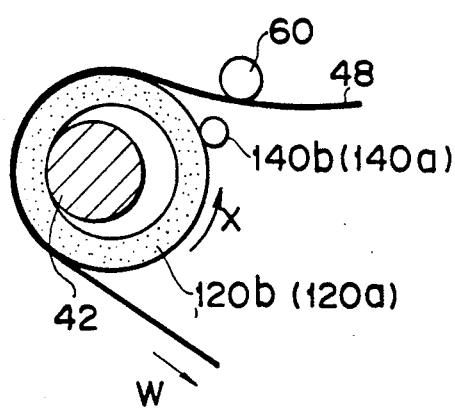
Figure 68C:
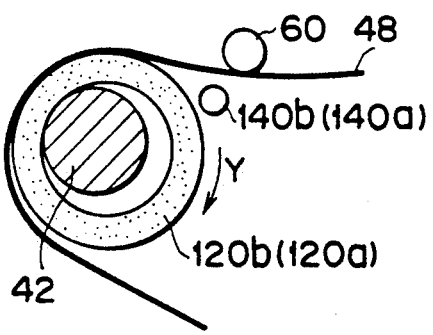

With reference to FIG. 67 and FIG. 68 through FIG. 68C, a still further modification of the sprocket having guide rings will be explained hereinafter. Since those other than the above-mentioned sprocket having guide rings shown in FIG. 62 and FIG. 63A through FIG. 63C which has the guide rings 120a and 120b and not the elastomeric members 131a and 131b and other then upper and lower movement restricting rollers 140a and 140b being in contact with the outer peripheral surface of the guide rings 120a and 120b have the same composition, the same parts are designated by the same reference numeral and only the movement restricting rollers 140a and 140b will be explained.

When the upper and lower guide rings 120a and 120b are moved eccentrically by a specified amount or more into the relief concavity 10a at the film winding, the internal surface of the relief concavity 10a of the camera body chassis 10 comes contact with the photographic emulsion coated surface of the film 48 to cause not only the photographic emulsion coated surface to be damaged, but also the accuracy of the winding amount of the film 48 to be lowered by the variation of the eccentric amount. Accordingly, in this modification, in order to restrict the upper and lower guide rings 120a and 120b within a specified amount of the eccentricity into the relief concavity 10a, the rotatable movement restricting rollers 140a and 140b are provided which abut on the guide rings 120a and 120b moved eccentrically by a specified amount into the relief concavity 10a as shown in FIG. 67.

As shown in FIG. 68A, the guide rollers 140a and 140b are separated from the guide rings 120a and 120b immediately after the start of the film winding task. When the guide rings 120a and 120b are moved eccentrically by a specified amount or more into the relief concavity 10a during the winding task as shown in FIG. 68B, the movement restricting rollers 140a and 140b abut on the guide rings 120a and 120b. The movement restricting rollers 140a and 140b are rotatably provided, thereby not preventing the rotation of the guide rings 120a and 120b. Then, after the completion of the film winding task, the reverse rotation of the guide rings 120a and 120b in the Y direction causes the guide rings 120a and 120b to be separated again from the movement restricting rollers 140a and 140b as shown in FIG. 68C.

The guide rollers 140a and 140b may be applied to the above-mentioned sprocket shown in FIGS. 64 and 65 which has the guide rings 130a and 130b, and the elastomeric members 131a and 131b, in which case the same effect can also be obtained.

Figure 69:
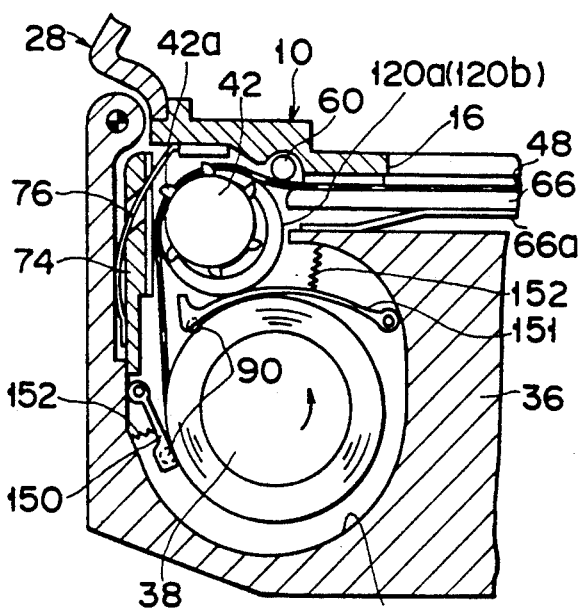
FIG. 69 is a schematic horizontal sectional view showing the film winding mechanism of the present invention arranged in a manner to take up film around the spool with the emulsion coated surface thereof intermost.

FIG. 69 shows a composition by which the film 48 with the photographic emulsion coated surface thereof faced inward is taken up around the spool 38. In the composition, first and second film setting levers 150 and 151 whose base end is supported pivotally on the internal surface of the spool containing chamber 40 approach the outer peripheral surface of the spool 38 in the counterclockwise direction, and the film setting roller 90 at the tip thereof is pressed on the outer peripheral surface of the spool 38 by an urging member 152. During the film winding task, after the sprocket 42 is rotatably driven in the counterclockwise direction as described above, the spool 38 is rotated in the counterclockwise direction conversely to the one described above and winds the film 48. In such a composition, the angle at which the film 48 is curved toward the spool 38 is more gentle than that in the case described above.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A camera comprising:
   a camera body in which an opening is mounted for determining a photographing bundle of rays and for forming a photographing picture, and a patrone containing chamber is located sidewardly adjacent to the opening and is used for containing a patrone to be used for the camera,
   a rear cover coupled to the camera body so as to be openable and closable for mounting the patrone into the patrone containing chamber and dismounting the patrone from the patrone containing chamber;
   a sprocket which is pivotally supported by the rear cover behind an imaginary plane including the opening of the camera body and which is used for feeding a film, the film being exposed by the photographing bundle of rays passing through the opening, toward the backside of the imaginary plane; and
   a spool which is pivotally supported by the rear cover behind the opening and the sprocket and which takes up the film, fed toward the backside by the sprocket, with a photographic-emulsion coating surface of the film being located radially inside on the pool.

2. A camera according to claim 1, wherein the camera further comprises:
   a pair of film guide rails which are mounted on the camera body, and a freely rotatable guide roller which is located between the opening and the sprocket and a rear end of a peripheral surface of which is positioned in an imaginary plane in which the paired film guide rails are also positioned.

3. A camera according to claim 2, wherein a front end of a peripheral surface at an engaging pawl base portion of the sprocket is forwardly positioned for a predetermined amount of distances from the rear end of the peripheral surface of the guide roller.

4. A camera of a film auto-loading type, comprising:
   a camera body in which an opening is mounted for determining a photographing bundle of rays and for forming a photographing picture, and a patrone containing chamber is located adjacent to the opening and is used for containing a patrone to be used for the camera;

a rear cover coupled to the camera body so as to be openable and closable for mounting the patrone into the patrone containing chamber and dismounting the patrone from the patrone containing chamber;

a sprocket which is pivotally supported by the rear cover behind an imaginary plane including the opening and which is used for feeding a film, the film being exposed by the photographing bundle of rays passing through the opening, toward the backside of the imaginary plane;

a spool which is pivotally supported by the rear cover behind the opening and the sprocket and which takes up the film, fed toward the backside by the sprocket, with a photographic-emulsion coating surface of the film being located radially inside on the spool;

a guide member which is located to surround the sprocket and is used for guiding a leading end of the film;

sprocket driving means for rotatably driving the sprocket to feed the film, which is arranged at a predetermined position in a film passage of the camera body, by means of the sprocket along the film passage; and spool driving means for rotatably driving the spool to take up the film, which is fed for a predetermined distance from the sprocket, by means of the spool on the spool.

5. A camera of a film auto-loading type, comprising:
a camera body in which an opening is mounted for determining a photographing bundle of rays and for forming a photographing picture, and a patrone containing chamber is located adjacent to the opening and is used for containing a patrone to be used for the camera;

a rear cover coupled to the camera body so as to be openable and closable for mounting the patrone into the patrone containing chamber and dismounting the patrone from the patrone containing chamber;

a sprocket which is pivotally supported by the rear cover behind an imaginary plane including the opening and which is used for feeding a film, the film being exposed by the photographing bundle of rays passing through the opening, toward the backside of the imaginary plane;

a spool which is pivotally supported by the rear cover behind the opening and the sprocket and which takes up the film, fed toward the backside by the sprocket, with a photographic-emulsion coating surface of the film being located radially inside on the spool;

a guide member which is located to surround the sprocket and is used for guiding a lading end of the film;

sprocket driving means for rotatably driving the sprocket to feed the film, which is arranged at a predetermined position in a film passage of the camera body, by means of the sprocket along the film passage;

spool driving means for rotatably driving the spool to take up the film, which is fed for a predetermined distance from the sprocket, by means of the spool on the spool;

said camera body having a film guide rail at a position which is opposed to engaging pawls of the sprocket, the engaging pawls being engageable with perforations of the leading end of a leader portion of the film, and said film guide rail being located inwardly from the engaging pawls in a width direction of the film; and a region of the camera body, which is located outwardly from the guide rail in the width direction of the film, being outwardly indented from a rotational locus of top ends of the engaging pawls in a radial direction of the sprocket.

6. A camera according to claim 5, wherein an opening side end of the film guide rail is formed outside of the rotational locus of the top ends of the engaging pawls of the sprocket in the radial direction thereof; and
the film guide rail has an inclined shape which projects gradually inside of the rotational locus in the radial direction with the film guide rail being gradually farther away from the opening.

7. A camera according to claim 4, wherein:
the guide member has a film guide rail at a substantially center position in the width direction of the film, and
the film guide rail projects toward a rotational center of the sprocket and extends in parallel to the engaging pawls of the sprocket.

8. A camera according to claim 4, wherein a side surface of each of the engaging pawls of the spool, the side surface being located adjacent to the side edge of the film to be engaged at its perforations with the engaging pawls of the spool, is provided with an inclined surface.

9. A film winding mechanism of a camera, comprising:
a rotation drive source having an output gear;
a planetary gear revolving on a specified orbit by a rotational force transmitted from the output gear of the rotation drive source;
a film feed sprocket having an input gear located on the orbit of the planetary gear;
a film take-up spool having an input gear which is located at a position separated in the peripheral direction from the input gear of the film feed sprocket and on the orbit of the planetary gear;
film feed distance measurement means for measuring a specified film feed distance by the film feed sprocket; and
rotation drive source control means which is connected to the rotation drive source and the film feed distance measurement means, which engages the planetary gear with the input gear of the film feed sprocket by controlling the rotation drive source in a manner to rotate the output gear in one direction when a rear cover of the camera is closed, which feeds film by means of the film feed sprocket by transmitting the rotational force from the rotation drive source to the film feed sprocket, which then engages the planetary gear with the input gear of the film take-up spool by controlling the rotation drive source in a manner to rotate the output gear in the other direction when the control means receives a film feed distance measuring signal from the film feed distance measurement means, and which takes up the film fed for a specified distance from the film feed sprocket on the film take-up spool by transmitting the rotational force from the rotation drive source to the film take-up spool.

10. A film winding mechanism of a camera according to claim 9, wherein an inclined surface is provided on a surface of the each engaging pawl of the film take-up spool, the surface being located adjacent to a side edge of the film in which perforations to be engaged with the pawls of the spool are formed.

11. A film winding mechanism of a camera, comprising:
   a rotation drive source having an output gear;
   a planetary gear mechanism having a sun gear to which the rotational force is transmitted from the output gear of the rotation drive source, a planetary gear linked by a planetary arm to the sun gear while engaging with the sun gear, and an internal gear support member including an arc-shape internal located gear outside the planetary gear in the radial direction of the sun gear to be engaged with the planetary gear rotating around the sun gear;
   a film feed sprocket having an input gear located outside the one end of the internal gear support member on an orbit of the planetary gear in the planetary gear mechanism;
   a film take-up spool having an input gear located outside the other end of the internal gear support member on the orbit of the planetary gear in the planetary gear mechanism;
   film feed distance measurement means for measuring a specified film feed distance by the film feed sprocket; and
   rotation drive source control means which is connected to the rotation drive source and the film feed distance measurement means, which engages the planetary gear with the input gear of the film feed sprocket by controlling the rotation drive source in a manner to rotate the output gear in one direction when a rear cover of the camera is closed, which feeds film by means of the film feed sprocket by transmitting the rotational force from the rotation drive source to the film feed sprocket, which then engages the planetary gear with the input gear of the film take-up spool by controlling the rotation drive source in a manner to rotate the output gear in the other direction when the control means receives a film feed distance measuring signal from the film feed distance measurement distance means, which takes up the the film fed for a specified distance from the film feed sprocket on the film take-up spool by transmitting the rotational force from the rotation drive source to the film take-up spool, and which controls the rotation drive source in a manner to rotate the output gear in the other direction until the planetary gear of the planetary gear mechanism is engaged with the internal gear of the internal gear support member when the control means does not receive the film feed distance measuring signal from the film feed distance measurement means in a specified time after the start of the transmission of the rotational force from the rotation drive source to the film feed sprocket.

12. A film winding mechanism which is used in an automatic film loading system camera, comprising:
   a movable member which is provided to be approachable to and separable from film located at a specified position in a film passage of a camera body, and is moved from a separated position to an approaching position when an automatic film loading task starts;
   a sprocket which is supported rotatably on the movably member, comes in contact with a surface of the film located at the specified position in the film passage of the camera body, the surface being not coated with a photographic emulsion, when the movable member is located in the approaching position, and has engaging pawls engaging with perforations of the film; and
   sprocket drive means which drives rotatably and selectively the sprocket to feed the film along the film passage by the sprocket in a condition that the movable member is located in the approaching position.

13. A film winding mechanism of a camera according to claim 12, wherein the movable member is a rear cover whose one end portion is mounted rotatably on the camera body and which opens and closes pivotally with the one end portion as a pivoting center.

14. A film winding mechanism of a camera according to claim 13, wherein the film winding mechanism further comprises a guide member which is located in the movable member to surround the sprocket and is used for guiding a leading end of the film.

15. A film winding mechanism of a camera according to claim 14, wherein the film winding mechanism further comprises a guide sheet which is arranged to connect continuously the film passage of the camera body with the guide member and is used for guiding the leading end of the film.

16. A film winding mechanism of a camera according to claim 13, further comprising:
   a patrone containing chamber in the camera body;
   a patrone pressing member provided at a position of the patrone containing chamber corresponding to one end of an axial direction of a patrone which is contained in the patrone containing chamber, and which presses the axial end surface of the patrone in the axial direction; and
   a high-friction member provided at a position of the patrone containing member corresponding to the other end of the axial direction.

17. A film winding mechanism of a camera according to claim 13, further comprising a film pressing member provided at a specified position of the film passage of the camera body, and the film pressing member having a projecting end at a side of a surface of the film, the surface being not coated with a photographic emulsion, to prevent a leader portion of the film from rising up from the film passage.

18. A film winding mechanism of a camera according to claim 13, wherein the movable member comprises a rear cover whose one end portion is mounted rotatably on the camera body and which opens and closes pivotally with the one end portion as a pivoting center.

19. A film winding mechanism which is used in an automatic film loading system camera, comprising:
   a movable member which is provided to be approachable to and separable from film located at a specified position in a film passage of a camera body, and is moved from a separated position to an approaching position when an automatic film loading task starts;
   a sprocket which is supported rotatably on the movable member, comes in contact with a surface of the film located at the specified position in the film passage of the camera body, the surface being not coated with a photographic emulsion, when the movable member is located in the approaching position, and has engaging pawls engaging with perforations of the film;

sprocket drive means which drive rotatably and selectively the sprocket to feed the film along the film passage by the sprocket in a condition that the movable member is located in the approaching position;

said engaging pawls of the sprocket, which engage with the perforations formed at a cut-out portion opposing side edge of a leading end portion of the film located at the specified position in the film passage of the camera body, being provided in a manner to engage with a plurality of openings of the perforations at intervals of at least a double of a distance from an opening to the next one, the engaging surface of each engaging pawl comprising a line whose curvature is smaller than that of an involute curve with a diameter of the sprocket taken as a basic circle thereof; and a relief portion being provided in a part of the camera body opposed to the sprocket when the movable member is located in the approaching position, the relief portion accommodating the engaging pawls protruding into the photographic emulsion coated surface side from the openings of the perforations in the leader of the leading end portion of the film to prevent the part from being in contact with the protruding ends of the engaging pawls.

20. A film winding mechanism which is used for automatic film loading system cameras, comprising:

a movable member which is provided approachable to and separable from film located at a specified position in a film passage of a camera body, and which is moved from a separated position to an approaching position when an automatic film loading task starts;

a sprocket which is supported rotatably by the movable member, and which comes in contact with a surface of the film located at the specified position in the film passage of the camera body, the surface being not coated with a photographic emulsion, when the movable member is located in the approaching position, and has engaging pawls engaging with perforations of the film; and sprocket drive means which drives rotatably and selectively the sprocket to feed the film along the film passage by the sprocket in a condition that the movable member is located in the approaching position; and wherein:

the engaging pawls of the sprocket, which engage with the perforations formed at a cut-out portion opposing side edge of a leading end portion of the film located at the specified position in the film passage of the camera body, are provided in a manner to engage with groups in a plurality of openings of the perforations, each group comprising two openings adjacent to each other, and the groups being located at intervals of at least a double of a distance from an opening to the next one;

the engaging surface of each engaging pawls which engage with one opening located at the tip side of the film in one group of the plurality of openings of the perforations, comprises a line whose curvature is smaller than that of an involute curve with a diameter of the sprocket taken as a basic circle thereof, and the engaging surface of the other engaging pawl, which engage with the remaining one opening in the above-described one group, comprises the involute curve; and a relief portion is provided in a part of the camera body opposed to the sprocket when the movable member is located in the approaching position, the relief portion accommodating the engaging pawls protruding into the photographic emulsion coated surface side from the openings of the perforations in the leader of the leading end portion of the film to prevent the part from being in contact with the protruding ends of the engaging pawls.

21. A film winding mechanism of a camera according to claim 12, wherein:

the engaging pawls of the sprocket, which engage with the perforations formed at a cut-out portion opposing side edge of a leading end portion of the film located at the specified position in the film passage of the camera body, are provided in a manner to engage continuously with a plurality of openings of the other perforation;

film feed distance measurement means, which measures the film feed distance of the film fed by the sprocket on a basis of the rotation of the sprocket and generates a film feed distance measuring signal, is provided on the sprocket; and the film feed distance measurement means and the sprocket drive means are connected to sprocket drive control means which controls the sprocket drive means in a manner to stop the feeding of the film by the sprocket drive means when the sprocket drive control means detects that the film feed distance reaches a specified amount, on a basis of the film feed distance measuring signal from the film feed distance measurement means.

22. A film winding mechanism of a camera according to claim 20, wherein:

the engaging pawls of the sprocket, which engage with the other perforations formed o the opposite side in the width direction to the perforations formed only in a leader of a leading end portion of the film located at the specified position in the film passage of the camera body, are provided in a manner to engage continuously with a plurality of openings of the other perforation;

film feed distance measurement means, which measures the film feed distance of other film fed by the sprocket on a basis of the rotation of the sprocket and generates a film feed distance measuring signal, is provided on the sprocket; and the film feed distance measurement means and the sprocket drive means are connected to sprocket drive control means which controls the sprocket drive means in a manner to stop the feeding of the film by the sprocket drive means when the sprocket drive control means detects that the film feed distance reaches a specified amount, on a basis of the film feed distance measuring signal from the film feed distance measurement means.

23. A film winding mechanism of a camera comprising:

a spool which is located on one end of a film passage opposed to photographing lenses and on the backside of the film passage in a manner to take up film transferred through the film passage from a film patrone chamber located on the other end of the film passage;

a sprocket which is arranged between the spool and the film passage and includes engaging pawls on an outer peripheral surface of the ends thereof to engage with perforations formed in the film;

guide rings which are loosely fitted on the sprocket in such a manner that the rotating center axis thereof is movable within a specified range, and which have an outer diameter larger than the outer diameter of the sprocket so that the guide rings abut on the surface of the film curved along the sprocket to make large the radius of curvature of the film; and a drive mechanism which drives the spool to take up the film transferred from the sprocket and the guide rings on the spool.

24. A film winding mechanism of a camera according to claim 23, wherein elastomeric members are interposed between the guide rings and the sprocket.

25. A film winding mechanism of a camera according to claim 23, wherein guide rollers for restricting the range of the diagonally forward movement of the guide rings are disposed near the outside of the guide rings.

26. A film winding mechanism of a camera according to claim 24, wherein guide rollers for restricting the range of the diagonally forward movement of the guide rings are disposed near the outside of the guide rings.

27. A film winding mechanism of a camera, comprising:

a rotation drive source having an output gear;

a planetary gear mechanism having a sun gear to which the rotational force is transmitted from the output gear of the rotation drive source, a planetary gear linked by a planetary arm to the sun gear while engaging with the sun gear, and an internal gear support member including an arc-shaped internal gear located outside the planetary gear in the radial direction of the sun gear to be engaged with the planetary gear rotating around the sun gear;

a film feed sprocket having an input gear located outside the one end of the internal gear support member on an orbit of the planetary gear in the planetary gear mechanism;

a film take-up spool having an input gear located outside the other end of the internal gear support member on the orbit of the planetary gear in the planetary gear mechanism; and rotation drive source control means which is connected to the rotation drive source, which engages the planetary gear with the input gear of the film feed sprocket by controlling the rotation drive source in a manner to rotate the output gear in one direction when a rear cover of the camera is closed, which feeds film for a specified distance by means of the film feed sprocket by transmitting the rotational force from the rotation drive source to the film feed sprocket and then engages the planetary gear with the input gear of the film take-up spool by controlling the rotation drive source in a manner to rotate the output gear in the other direction, and which takes up the film fed for a specified distance from the film feed sprocket on the film take-up spool by transmitting the rotational force from the rotation drive source to the film take-up spool, and controls the rotation drive source until the planetary gear of the planetary gear mechanism is engaged with the internal gear of the internal gear support member, when a rear cover of the camera is moved to its open position.

28. A camera of a film auto-loading type, comprising:

a camera body in which an opening is mounted for determining a photographing bundle of rays and for forming a photographing picture, and a patrone containing chamber is located adjacent to the opening and is used for containing a patrone to be used for the camera;

a sprocket which is located behind an imaginary plane including the opening and which is used for feeding a film, the film being exposed by the photographing bundle of rays passing through the opening, toward the backside of the imaginary plane;

a spool which is located behind the opening and the sprocket and takes up the film, fed toward the backside by the sprocket, with a photographic-emulsion coating surface of the film being located radially inside on the spool;

a guide member which is located to surround the sprocket and is used for guiding a leading end of the film;

sprocket driving means for rotatably driving the sprocket to feed the film, which is arranged at a predetermined position in a film passage of the camera body, by means of the sprocket along the film passage;

spool driving means for rotatably driving the spool to take up the film, which is fed for a predetermined distance from the sprocket, by means of the spool on the spool;

said camera body having a film guide rail at a position which is opposed to engaging pawls of the sprocket, the engaging pawls being engageable with perforations of the leading end of a leader portion of the film, and said film guide rail being located inwardly from the engaging pawls in a width direction of the film; and a region of the camera body, which is located outwardly from said film guide rail in the width direction of the film, is outwardly indented form a rotational locus of top ends of the engaging pawls in a radial direction of the sprocket.

29. A camera according to claim 28, wherein an opening side end of the film guide rail is formed outside of the rotational locus of the top ends of the engaging pawls of the sprocket in the radial direction thereof; and the film guide rail has an inclined shape which projects gradually inside of the rotational locus in the radial direction with the film guide rail being gradually farther away from the opening.

30. A camera comprising:

a camera body in which an opening is mounted for forming a photographic picture;

a rear cover which is provided to the camera body to be openable and closable for mounting a patrone into the camera body and dismounting the patrone from the camera body;

a sprocket which is pivotally supported by the rear cover behind an imaginary plane including the opening of the camera body and which is used for feeding a film, the film being exposed by a photographing bundle of rays passing through the opening, toward the backside of the imaginary plane; and a spool which is pivotally supported by the rear cover behind the opening and the sprocket and takes up the film, fed by the sprocket, with a photographic-emulsion coating surface of the film being located radially inside on the spool.

31. A camera comprising:

a camera body front portion which holds lens means, includes an opening for exposure behind the lens, and is adapted to hold a film to make the film transverse the opening;

a camera body rear portion which covers the backside of the film;

a sprocket which is pivotally supported by the camera body rear portion behind an imaginary plane including the opening of the camera body front portion and which is used for feeding the film, the film being exposed by a photographing bundle of rays passing through the opening, toward the backside of the imaginary plane; and a spool which is pivotally supported by the camera body rear portion behind the opening and the sprocket and takes up the film, fed by the sprocket, with a photographic-emulsion coating surface of the film being located radially inside on the spool.

32. A camera comprising:

a camera body front portion which holds lens means, and which includes an opening for exposure behind the lens means, and a patrone containing chamber for containing a patrone at one side of the opening, and is used to hold a film pulled out from the patrone in a direction transverse to the opening;

a camera body rear portion which includes a battery containing chamber for containing a battery and which includes cover means for covering the backside of the film;

a sprocket which is pivotally supported by the camera body rear portion behind an imaginary plane including the opening of the camera body front portion and which is used for feeding the film, the film being exposed by a photographing bundle of rays passing through the opening, toward the backside of the imaginary plane;

a spool which is pivotally supported by the camera body rear portion behind the opening and the sprocket and takes up the film, fed by the sprocket, with a photographic-emulsion coating surface of the film being located radially inside on the spool; and electric driving means for driving the sprocket and the spool by a battery.

33. A camera comprising:

a camera body front portion which holds lens means, and which includes an opening for exposure behind the lens means, and a patrone containing chamber for containing a patrone at one side of the opening, and is used to hold a film pulled out from the patrone in a direction transverse to the opening;

a camera body rear portion which includes cover means for covering the backside of the film;

a first sprocket which is pivotally supported by the camera body rear portion and which is used for feeding the film from the patrone contained in the patrone containing chamber toward the opening;

a second sprocket which is pivotally supported by the camera body rear portion behind an imaginary plane including the opening of the camera body front portion, and which is used for feeding the film toward the backside of the imaginary plane; and a spool which is pivotally supported by the camera body rear portion behind the opening and the second sprocket and which takes up the film, fed by the second sprocket, with a photographic-emulsion coating surface of the film being located radially inside on the spool.

* * * * *